US012631043B2

(12) United States Patent
Barker et al.

(10) Patent No.: US 12,631,043 B2
(45) Date of Patent: May 19, 2026

(54) MODULAR CYLINDRICAL LOCKSET

(71) Applicant: Schlage Lock Company LLC, Carmel, IN (US)

(72) Inventors: Kenton H. Barker, Colorado Springs, CO (US); Subbiah Gopalakrishnan, Trivandrum (IN); David J. Hurlbert, Manitou Springs, CO (US); Kasey Wachtendorf, Colorado Springs, CO (US); Snehil Solanki, Colorado Springs, CO (US); Dilip Bangaru, Bangalore (IN); Austin M. Roup, Woodland Park, CO (US); Rakesh Murali, Auckland (NZ)

(73) Assignee: Schlage Lock Company LLC, Carmel, IN (US)

( * ) Notice: Subject to any disclaimer, the term of this patent is extended or adjusted under 35 U.S.C. 154(b) by 119 days.

(21) Appl. No.: 18/789,071

(22) Filed: Jul. 30, 2024

(65) Prior Publication Data

US 2025/0027343 A1 Jan. 23, 2025

Related U.S. Application Data

(63) Continuation of application No. 17/348,085, filed on Jun. 15, 2021, now Pat. No. 12,049,770, which is a (Continued)

(51) Int. Cl.

*E05B 63/00* (2006.01)
*E05B 1/00* (2006.01)

(Continued)

(52) U.S. Cl.

CPC ........ *E05B 63/0056* (2013.01); *E05B 1/0015* (2013.01); *E05B 13/004* (2013.01);

(Continued)

(58) Field of Classification Search

CPC ...... E05B 13/004; E05B 13/10; E05B 13/101; E05B 13/105; E05B 13/106;

(Continued)

(56) References Cited

U.S. PATENT DOCUMENTS

| | | | |
|---|---|---|---|
| 2,042,025 | A | 5/1936 | Schlage |
| 2,691,290 | A | 10/1954 | Schlage |

(Continued)

OTHER PUBLICATIONS

Chassis Entrance/Office and Entrance Lock ND50 and ND53; ND-Series Service Manual; p. 24; Schlage; 1 page.

(Continued)

*Primary Examiner* — Christopher J Boswell
(74) *Attorney, Agent, or Firm* — Taft Stettinius & Hollister LLP

(57) ABSTRACT

An exemplary product line system includes a common platform and a plurality of component families, each of which includes a plurality of interchangeable component species configured for use with the common platform. The common platform includes an inside drive assembly and a chassis assembly including a chassis and an outside drive assembly. A lockset assembled from the system includes the common platform and a plurality of modular components. Each of the modular components corresponds to a respective one of the component families, and is provided as a selected species of the corresponding component family. The lockset has a function defined by the set of component species installed to the lockset. The function of the lockset can be changed by altering the set of component species installed to the lockset without disassembling the chassis assembly.

20 Claims, 33 Drawing Sheets

Related U.S. Application Data continuation of application No. 16/179,001, filed on Nov. 2, 2018, now Pat. No. 11,035,149.

(60) Provisional application No. 62/581,266, filed on Nov. 3, 2017.

(51) Int. Cl.

| | |
|---|---|
| ***E05B 13/00*** | (2006.01) |
| ***E05B 13/10*** | (2006.01) |
| ***E05B 15/00*** | (2006.01) |
| ***E05B 17/04*** | (2006.01) |
| ***E05B 47/00*** | (2006.01) |
| ***E05B 47/06*** | (2006.01) |
| ***E05B 55/00*** | (2006.01) |
| ***E05B 55/06*** | (2006.01) |

(52) U.S. Cl.

CPC ........ *E05B 13/106* (2013.01); *E05B 15/0033* (2013.01); *E05B 17/048* (2013.01); *E05B 47/0004* (2013.01); *E05B 47/0665* (2013.01); *E05B 55/005* (2013.01); *E05B 55/06* (2013.01); *E05B 13/101* (2013.01); *E05B 15/004* (2013.01); *E05B 2047/0024* (2013.01); *E05B 63/006* (2013.01); *E05B 63/0065* (2013.01); *E05Y 2900/132* (2013.01)

(58) Field of Classification Search

CPC .... E05B 13/108; E05B 15/003; E05B 15/004; E05B 17/04; E05B 17/048; E05B 17/049; E05B 55/005; E05B 55/06; E05B 63/0056; E05B 63/006; E05B 63/0065; E05B 2063/0082

See application file for complete search history.

(56) References Cited

U.S. PATENT DOCUMENTS

| | | | | |
|---|---|---|---|---|
| 2,738,666 | A | 3/1956 | Axel | |
| 3,621,685 | A | 11/1971 | Sargent | |
| 4,428,212 | A | 1/1984 | Best et al. | |
| 4,470,276 | A | 9/1984 | Bayless | |
| 4,672,828 | A | 6/1987 | Theriault | |
| 4,920,773 | A * | 5/1990 | Surko, Jr. | E05B 55/06 70/472 |
| 5,036,575 | A | 8/1991 | Campion et al. | |
| 5,768,926 | A | 6/1998 | Shen | |
| 5,775,745 | A | 7/1998 | Hoppe et al. | |
| 5,794,472 | A | 8/1998 | Kester et al. | |
| 6,021,654 | A | 2/2000 | McCaa | |
| 6,068,308 | A | 5/2000 | Molzer | |
| 6,145,356 | A | 11/2000 | Thwing | |
| 6,189,351 | B1 | 2/2001 | Eagan et al. | |
| 6,412,318 | B1 | 7/2002 | Shen | |
| 6,540,274 | B2 | 4/2003 | Bates et al. | |
| 6,626,018 | B2 | 9/2003 | Eller et al. | |
| 6,640,593 | B1 | 11/2003 | Hannah et al. | |
| 6,705,138 | B1 | 3/2004 | Shen | |
| 6,735,993 | B2 | 5/2004 | Eller et al. | |
| 6,802,194 | B1 * | 10/2004 | Shen | E05B 55/005 70/472 |
| 6,802,546 | B2 | 10/2004 | Bates et al. | |
| 6,926,319 | B2 * | 8/2005 | Bates | E05C 1/163 70/483 |
| 6,935,148 | B2 | 8/2005 | Don | |
| 7,063,363 | B2 | 6/2006 | Fishencord | |
| 7,334,440 | B2 | 2/2008 | Hsueh et al. | |
| 7,497,486 | B1 | 3/2009 | Davis et al. | |
| 7,870,770 | B2 | 1/2011 | Blanch | |
| 8,727,392 | B2 | 5/2014 | Greiner et al. | |
| 9,169,668 | B2 | 10/2015 | George | |
| 9,181,730 | B1 | 11/2015 | Peng | |
| 9,394,722 | B2 * | 7/2016 | Moon | E05B 63/16 |
| 9,945,152 | B2 | 4/2018 | Huang et al. | |
| 10,047,547 | B2 | 8/2018 | Waugh et al. | |
| 10,301,843 | B2 | 5/2019 | Basavaraju et al. | |
| 10,724,272 | B2 | 7/2020 | Cohen et al. | |
| 11,035,149 | B2 | 6/2021 | Barker et al. | |
| 11,078,686 | B2 | 8/2021 | Barker et al. | |
| 11,280,109 | B2 * | 3/2022 | Balasubramaniam | E05B 15/0033 |
| 11,377,872 | B2 | 7/2022 | Barker et al. | |
| 11,920,379 | B2 * | 3/2024 | Barker | E05B 13/004 |
| 11,946,288 | B2 * | 4/2024 | Huang | E05B 63/16 |
| 12,264,496 | B2 * | 4/2025 | Barker | E05B 13/004 |
| 2005/0134060 | A1 | 6/2005 | Hsueh | |
| 2015/0315816 | A1 | 11/2015 | Gopalakrishnan et al. | |
| 2016/0340931 | A1 | 11/2016 | Huang et al. | |
| 2019/0136575 | A1 * | 5/2019 | Barker | E05B 55/06 |

OTHER PUBLICATIONS

Hoppe HCS—the HOPPE Compact System; 40 pages; Copyright Hoppe AG Mar. 20, 2013.

Sargent ASSA Abloy 11 Line Bored Lock; 16 pages; Copyright 2007-2015 Sargent Manufacturing Company.

International Search Report; International Searching Authority; International Patent Application No. PCT/US2018/059195; Feb. 14, 2019; 2 pages.

Written Opinion of the International Searching Authority; International Patent Application No. PCT/US2018/059195; Feb. 14, 2019; 6 pages.

Canadian Examination Report; Canadian Intellectual Property Office; Canadian Patent Application No. 3,083,714; Mar. 21, 2022; 3 pages.

Mexican Examination Report; Mexican Patent Office; Mexican Patent Application No. MX/a/2020/004649; Sep. 29, 2023; 9 pages.

* cited by examiner

| Lockset | | Latchbolt Mechanism 520 | | Outside Actuating Assembly 550 | | | | | |
|---|---|---|---|---|---|---|---|---|---|
| | | | | | | OAM 540 | | Outside Handle 530 | |
| Species | Function | Type | Species | Type | Species | Type | Species | Type | Species |
| 1101 | Passage | Spring | 622 | Sixth | 656 | N/A | N/A | Closed | 631 |
| 1102 | Bedroom Privacy | Spring | 622 | Third | 653 | First Override | 643 | Open | 632 |
| 1103 | Hospital Privacy | Spring | 622 | Fourth | 654 | Second Override | 644 | Open | 632 |
| 1104 | First Entry/Office | Dead | 621 | First | 651 | First Cylinder | 641 | Open | 632 |
| 1105 | Second Entry/Office | Dead | 621 | First | 651 | First Cylinder | 641 | Open | 632 |
| 1106 | Entry | Dead | 621 | First | 651 | First Cylinder | 641 | Open | 632 |
| 1107 | Storeroom | Dead | 621 | First | 651 | First Cylinder | 641 | Open | 632 |
| 1108 | Exit | Dead | 621 | Fifth | 655 | Exit | 645 | Closed | 631 |
| 1109 | Classroom | Dead | 621 | Second | 652 | Second Cylinder | 642 | Open | 632 |

FIG. 17a

| Lockset | | Common Platform 510 | Inside Actuating Assembly 590 | | | | | | | |
|---|---|---|---|---|---|---|---|---|---|---|
| | | | | | IOM 570 | | IAM 580 | | Inside Handle 560 | |
| Species | Function | | Type | Species | Type | Species | Type | Species | Type | Species |
| 1101 | Passage | 610 | First | 691 | Inactive | 671 | N/A | N/A | Closed | 661 |
| 1102 | Bedroom Privacy | 610 | Third | 693 | Push | 673 | Push-Button | 681 | Open | 662 |
| 1103 | Hospital Privacy | 610 | Third | 693 | Push | 673 | Push-Button | 681 | Open | 662 |
| 1104 | First Entry/Office | 610 | Third | 693 | Push | 673 | Push-Button | 681 | Open | 662 |
| 1105 | Second Entry/Office | 610 | Fifth | 695 | Second Push/Turn | 675 | Push/Turn Button | 682 | Open | 662 |
| 1106 | Entry | 610 | Fourth | 694 | First Push/Turn | 674 | Push/Turn Button | 682 | Open | 662 |
| 1107 | Storeroom | 610 | Second | 692 | Fixed | 672 | N/A | N/A | Closed | 661 |
| 1108 | Exit | 610 | Second | 692 | Fixed | 672 | N/A | N/A | Closed | 661 |
| 1109 | Classroom | 610 | Sixth | 696 | N/A | N/A | N/A | N/A | Closed | 661 |

FIG. 17b

| Lockset | | Latchbolt Mechanism 520 | | Outside Actuating Assembly 550 | | | | | |
|---|---|---|---|---|---|---|---|---|---|
| | | | | | | OAM 540 | | Outside Handle 530 | |
| Species | Function | Type | Species | Type | Species | Type | Species | Type | Species |
| 2101 | Passage | Spring | 1622 | Sixth | 1656 | N/A | N/A | Closed | 1631 |
| 2102 | Bedroom Privacy | Spring | 1622 | Third | 1653 | First Override | 1643 | Open | 1632 |
| 2103 | Hospital Privacy | Spring | 1622 | Fourth | 1654 | Second Override | 1644 | Open | 1632 |
| 2104 | First Entry/Office | Dead | 1621 | First | 1651 | First Cylinder | 1641 | Open | 1632 |
| 2105 | Second Entry/Office | Dead | 1621 | First | 1651 | First Cylinder | 1641 | Open | 1632 |
| 2106 | Entry | Dead | 1621 | First | 1651 | First Cylinder | 1641 | Open | 1632 |
| 2107 | Storeroom | Dead | 1621 | First | 1651 | First Cylinder | 1641 | Open | 1632 |
| 2108 | Exit | Dead | 1621 | Fifth | 1655 | Exit | 1645 | Closed | 1631 |
| 2109 | Classroom | Dead | 1621 | Second | 1652 | Second Cylinder | 1642 | Open | 1632 |
| 2110 | Vestibule | Dead | 1621 | First | 1651 | First Cylinder | 1641 | Open | 1632 |
| 2111 | Classroom Security | Dead | 1621 | Second | 1652 | Second Cylinder | 1642 | Open | 1632 |

FIG. 25a

| Lockset | | Common Platform 510 | Inside Actuating Assembly 590 | | | | | | | |
|---|---|---|---|---|---|---|---|---|---|---|
| | | | | | IOM 570 | | IAM 580 | | Inside Handle 560 | |
| Species | Function | | Type | Species | Type | Species | Type | Species | Type | Species |
| 2101 | Passage | 1610 | First | 1691 | Inactive | 1671 | N/A | N/A | Closed | 1661 |
| 2102 | Bedroom Privacy | 1610 | Third | 1693 | Push | 1673 | Push-Type | 1681 | Open | 1662 |
| 2103 | Hospital Privacy | 1610 | Third | 1693 | Push | 1673 | Push-Type | 1681 | Open | 1662 |
| 2104 | First Entry/Office | 1610 | Third | 1693 | Push | 1673 | Push-Type | 1681 | Open | 1662 |
| 2105 | Second Entry/Office | 1610 | Fifth | 1695 | Second Push/Turn | 1675 | Push/Turn | 1682 | Open | 1662 |
| 2106 | Entry | 1610 | Fourth | 1694 | First Push/Turn | 1674 | Push/Turn | 1682 | Open | 1662 |
| 2107 | Storeroom | 1610 | Second | 1692 | Fixed | 1672 | N/A | N/A | Closed | 1661 |
| 2108 | Exit | 1610 | Second | 1692 | Fixed | 1672 | N/A | N/A | Closed | 1661 |
| 2109 | Classroom | 1610 | Seventh | 1697 | Classroom | 1677 | Fixed/Dummy | 1684 | Closed | 1661 |
| 2110 | Vestibule | 1610 | Sixth | 1696 | Vestibule | 1676 | Cylinder | 1683 | Open | 1662 |
| 2111 | Classrooom Security | 1610 | Eighth | 1698 | Classroom | 1677 | Cylinder | 1683 | Open | 1662 |

FIG. 25b

MODULAR CYLINDRICAL LOCKSET

CROSS-REFERENCE TO RELATED APPLICATIONS

The present application is a continuation of U.S. patent application Ser. No. 17/348,085 filed Jun. 15, 2021 and issued as U.S. Pat. No. 12,049,770, which is a continuation of U.S. patent application Ser. No. 16/179,001 filed Nov. 2, 2018 and issued as U.S. Pat. No. 11,035,149, which claims the benefit of U.S. Provisional Patent Application No. 62/581,266 filed Nov. 3, 2017, the contents of each application are incorporated by reference in their entirety.

TECHNICAL FIELD

The present disclosure generally relates to cylindrical locksets, and more particularly but not exclusively relates to systems and methods that facilitate the assembly of such locksets.

BACKGROUND

Cylindrical locksets are often installed in a variety of different settings, such as offices, classrooms, storerooms, and hospitals. It is often desirable for the lockset to have a set of capabilities tailored to the setting in which it will be installed. As a result, the industry has developed a host of standard functions, each of which includes a particular set of capabilities or operating characteristics. For example, the passage function is one in which neither the inside handle nor the outside handle can be locked, such that both the handles are at all times capable of retracting the latchbolt. In the exit function, by contrast, only the inside handle is capable of retracting the latchbolt, and the outside handle is locked at all times.

Cylindrical locksets typically include four main components: an outside drive assembly, an inside drive assembly, a chassis, and a latchbolt mechanism. In many currently-available lines of cylindrical locksets, the chassis must be configured for a specific function by the manufacturer during the manufacture and initial assembly stages. With the function of the chassis set at the factory, the manufacturer, distributors, and locksmiths typically need to inventory a different format of lock chassis for each of a plurality of functions. For these reasons among others, there remains a need for further improvements in this technological field.

SUMMARY

An exemplary product line system includes a plurality of modular component families and a common platform that includes a chassis assembly and an inside drive assembly. Each component family includes a plurality of interchangeable component species configured for use with the common platform. A lockset assembled from the system has a particular function, and includes the common platform and a set of peripheral components corresponding to the particular function. Each of the peripheral components is provided as a selected species of a corresponding one of the component families, and is configured to interact with the common platform to provide the assembled lockset with a particular feature or characteristic. The function of the lockset can be changed by altering the set of peripheral components installed to the common platform without disassembling the chassis assembly. Further embodiments, forms, features, and aspects of the present application shall become apparent from the description and figures provided herewith.

BRIEF DESCRIPTION OF THE FIGURES

FIGS. 17*a* and 17*b* schematically represent a product line according to certain embodiments, and more specifically are tables illustrating the components selected for each of a plurality of lockset species.

FIGS. 25*a* and 25*b* schematically represent a product line according to certain embodiments, and more specifically are tables illustrating the components selected for each of a plurality of lockset species.

DETAILED DESCRIPTION OF ILLUSTRATIVE EMBODIMENTS

Figure 1A:
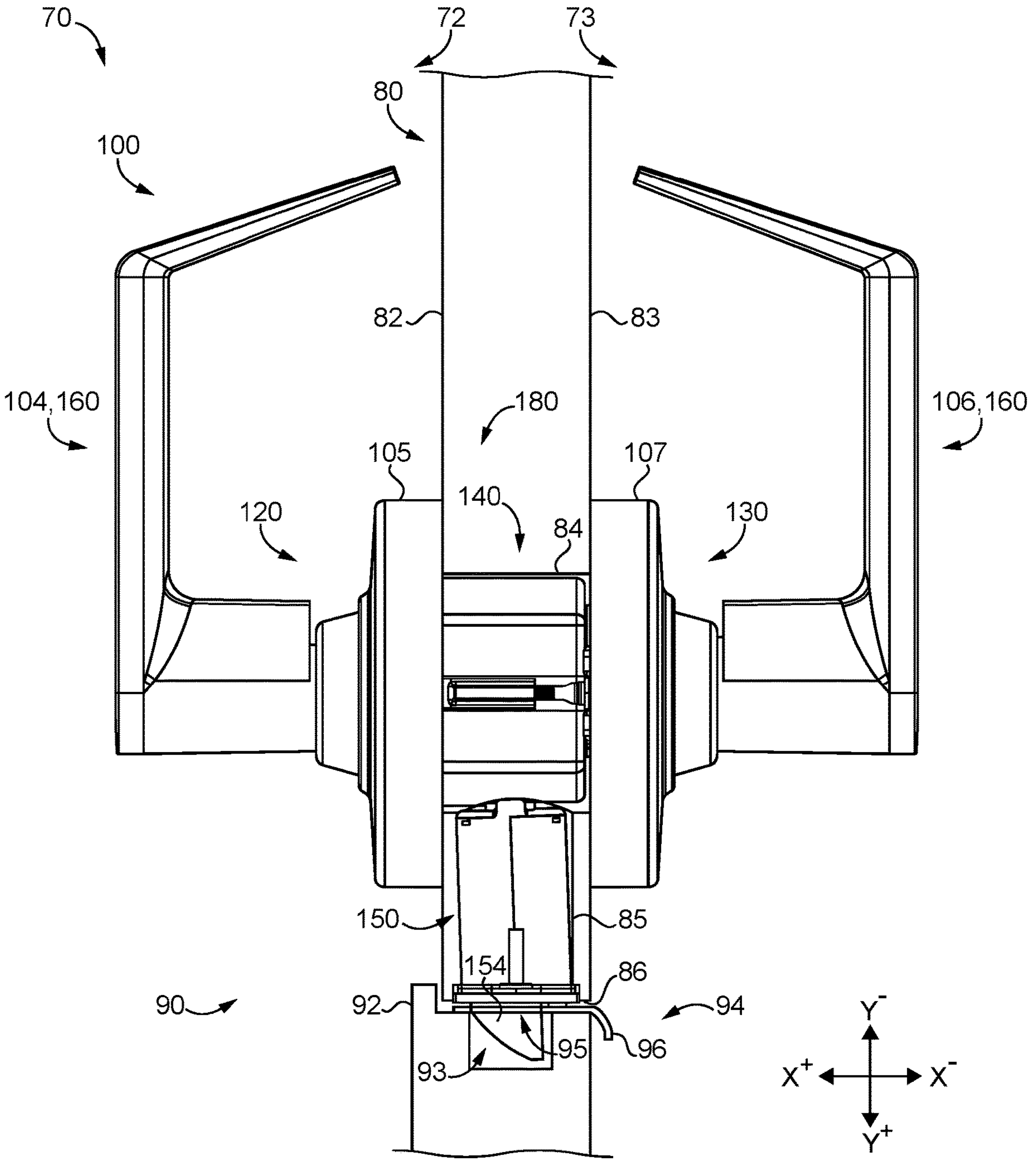
FIG. 1*a* is a plan view of a lockset according to certain embodiments as installed to a closure assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms "longitudinal," "lateral," and "transverse" are used to denote motion or spacing along three mutually perpendicular axes, wherein each of the axes defines two opposite directions. In the coordinate system illustrated in FIGS. 1 and 2, the X-axis defines first and second longitudinal directions, the Y-axis defines first and second lateral directions, and the Z-axis defines first and second transverse directions. Additionally, the descriptions that follow may refer to the directions defined by the axes with specific reference to the orientations illustrated in the Figures. For example, the longitudinal directions may be referred to as the proximal direction ($X^+$) and the distal direction ($X^-$), the lateral directions may be referred to as the extending or laterally outward direction ($Y^+$) and the retracting or laterally inward direction ($Y^-$), and the transverse directions may be referred to as the upward direction ($Z^+$) and the downward direction ($Z^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

Figure 1B:
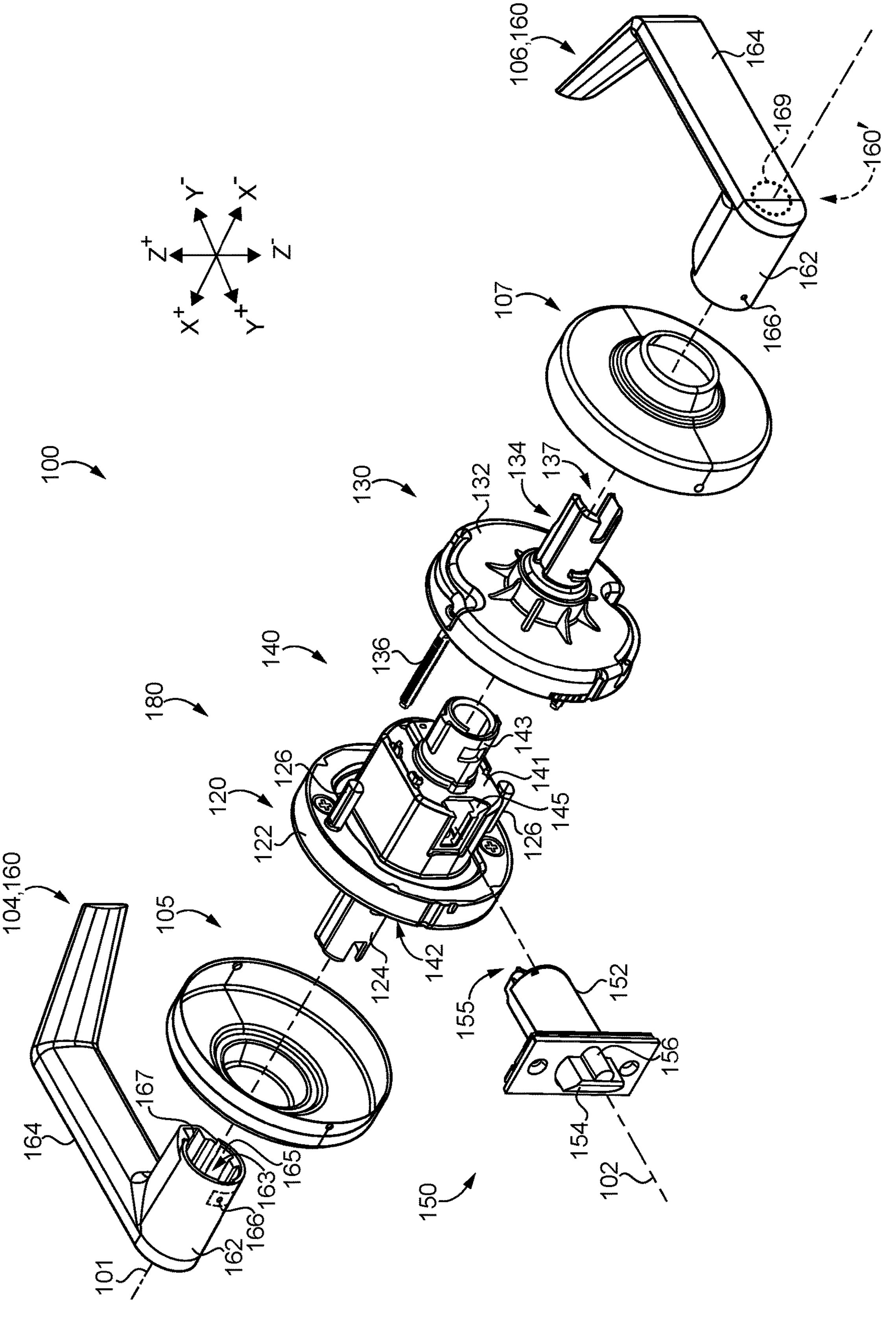
FIG. 1*b* is a partially-exploded assembly view of the lockset illustrated in FIG. 1*a*.

With reference to FIGS. 1*a* and 1*b*, illustrated therein is a cylindrical lockset 100 according to certain embodiments. More specifically, FIG. 1*a* illustrates a closure assembly 70 including a door 80, a frame 90, and the lockset 100, and FIG. 1*b* is a partially-exploded assembly view of the lockset 100. The closure assembly 70 may define a boundary between an outer or unsecured region 72 and an inner or secured region 73. The door 80 is pivotally mounted to the frame 90 for swinging movement between an open position and a closed position. With the door 80 in the closed position, an outer or unsecured side 82 of the door 80 faces the outer or unsecured region 72, and an inner or secured side 83 of the door 80 faces the inner or secured region 73. The door 80 also includes a cross-bore 84 that extends longitudinally through the thickness of the door 80, and an edge bore 85 that extends laterally between the cross-bore 84 and the free edge 86 of the door 80.

The lockset 100 generally includes an outside drive assembly 120 for mounting to the outer side 82 of the door 80, an inside drive assembly 130 for mounting to the inner side 83 of the door 80, a chassis 140 for mounting in the cross-bore 84, and a latchbolt mechanism 150 for mounting in the edge bore 85. The lockset 100 has a longitudinal rotational axis 101 about which certain components of the lockset 100 rotate, and a lateral retraction axis 102 along which a latchbolt 154 of the latchbolt mechanism 150 extends and retracts. The lockset 100 also includes an outside handle 104 and an outside rose 105, each of which is mounted to the outside drive assembly 120. The lockset 100 further includes an inside handle 106 and an inside rose 107, each of which is mounted to the inside drive assembly 130. In the illustrated embodiment, each of the outside handle 104 and the inside handle 106 is provided in the form of a lever 160. It is also contemplated that one or both of the handles 104, 106 may be provided in another form, such as a knob. As described hereinafter, at least one of the handles 104, 106 is at least selectively operable to effect retraction of the latchbolt 154.

The frame 90 includes a hinge jamb to which the door 80 is pivotally mounted via one or more hinges, and a latch jamb 92 operable to engage the latchbolt mechanism 150 when the door 80 is in the closed positon. The latch jamb 92 includes a pocket 93 operable to receive an end portion of the latchbolt 154. A strike plate 94 is mounted to the latch jamb 92, and includes an opening 95 aligned with the pocket 93. As the door 80 moves from the open position to the closed position, a ramp 96 of the strike plate 94 engages the latchbolt 154, thereby driving the latchbolt 154 from an extended position to a retracted position. When the latchbolt 154 becomes aligned with the strike opening 95, the latchbolt 154 returns to its extended position and enters the pocket 93, thereby latching the door 80 in its closed position.

With the door 80 latched in its closed position, the latchbolt 154 can be retracted from the secured side 83 (e.g., by operating the inside handle 106) to permit egress from the secured region 73. In certain embodiments, the lockset 100 may be configured to at least selectively permit retraction of the latchbolt 154 from the unsecured side 82 to permit entry from the unsecured region 72. The lockset 100 may have an unlocked state in which the outside handle 104 is unlocked and is capable of retracting the latchbolt 154. Additionally or alternatively, the lockset 100 may have a locked state in which the outside handle 104 is locked and is incapable of retracting the latchbolt 154. As described herein, the lockset 100 may further include an outside actuating mechanism, which may be configured to be manipulated by a user. With the lockset 100 in the locked state, manipulation of such an outside actuating mechanism may unlock the outside handle 104 and/or cause retraction of the latchbolt 154.

As described in further detail below, the lockset 100 may be provided in the form of a kit in which certain subassemblies are preassembled, and the installer or end user may complete assembly of the lockset 100 during the installation process. For example, one or more of the outside drive assembly 120, the inside drive assembly 130, the chassis 140, and the latchbolt mechanism 150 may be provided in a preassembled state, and the installation process may involve mounting these components, the handles 104, 106, and the roses 105, 107 to one another and to the door 80. In the illustrated form, the outside drive assembly 120 and the chassis 140 are provided as a preassembled chassis assembly 180. It is also contemplated that the outside drive assembly 120 and chassis 140 may be provided as separate components that are mounted to one another during the installation process to form the chassis assembly 180. Further details regarding an illustrative form of the chassis assembly 180 are provided below with reference to FIGS. 2-6.

The outside drive assembly 120 generally includes an outside housing 122, an outside drive spindle 124 mounted to the housing 122 for rotation about the rotational axis 101, and a pair of mounting posts 126 extending distally from the housing 122. Similarly, the inside drive assembly 130 generally includes an inside housing 132, an inside drive spindle 134 mounted to the housing 132 for rotation about the rotational axis 101, and a pair of mounting bolts 136 operable to engage the mounting posts 126 to secure the outside drive assembly 120 to the inside drive assembly 130, thereby securing the lockset 100 to the door 80.

The chassis 140 generally includes a chassis housing 141, an outside chassis spindle 142 rotatably mounted to an outer side of the housing 141, an inside chassis spindle 143 rotatably mounted to an inner side of the housing 141, and a shuttle 145 movably mounted in the housing 141. As described herein, in the illustrated embodiment, the outside chassis spindle 142 is provided in the form of a key cam sleeve that supports a key cam, and may be omitted in certain embodiments. Each of the spindles 142, 143 is rotatable about the rotational axis 101, and the shuttle 145 is laterally movable along the retraction axis 102. The shuttle 145 is biased in a laterally outward extending direction ($Y^+$), and is capable of being driven in a laterally inward retracting direction ($Y^-$). Each of the spindles 142, 143 is operable to rotate about the rotational axis 101 between a home position and a rotated position. The spindles 142, 143 are independently operable to actuate the shuttle 145 such that rotation of either of the spindles 142, 143 to its rotated position drives the shuttle 145 to its retracted position. As the actuating spindle 142, 143 returns to its home position, the shuttle 145 returns to its extended position under the biasing forces provided by one or more springs within the chassis 140. Each of the chassis spindles 142, 143 is rotationally coupled to a corresponding one of the drive spindles 124, 134, and may be at least selectively operable to actuate the shuttle 145.

The latchbolt mechanism 150 generally includes a housing 152, a latchbolt 154 movably mounted in the housing 152, and a bolt bar 155 coupled with the latchbolt 154. The latchbolt 154 is biased toward an extended position, and is configured to move toward a retracted position in response to movement of the bolt bar 155 in the laterally inward direction ($Y^-$). Additionally, the bolt bar 155 is configured to engage the shuttle 145 such that movement of the shuttle 145 in the retracting direction ($Y^-$) causes a corresponding retraction of the latchbolt 154. In certain embodiments, the latchbolt mechanism 150 may be provided as a deadlocking latchbolt mechanism operable to selectively prevent retraction of the latchbolt 154. For example, the latchbolt mechanism 150 may include an auxiliary bolt 156, and may be configured to prevent externally-applied pushing forces from moving the latchbolt 154 to the retracted position when the auxiliary bolt 156 is depressed. In other embodiments, the latchbolt mechanism 150 may be provided as a restoring spring-latch latchbolt mechanism, and the auxiliary bolt 156 may be omitted.

The lever 160 includes a shank 162 and a lever arm 164 extending radially outward from the shank 162. The shank 162 extends along the rotational axis 101, and includes a chamber 163 that is defined in part by one or more engagement features 165, such as splines 165. The chamber 163 is operable to receive either of the drive spindles 124, 134, and the engagement features 165 are configured to mate with the inserted drive spindle, thereby rotationally coupling the lever 160 with the inserted drive spindle. The shank 162 also includes an opening 166 operable to receive a coupling member that longitudinally couples the lever 160 with the inserted drive spindle, such as a catch or a set screw. The chamber 163 may include or be connected with a channel 167 operable to receive a portion of an actuating mechanism, such as the tower of a lock cylinder.

In the illustrated form, each of the handles 104, 106 is provided as a closed-face lever 160, such that the chamber 163 is provided as a blind chamber. It is also contemplated that one or both of the handles 104, 106 may be provided as an open-faced lever 160' having an access port 169 in communication with the chamber 163. The access port 169 may facilitate manipulation of an actuating mechanism mounted within the shank 162, such as a lock cylinder. Further details regarding exemplary forms of such actuating mechanisms are provided hereinafter.

In cylindrical locksets, it is often desirable for the chassis 140 to perform one or more tasks that facilitate installation, assembly, and/or operation of the lockset. Examples of such tasks include blocking the passage of fire through the cross-bore 84, aligning and supporting the chassis frame, supporting the outside spindles 124, 142, retaining the mounting posts 126, guiding and supporting the shuttle 145, and aligning and supporting the inside chassis spindle 143. In certain conventional locksets, performance of these tasks may be divided between several distinct components. As described herein, certain embodiments of the present disclosure may provide for performance of these tasks by fewer components than required in conventional locksets, and in certain instances by a single component.

Figure 2:
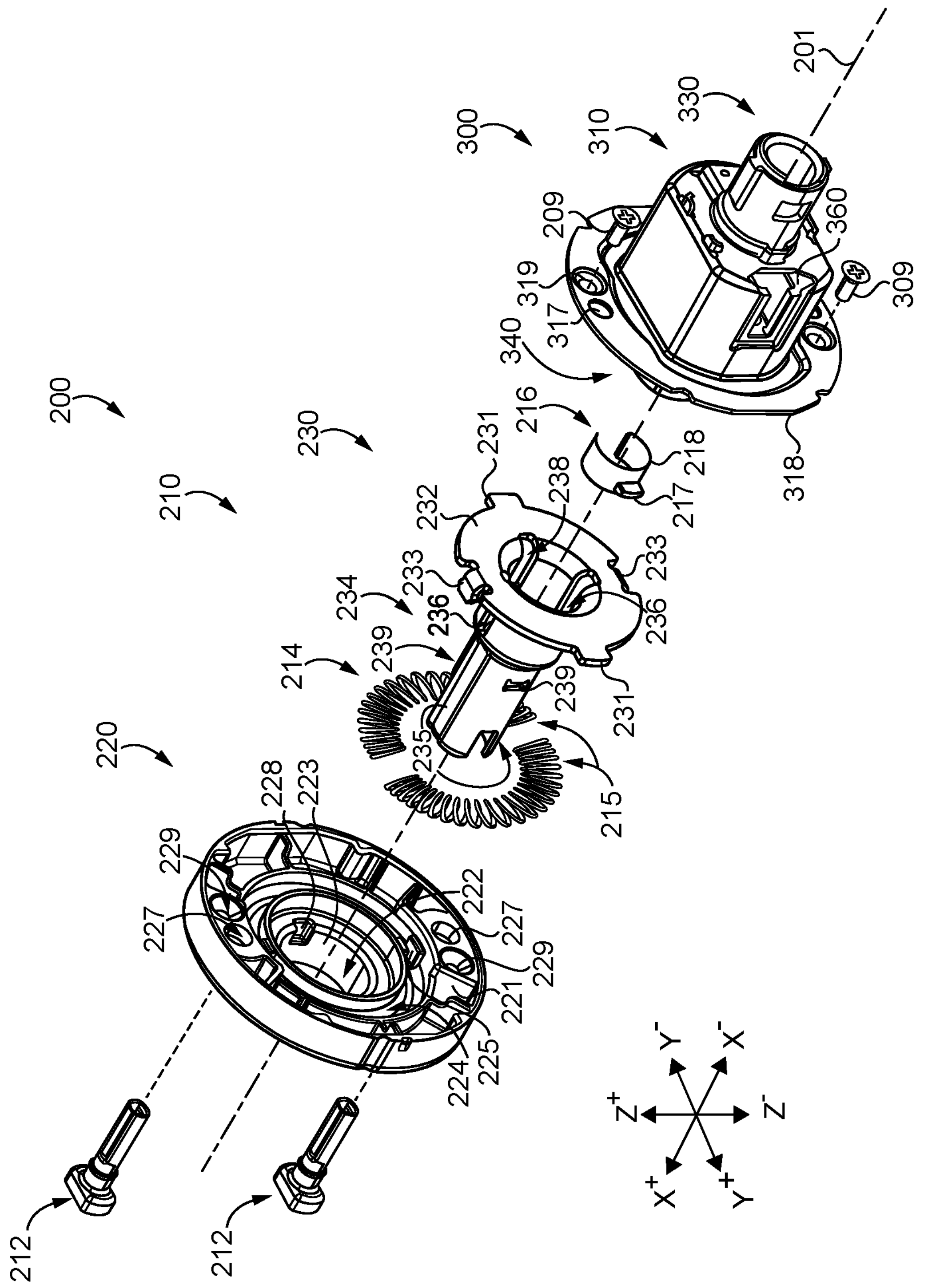
FIG. 2 is a partially exploded assembly view of a chassis assembly according to certain embodiments.

With reference to FIG. 2, illustrated therein is an example of a chassis assembly 200 that may be utilized as the chassis assembly 180 in certain embodiments of the lockset 100. The chassis assembly 200 includes an outside drive assembly 210 and a chassis 300, which respectively correspond to the outside drive assembly 120 and chassis 140 described above. Like the above-described outside drive assembly 120, the illustrated outside drive assembly 210 includes an outside housing 220, an outside drive spindle 230 rotatably mounted to the housing 220, and a pair of mounting posts 212 extending distally from the housing 220. The outside drive assembly 210 further includes a biasing mechanism 214 that biases the drive spindle 230 toward a home position relative to the housing 220. In the illustrated form, the biasing mechanism 214 includes a pair of compression springs 215, each of which is engaged with the housing 220 and the drive spindle 230. It is also contemplated that the biasing mechanism 214 may be provided in another form, such as in the form of one or more torsion springs, or one or more leaf springs.

The outside housing 220 has an opening 222 defined by an inner wall 223, which are respectively configured to receive and rotatably support a portion of the drive spindle 230. The illustrated housing 220 also includes an annular channel 224 in which the biasing mechanism 214 is received, and a pair of tabs 225 project into the channel 224 to provide first anchor points for the springs 215 during rotation of the drive spindle 230. The housing 220 may alternatively be referred to as the outside spring cage housing 220. The housing 220 also includes a locking slot 228 that has an open distal end, and which is in communication with the opening 222. The housing 220 further includes a pair of mounting post openings 227 for receiving the mounting posts 212, and a pair of fastener openings 229 for receiving fasteners 209 that couple the chassis 300 with the outside housing 220.

The drive spindle 230 includes a base plate 232 and a tubular portion 234 extending proximally from the base plate 232. With the drive spindle 230 mounted to the housing 220, the base plate 232 retains the springs 215 in the annular channel 224, and a pair of tabs 233 project into the channel 224 to provide second anchor points for the springs 215 during rotation of the drive spindle 230. Additionally, the tubular portion 234 extends through the opening 222 and is rotatably supported by the inner wall 223. When so mounted, the drive spindle 230 is at least selectively rotatable between a home position and at least one rotated position, and is biased toward its home position by the biasing mechanism 214. Additionally, the outside drive assembly 210 limits the drive spindle 230 to rotation between a first terminal position and a second terminal position. For example, the base plate 232 may include a pair of stop arms 231, and the housing 220 may include a set of stop walls 221 that engage the stop arms 231 and prevent rotation of the spindle 230 beyond its terminal positions. In the illustrated embodiment, the spindle 230 is operable to rotate from its home position through an angle of about 60° in either direction. In other words, each of the terminal positions is offset from the home position by about sixty degrees (60°).

The tubular portion 234 further includes a pair of coupling slots 236 and a receiving slot 238, each of which has an open distal end. When the drive spindle 230 is mounted to the housing 220 and is in the home position, the receiving slot 238 is aligned with the locking slot 228. The tubular portion 234 is configured to be received in and matingly engage the outside handle 104 to rotationally couple the handle 104 with the drive spindle 230. While other forms of engagement are contemplated, the illustrated tubular portion 234 includes a pair of grooves 235 that receive and engage the splines 165. The tubular portion 234 also includes a slot 237 extending from the proximal end thereof, and a catch opening 239 operable to receive a portion of a handle catch 216. With the tubular portion 234 received in the shank 162, the slot 237 is aligned with the channel 167, and the openings 166, 239 are aligned with one another.

The handle catch 216 is seated in the tubular portion 234, and is configured to selectively longitudinally couple the outside handle 104 with the drive spindle 230. The handle catch 216 includes a catch plate 217 that extends into the catch opening 239, an arcuate leaf spring 218 to which the catch plate 217 is mounted, and a post 219 (FIG. 14) coupling the catch plate 217 to the leaf spring 218. The catch plate 217 has a projected position and a depressed position, and is biased toward the projected position by the leaf spring 218. When in the projected position, the catch plate 217 is capable of engaging the catch opening 166 to longitudinally couple the handle 104 with the spindle 230. When in the depressed position, the catch plate 217 is disengaged from the catch opening 166, thereby enabling removal of the handle 104 from the spindle 230.

Figure 3A:
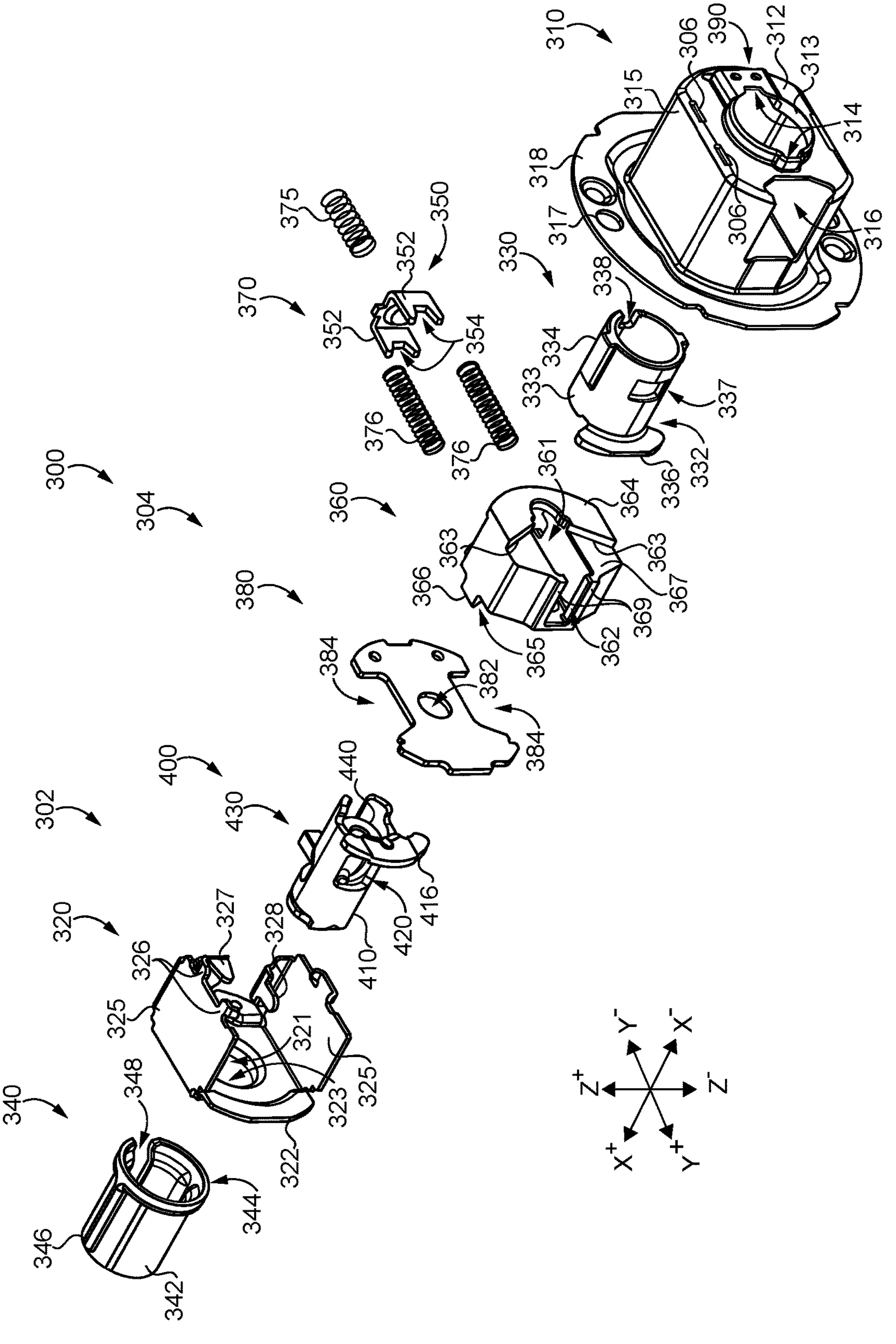
FIGS. 3*a* and 3*b* are partially exploded assembly views of a chassis according to certain embodiments.
Figure 3B:
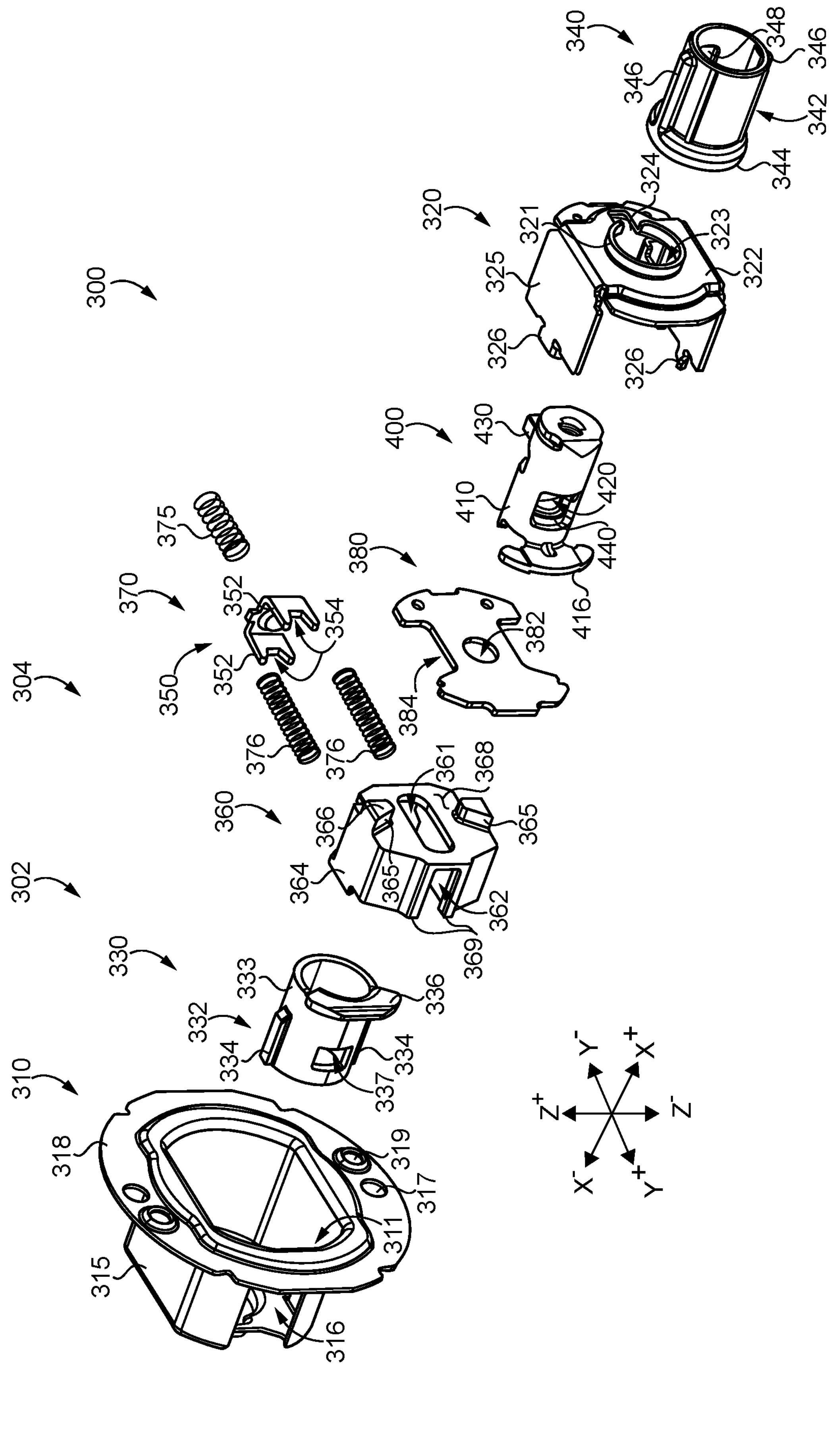
Figure 4A:
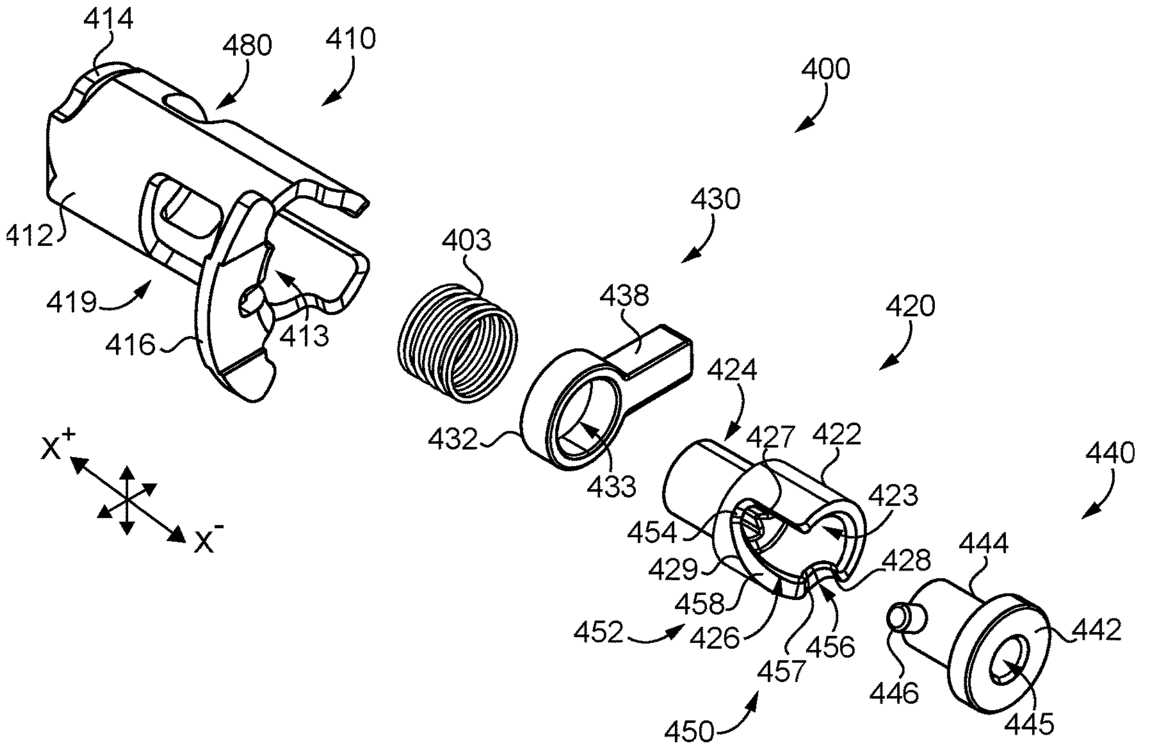
FIGS. 4*a* and 4*b* are exploded assembly views of a key cam according to certain embodiments.
Figure 4B:
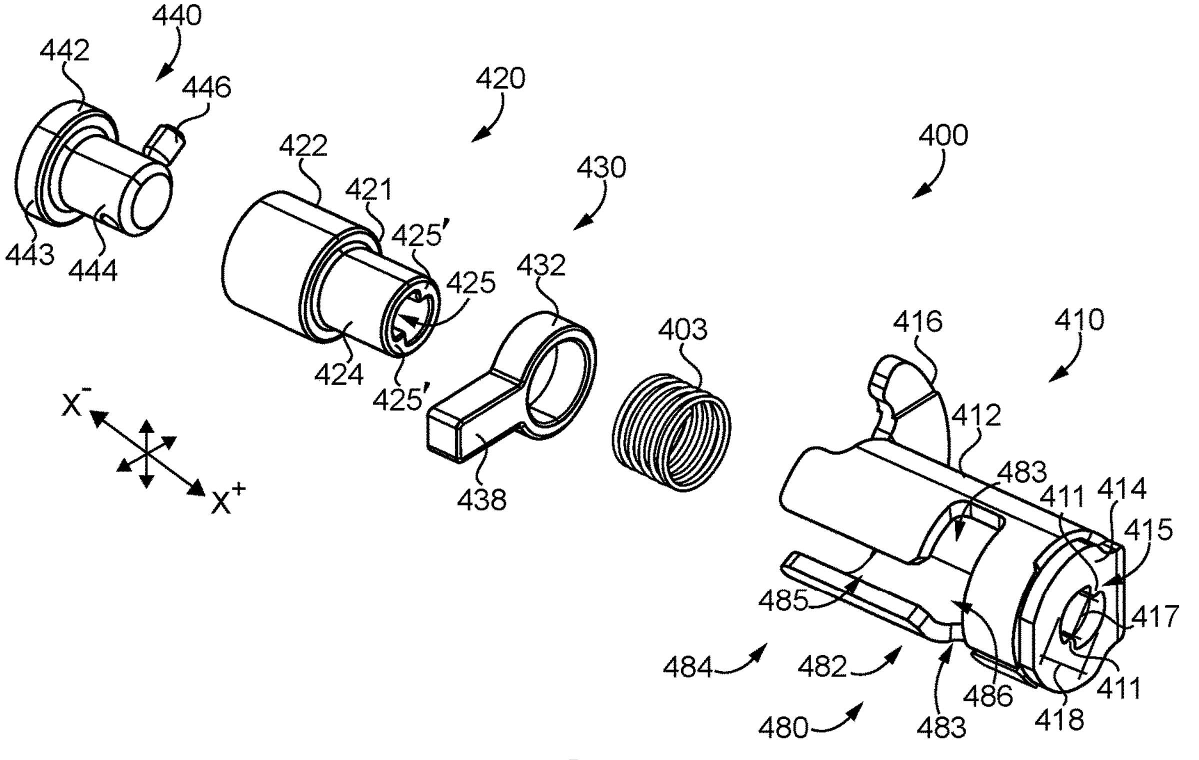

With additional reference to FIG. 3, the chassis 300 includes a housing assembly 302 and a plurality of working components 304 movably mounted to the housing assembly 302. In the illustrated form, the housing assembly 302 includes a housing 310 and a bracket 320 mounted in the housing 310, and the working components 304 include an inside chassis spindle 330, an key cam sleeve 340, a plunger catch 350, a retractor or shuttle 360, a biasing assembly 370, and a key cam 400. The inside chassis spindle 330 is rotatably mounted to the housing 310, and the key cam sleeve 340 is rotatably mounted to the bracket 320. The shuttle 360 is slidably mounted between the inside spindle 330 and the key cam 400, and the plunger catch 350 is movably mounted to the shuttle 360. The biasing assembly 370 is engaged with the housing assembly 302, the plunger catch 350, and the shuttle 360, and biases the plunger catch 350 and the shuttle 360 in the laterally outward extending direction ($Y^+$). The chassis 300 may further include a fire plate 380, which in the illustrated form is sandwiched between the key cam 400 and the shuttle 360.

The key cam 400 generally includes a shell 410, a plug 420 movably mounted in the shell 410, a lock control lug 430 mounted in the shell 410 and supported by the plug 420, and a stem 440 movably seated in the shell 410. The illustrated key cam 400 also includes a cam mechanism 450 configured to translate relative rotational movement of the plug 420 and stem 440 into relative longitudinal movement of the plug 420 and stem 440, and a biasing member in the form of a spring 403 urging the lug 430 in the distal direction ($X^-$). Further details regarding the structural features of the key cam 400 are provided below with reference to FIGS. 4*a* and 4*b*. In certain embodiments, the key cam 400 may further include a lost-motion driver, such as the driver 1440 described below with reference to the key cam 1400.

The housing 310 defines a chamber 311, which is partially delimited by a distal wall 312. The distal wall 312 includes an opening 313 that is generally circular, and which includes a pair of recesses 314 extending radially outwardly from opposite sides of the circular portion. The housing 310 also includes a body portion 315 that partially defines the chamber 311, and which includes a side opening 316 in communication with the chamber 311. A flange 318 is formed at a proximal end of the body portion 315, and a mounting bracket 390 may be formed on the distal wall 312. The flange 318 includes a pair of mounting post openings 317 aligned with the mounting post openings 227 of the outside housing 220, and the mounting posts 212 extend through the aligned openings 227, 317. The flange 318 also includes a pair of fastener openings 319 aligned with the fastener openings 229. A pair of fasteners such as screws 209 extend through the openings 319 into the openings 229, thereby securing the chassis housing 310 to the outside housing 220. As a result, the outside drive assembly 210 is coupled with the chassis 300, which together define the chassis assembly 200. As described herein, the housing 310 serves to discourage the passage of fire through the cross-bore 84, and may alternatively be referred to as the fire cup 310.

The bracket 320 includes a proximal wall 322 including a generally circular opening 323 that is partially defined by a C-shaped wall 321, which extends in the proximal direction ($X^+$) from the proximal wall 322. The proximal wall 322 also includes a slot 324 that extends radially outward from the circular opening 323, and which is aligned with the open side of the C-shaped wall 321. The bracket 320 also includes a pair of sidewalls 325 that extend from the proximal wall 322 in the distal direction ($X^-$), and which terminate in a set of tabs 326. Each of the tabs 326 is configured to be received in a corresponding slot 306 formed in the distal wall 312 of the housing 310 to align and secure the bracket 320 and the housing 310. Once inserted, the tabs 326 are deformed to prevent separation of the housing 310 and the bracket 320, thereby securing the chassis 300 in an assembled state. The bracket 320 also includes a first anchor post 327 and a pair of second anchor posts 328. Each of the anchor posts 327, 328 provides an anchor point for a corresponding spring of the biasing assembly 370.

The inside chassis spindle 330 includes a tubular body portion 332, the proximal end portion 333 of which is substantially circular in cross-section, and the distal end portion of which includes a pair of external splines 334. The proximal end portion 333 is sized and configured to be received in and rotatably supported by the circular portion of the distal opening 313, and the splines 334 are sized and configured to be received in the recesses 314 during assembly of the chassis 300. The spindle 330 also includes an ear 336, which is formed at a proximal end of the body portion 332, and which is configured to engage the shuttle 360 in a manner described in further detail below. The spindle 330 further includes a coupling slot 337 and an alignment notch 338, which may facilitate installation of one or more components to the chassis 300. Additionally, a recess 339 (FIG. 31) may be formed in the radially outer surface of the inside chassis spindle 330. Further details regarding the recess 339 and the function thereof are provided below with reference to FIGS. 31 and 32.

The key cam sleeve 340 is captured between the outside drive spindle 230 and the housing bracket 320, and functions as an adapter between the outside drive spindle 230 and the key cam 400. The key cam sleeve 340 acts as a bearing and maintains the keycam 400 centered within the outside drive spindle 230. The use of the key cam sleeve 340 as an adapter enables the outside drive spindle 230 and the inside drive spindle 134 to be provided in the same configuration, thereby reducing manufacturing costs. It is also contemplated that the key cam sleeve 340 may be integrally formed with the outside drive spindle 230 such that the outside drive spindle 230 itself maintains the position of the key cam 400. Thus, in certain embodiments, the key cam sleeve 340 may be omitted.

The key cam sleeve 340 includes a tubular body portion 342 having a collar 344 formed at a distal end thereof. The collar 344 rests against the proximal wall 322, and the key cam sleeve 340 closely receives the key cam 400 to center the key cam 400 within the outside drive spindle 230. Additionally, the body portion 342 is configured to be received in and matingly engage with the outside drive spindle 230. While other forms of engagement are contemplated, the illustrated key cam sleeve 340 includes a pair of external splines 346 configured to be received in the coupling slots 236 of the outside drive spindle 230 to rotationally couple the sleeve 340 with the drive spindle 230. When so engaged, the locking slot 238 of the drive spindle 230 is aligned with a locking slot 348 that extends proximally from the distal end of the sleeve 340. When the spindle 230 is in a home position, the receiving slots 238, 348 are aligned with the locking slot 228 of the outside housing 220.

The splines 346 may further provide for increased ease of assembly by enabling insertion of the key cam sleeve 340 into the outside drive spindle in only a single orientation. For example, the splines 346 may have different widths, and the coupling slots 236 of the outside drive spindle 230 may have corresponding widths such that the wider of the splines 346 will only fit in the wider of the coupling slots 236. Such mistake-proofing features may serve to ensure that the key cam sleeve 340 is inserted into the outside drive spindle in the correct orientation, in which the slots locking slots 238, 348 are aligned with one another.

The plunger catch 350 is slidably mounted in the shuttle 360 and is movable relative to the shuttle 360 in the lateral directions ($Y^+$, $Y^-$). The plunger catch 350 includes a pair of longitudinally-spaced catch arms 352, each of which includes a notch 354. As described in further detail below, the plunger catch 350 is operable to selectively retain certain configurations of the lockset 100 in a locked state.

The shuttle 360 is slidably mounted within the housing assembly 302, and is laterally movable between an extended or laterally outward position and a retracted or laterally inward position. An opening 361 extends through the longitudinal dimension of the shuttle 360, and facilitates interaction between components positioned on opposite sides of the shuttle 360. The shuttle 360 also includes a slot 362 that is formed on a laterally-outward side thereof, and which is generally aligned with the side opening 316 of the housing 310. The slot 362 is configured to receive a portion of the bolt bar 155 of the latchbolt mechanism 150, and is defined in part by a pair of longitudinally-extending lips 369. The lips 369 are configured to engage the bolt bar 155 such that the latchbolt 154 retracts in response to movement of the shuttle 360 in the laterally-inward direction ($Y^-$).

The shuttle 360 also includes a set of ramps configured to cause laterally-inward movement in response to rotation of either of the key cam shell 410 or the inside chassis spindle 330 from the home position thereof. A pair of distal ramps 363 are formed on a distal protrusion 364, which projects distally beyond a distal face 367 of the shuttle 360. With the chassis 300 assembled, the ear 336 of the inside chassis spindle 330 abuts the distal face 367, and each ramp 363 is adjacent an edge of the ear 336. The distal ramps 363 are configured to engage the ear 336 such that rotation of the spindle 330 from the home position in either direction is operable to move the shuttle 360 toward its retracted position. Similarly, a pair of proximal ramps 365 are formed on a pair of proximal protrusions 366, which project proximally beyond a proximal face 368 of the shuttle 360. The proximal ramps 365 are configured to engage an ear 416 of the key cam shell 410 such that rotation of the shell 410 from the home position in either rotational direction drives the shuttle 360 toward its retracted position.

The biasing assembly 370 includes a catch spring 375 engaged with the plunger catch 350, and a pair of shuttle springs 376 engaged with the shuttle 360. The catch spring 375 is mounted to the first anchor post 327, and biases the plunger catch 350 in the laterally outward direction ($Y^+$) toward the extended position thereof. Each of the shuttle springs 376 is mounted to a corresponding one of the second anchor posts 328, and the shuttle springs 376 bias the shuttle 360 in the laterally outward direction ($Y^+$) toward the extended position thereof The fire plate 380 includes a central opening 382 and a pair of recesses 384 that are defined by an outer edge of the fire plate 380. With the chassis 300 assembled, the proximal side of the fire plate 380 abuts the ear 416 of the key cam shell 410, and the distal side of the fire plate 380 abuts the proximal face 368 of the shuttle 360. The proximal protrusions 366 of the shuttle 360 extend through the recesses 384 such that the proximal ramps 365 are operable to engage the ear 416 of the key cam shell 410. The recesses 384 are sized and shaped such that the edges of the fire plate 380 do not interfere with the protrusions 366 as the shuttle 360 moves between its extended and retracted positions. Additionally, the opening 382 provides a path through which one or more components may extend to facilitate interaction between the key cam 400 and components on the opposite side of the fire plate 380. Examples of components configured to interact with the key cam 400 in such a manner are provided below with reference to FIG. 10.

The mounting bracket 390 may facilitate the installation of one or more components not specifically illustrated in FIG. 2, such as one or more sensors. In the illustrated embodiment, the mounting bracket 390 is configured to facilitate the installation of a request-to-exit (REX) sensor that detects rotation of the inside chassis spindle 330, and is accordingly formed in close proximity to the spindle 330. It is also contemplated that the mounting bracket 390 may be formed in another location, for example to facilitate the installation of other types of sensors. Further details regarding the illustrated mounting bracket 390 are provided below with reference to FIGS. 31 and 32.

With the chassis assembly 200 assembled and installed to the door 80, the chassis 300 performs several tasks, including blocking the passage of fire, aligning and supporting the chassis housing 310, supporting the outside spindle 230, guiding and supporting the shuttle 360, and aligning and supporting the inside chassis spindle 330. As described in further detail with reference to FIGS. 31 and 32, the chassis 300 may also serve to align and support a request to exit (REX) sensor. In certain existing cylindrical-type locksets, the performance of these tasks is distributed among several distinct components. In the illustrated chassis 300, by contrast, each of these tasks is performed at least in part by the housing 310, which may lead to improved performance.

As one example, the outside drive assembly of certain conventional cylindrical locksets includes a mounting plate that maintains the longitudinal position of the outside drive spindle relative to the outside housing. In such locksets, the chassis may include a fire cup for discouraging the passage of fire through the cross-bore. However, there is typically a gap formed between the mounting plate and the fire cup, which may facilitate the passage of fire. By contrast, the flange 318 of the illustrated fire cup 310 abuts the outer surface 82 of the door 80, thereby covering the gap that may be provided in certain conventional locksets.

The illustrated fire cup 310 may also provide mounting features in addition or as an alternative to the mounting bracket 390. Such additional mounting features may facilitate the mounting of various components to the fire cup without the use of additional fasteners, and may, for example, be provided as openings configured for use in snap-fit couplings, press-fit couplings, and/or staking operations. The fire cup 310 also acts as a bearing surface for the outside spindle 230, and transfers axial loads from the outside spindle 230 to the door 80. The outside spindle 230 is trapped between the fire cup 310 and the outside spring cage housing 220. This arrangement may eliminate the need for the retaining ring that is utilized in certain conventional assemblies to retain the longitudinal position of the outside spindle relative to the outside spring cage housing.

With additional reference to FIG. 4, the key cam shell 410 includes a tubular body portion 412 defining a chamber 413, a proximal wall 414 having a bowtie opening 415 connected with the chamber 413, and a distal ear 416 configured to engage the proximal ramps 365 of the shuttle 360 in the manner described above. The bowtie opening 415 has a generally circular portion, and is defined in part by a pair of teeth 411 that project radially inward and define engagement surfaces. The bowtie opening 415 has a minor diameter 417 defined between the teeth 411, and a major diameter 418 defined by the generally circular portion.

The body portion 412 defines a pin opening 419 and a lug opening 480, each of which is in communication with the chamber 413. The lug opening 480 is substantially T-shaped, and includes a partial circumferential slot or arc slot 482 that subtends a predetermined angle about the rotational axis of the body portion 412, and a longitudinal slot 484 that extends from the distal end of the body portion 412 to the arc slot 482. The arc slot 482 and the longitudinal slot 484 intersect one another at an intersection 486, and each of the arc slot 482 and longitudinal slot 484 may be considered to include the intersection 486. Each of the slots 482, 484 further includes at least one slot portion connected with the intersection 486. More specifically, the arc slot 482 includes a pair of arc slot portions 483 positioned on opposite sides of the intersection 486, and the longitudinal slot 484 includes a longitudinal slot portion 485 extending between the intersection 486 and the distal end of the body portion 412.

The key cam plug 420 includes a tubular body portion 422, and a post 424 that extends from the body portion 422 in the proximal direction ($X^+$). The body portion 422 defines a chamber 423, and the post 424 defines a bowtie opening 425 in communication with the chamber 423. The body portion 422 has a greater diameter than the post 424, such that a shoulder 421 is formed at a proximal end of the body portion 422. The body portion 422 also defines a pin opening 426 that is in communication with the chamber 423, and which is partially delimited by a first longitudinally-extending edge 427, a second longitudinally-extending edge 428, and a distal-facing edge 429 extending between the longitudinal edges 427, 428.

The lock control lug 430 includes an annular portion 432 and a lock control arm 438 extending radially outward from the annular portion 432. The annular portion 432 defines an opening 433 sized and configured to receive the plug post 424, on which the lock control lug 430 is movably mounted. A biasing member in the form of a spring 403 is engaged between the shell proximal wall 414 and the annular portion 432, thereby biasing the lug 430 in the distal direction ($X^-$) and into engagement with the shoulder 421 of the plug 420. As a result, the spring 403 also biases the plug 420 in the distal direction ($X^-$).

The lock control arm 438 is sized and configured to extend through the lug opening 480, which allows for limited relative movement of the shell 410 and the lug 430. More specifically, relative rotational movement is enabled when the arm 438 is received in the arc slot 482, and relative longitudinal movement is enabled when the arm 438 is received in the longitudinal slot 484. Thus, when the arm 438 is positioned in the intersection 486, both relative longitudinal movement and relative rotation are permitted. Conversely, when the arm 438 is not positioned in the intersection 486, the shell 410 and the lug 430 are coupled for joint longitudinal movement or for joint rotational movement. For example, when at least a portion of the arm 438 is positioned in one of the arc slot portions 483, the shell 410 and the lug 430 are longitudinally coupled and rotationally decoupled. Similarly, when at least a portion of the arm 438 is positioned in the longitudinal slot portion 485, the shell 410 and the lug 430 are rotationally coupled and longitudinally decoupled. Due to the fact that the longitudinal position of the shell 410 is fixed within the chassis, the lug 430 is only free to move longitudinally when the shell 410 and the lug 430 are longitudinally decoupled.

The key cam stem 440 includes a body portion 442, which includes a base 443, a post 444 extending from the base 443 in the proximal direction ($X^+$), and a cavity 445 that extends through the base 443 and into the post 444. The post 444 is sized and shaped to be received in the chamber 423 of the plug 420 such that the body portion 422 supports the stem 440 for sliding and rotational movement. Additionally, the base 443 is configured to abut the distal end of the plug 420 to limit relative longitudinal movement of the plug 420 and the stem 440. The stem 440 also includes a cam rider in the form of a pin 446, which is mounted on the post 444 and extends radially outwardly into the pin openings 419, 426 of the shell 410 and plug 420.

The cam mechanism 450 includes a cam surface 452 defined by the distal-facing edge 429 of the plug 420, and may be considered to further include the pin 446 of the stem 440. The cam surface 452 includes a proximal landing 454 adjacent the first sidewall 427, a distal landing 456 adjacent the second sidewall 428, and a helical ramp 458 extending between and connecting the proximal landing 454 and the distal landing 456. The proximal landing 454 is configured to receive or engage the pin 446 when the base 443 of the stem 440 is in abutment with the distal end of the plug 420. The distal landing 456 is likewise configured to receive or engage the pin 446, and is defined in part by a minor ramp 457 that extends distally from the apex of the helical ramp 458. As described in further detail below, the helical ramp 458 is configured to engage the pin 446 to effect relative longitudinal movement of the plug 420 and the stem 440 in response to relative rotation of the plug 420 and the stem 440.

Figure 5:
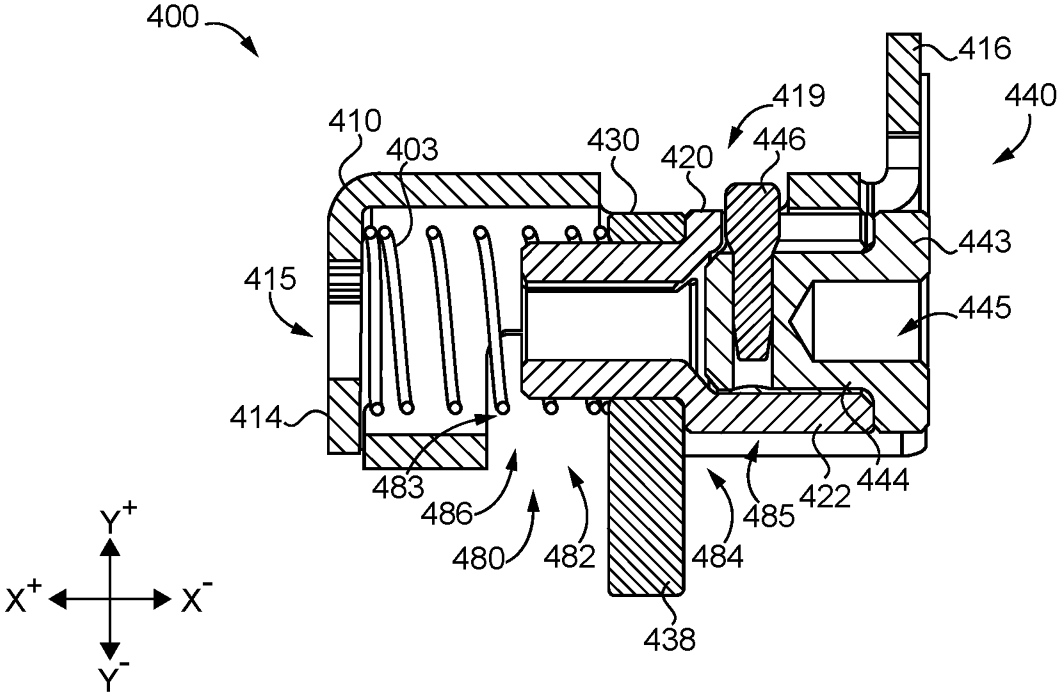
FIG. 5 is a cross-sectional view of the key cam illustrated in FIG. 4, with the key cam assembled and in an unlocking state.

FIG. 5 illustrates the key cam 400 assembled and in an unlocking state, in which the lug 430 is in an unlocking position. With the lug 430 in the unlocking position, the arm 438 is received in the longitudinal slot portion 485. As such, the shell 410 and the lug 430 are rotationally coupled with one another, and the lug 430 is capable of moving proximally ($X^+$) toward a locking position in which the arm 438 is received in the intersection 486. The illustrated key cam 400 is configured to move the lug 430 between the locking and unlocking positions in response to relative rotation of the plug 420 and the stem 440.

With the key cam 400 in its unlocking state, the pin 446 of the stem 440 is positioned at the proximal landing 454 of the cam surface 452. Accordingly, the proximal landing 454 may alternatively be referred to as the unlocking landing 454. With the pin 446 so positioned, relative rotation of the plug 420 and the stem 440 in a locking direction causes the pin 446 to travel along the helical ramp 458, thereby urging the plug 420 in the proximal locking direction ($X^+$). As the lug 430 approaches the locking position, the pin 446 comes into contact with the distal landing 456, which holds the lug 430 in the locking position against the biasing force of the spring 403. Accordingly, the distal landing 456 may alternatively be referred to as the locking landing 456. With the pin 446 engaged with the distal landing 456, the minor ramp 457 serves to discourage relative rotation of the plug 420 and the stem 440 in an unlocking direction.

With the key cam 400 in its locking state, relative rotation of the plug 420 and the stem 440 causes the pin 446 to travel along the minor ramp 457 and into engagement with the helical ramp 458. The biasing force of the spring 403 urges the lug 430 toward its unlocking position, which in turn drives the plug 420 in the distal direction ($X^-$). As the plug 420 moves in the distal direction ($X^-$), engagement between the helical ramp 458 and the pin 446 causes a corresponding rotation of the plug 420. When the lug 430 reaches the unlocking position, the pin 446 is once again engaged with the proximal landing 454, and the key cam 400 is in its unlocking state.

As is evident from the foregoing, the illustrated key cam 400 can be transitioned between the locking state and the unlocking state by causing relative rotation of the plug 420 and the stem 440. An example of a component that may be utilized to effect such relative rotation is described below with reference to FIG. **9*b*. The illustrated key cam 400 is also capable of being moved between its locking and unlocking states by longitudinally moving the stem 440 relative to the shell 410. For example, the key cam 400 may be transitioned from the unlocking state to the locking state by exerting a proximal pushing force on the stem 440, thereby causing the plug 420 to drive the lug 430 to the locking position. When the proximal pushing force is removed to enable movement of the stem 440 in the distal direction ($X^-$), the biasing force of the spring 403 returns the plug 420 and lug 430 to the positions illustrated in FIG. 5, thereby returning the key cam 400 to the unlocking state. Examples of components that may be utilized to effect such longitudinal movement of the stem 440 are provided below with reference to FIG. 10**.

Figure 6:
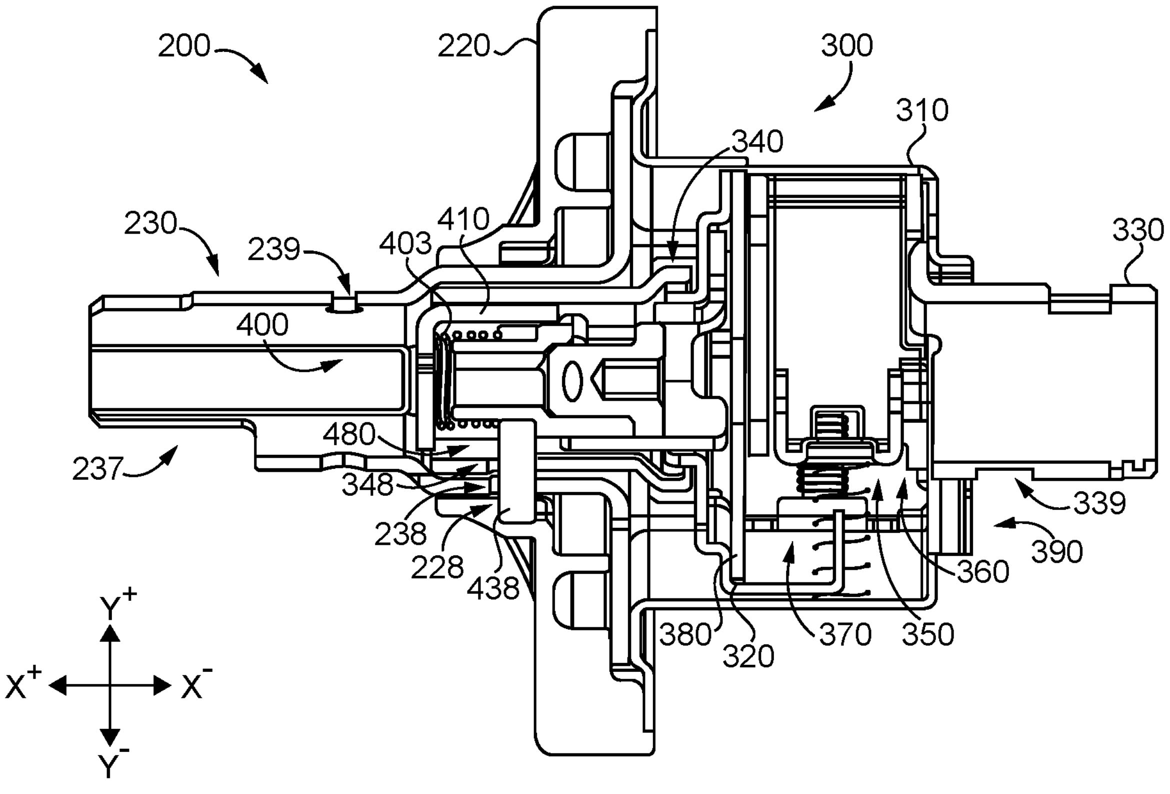
FIG. 6 is a cross-sectional illustration of the chassis illustrated in FIGS. 3*a* and 3*b*, with the chassis assembled and in a locking state.

With additional reference to FIG. 6, when the chassis assembly 200 is assembled, the lock control lug arm 438 extends into the receiving slot 238 of the outside drive spindle 230 via the receiving slot 348 of the key cam sleeve 340. When the lug 430 is in its unlocking position (FIG. 5), the arm 438 extends into the receiving slots 238, 348 via the longitudinal slot portion 485, thereby rotationally coupling the key cam shell 410 with the outside spindle 230. As a result, a handle mounted to the outside drive spindle 230 is capable of rotating the rotationally coupled components (i.e., the outside drive spindle 230, the key cam sleeve 340, and the key cam shell 410) to retract the shuttle 360. The outside handle is therefore unlocked, and is capable of retracting the latchbolt.

When the lug 430 is in its locking position (FIG. 6), the lock control lug arm 438 extends into the receiving slots 238, 348 through the intersection 486 of the lug opening 480, and the arc slot 482 permits relative rotation of the key cam shell 410 and the spindle 230. As a result, the outside spindle 230 is rotationally decoupled from the key cam shell 410, and therefore cannot rotate the shell 410 to drive the shuttle 360. The outside handle is therefore locked, and is not operable to retract the latchbolt.

In certain embodiments, the length of the lock control lug arm 438 may be selected such that the arm 438 does not extend into the locking slot 228 of the outside housing 220 when the lug 430 is in the locking position. In such forms, the outside spindle 230 and the lock control lug 430 remain free to rotate when the key cam 400 is in the locking state. However, such rotation causes the lock control lug arm 438 to enter one of the arc slot portions 483, and is thus not transmitted to the key cam shell 410. This rotational decoupling can provide the lockset 100 with freewheel-type locking, wherein the outside handle 104 is free to move through at least the majority of its normal range of rotation without causing retraction of the latchbolt 154.

In the illustrated form, the length of the lock control lug arm 438 is sufficient to extend through the receiving slots 238, 348 and project beyond the radially outer surface of the outside drive spindle 230. Additionally, when the spindle 230 is in the home position, the receiving slots 238, 348 are aligned with the locking slot 228 of the outside housing 220. When the key cam 400 is in its locking state, the arm 438 extends into the locking slot 228 through the receiving slots 238, 348, thereby rotationally coupling the outside spindle 230 with the outside housing 220. As a result, the outside handle 104 is locked stationary, and is prevented from retracting the latchbolt 154.

Certain conventional cylindrical locksets provide for stationary locking of the outside handle by engagement of a lock control lug with the chassis housing. As a result, the locked-lever load is transmitted to the door via the chassis. In the illustrated embodiment, by contrast, the lock control lug 430 is engaged with the outside spring cage housing 220. As a result, the locked-handle torque is transferred from the outside handle 104 along a load path that sequentially includes the lock control lug 430, the outside spring cage housing 220, the mounting posts 212, and finally the door 80. Thus, the chassis 300 is not included in the load path, which may allow for the components of the chassis 300 to be made from lower-cost, lower strength, and/or thinner materials, as compared to if the chassis 300 were required to resist the locked-handle loads.

Figure 7:
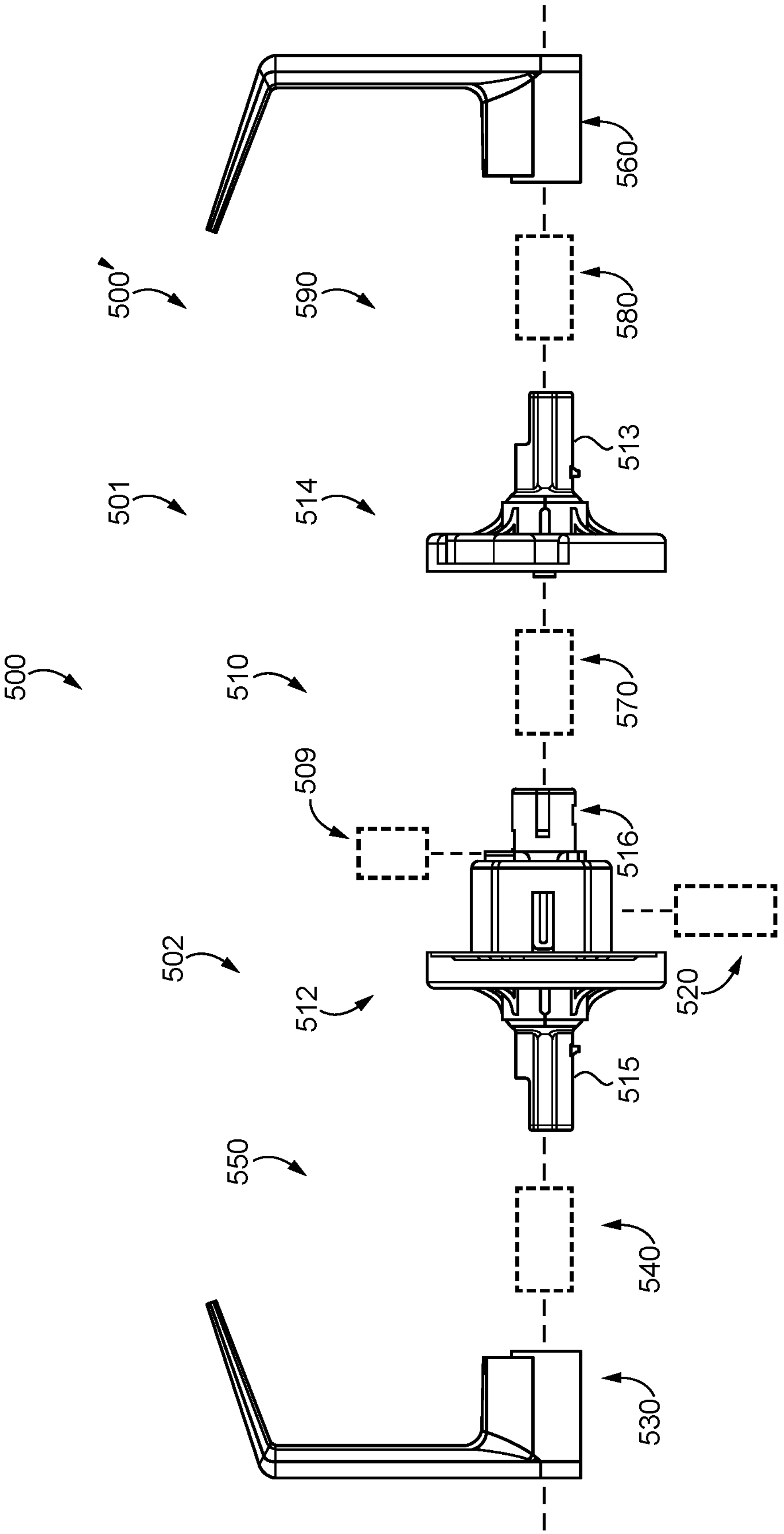
FIG. 7 is a schematic representation of a lockset kit according to certain embodiments.

FIG. 7 is a schematic representation of a modular lockset kit 500 according to certain embodiments. The lockset kit 500 includes a common platform 510 and a set 501 of modular peripheral components 502 configured to be installed to the common platform 510. The lockset kit 500 may, for example, be assembled to form a cylindrical lockset of the type described above with reference to FIG. 1. The common platform 510 includes a chassis assembly 512 and an inside drive assembly 514, which respectively correspond to the chassis assembly 180 and inside drive assembly 130 illustrated in FIG. 1. The inside drive assembly 514 includes an inside drive spindle 513, and the chassis assembly 512 includes an outside drive spindle 515 and an inside chassis spindle 516.

The peripheral component set 501 includes a latchbolt mechanism 520, an outside actuating assembly 550, and an inside actuating assembly 590, and may further include a sensor assembly 509. The outside actuating assembly 550 includes an outside handle 530 for mounting to the outside drive spindle 515, and may further include an outside actuating mechanism 540 configured to be mounted to the outside drive spindle 515 within the outside handle 530. The inside actuating assembly 590 includes an inside handle 560 for mounting to the inside drive spindle 513, and may further include an inside operating mechanism 570 configured to be mounted in the inside chassis spindle 516. In certain configurations, the inside actuating assembly 590 may further include an inside actuating mechanism 580 configured to be engage the inside operating mechanism 570 within the inside drive spindle 513 and the inside handle 560. In the illustrated embodiment, each of the sensor assembly 509, the latchbolt mechanism 520, the outside handle 530, the outside actuating mechanism 540, the inside handle 560, the inside operating mechanism 570, and the inside actuating mechanism 580 is provided as a modular peripheral component 502. In certain forms, the outside actuating assembly 550 and/or the inside actuating assembly 590 may themselves also be considered modular peripheral components 502.

The kit 500 may be associated with a product line system that includes the common platform 510, and which defines a component family for each of the modular components 502. Each component family may include a plurality of interchangeable component species, each of which component species is configured to cooperate with the common platform 510 to provide the lockset with a particular capability or characteristic. Thus, a lockset formed from the kit 500 may be provided with each and any of a plurality of functions by selecting an appropriate combination of component species for the peripheral component set 501. As the capability or characteristic provided by each component species is specific to one or more functions, the peripheral components 502 may alternatively be referred to herein as function-specific components 502.

In the illustrated embodiment, the kit is provided in the form of a lockset kit 500, from which a complete lockset of a particular function may be assembled. Accordingly, the lockset kit 500 includes the common platform 510 and a set 501 of modular peripheral components 502 that, when installed to the common platform 510, provide the assembled lockset with the set of characteristics and features corresponding to the particular function. It is also contemplated that a peripheral component set 501 corresponding to a particular function may be provided as a peripheral component kit 500' from which the common platform 510 is omitted.

Figure 8:
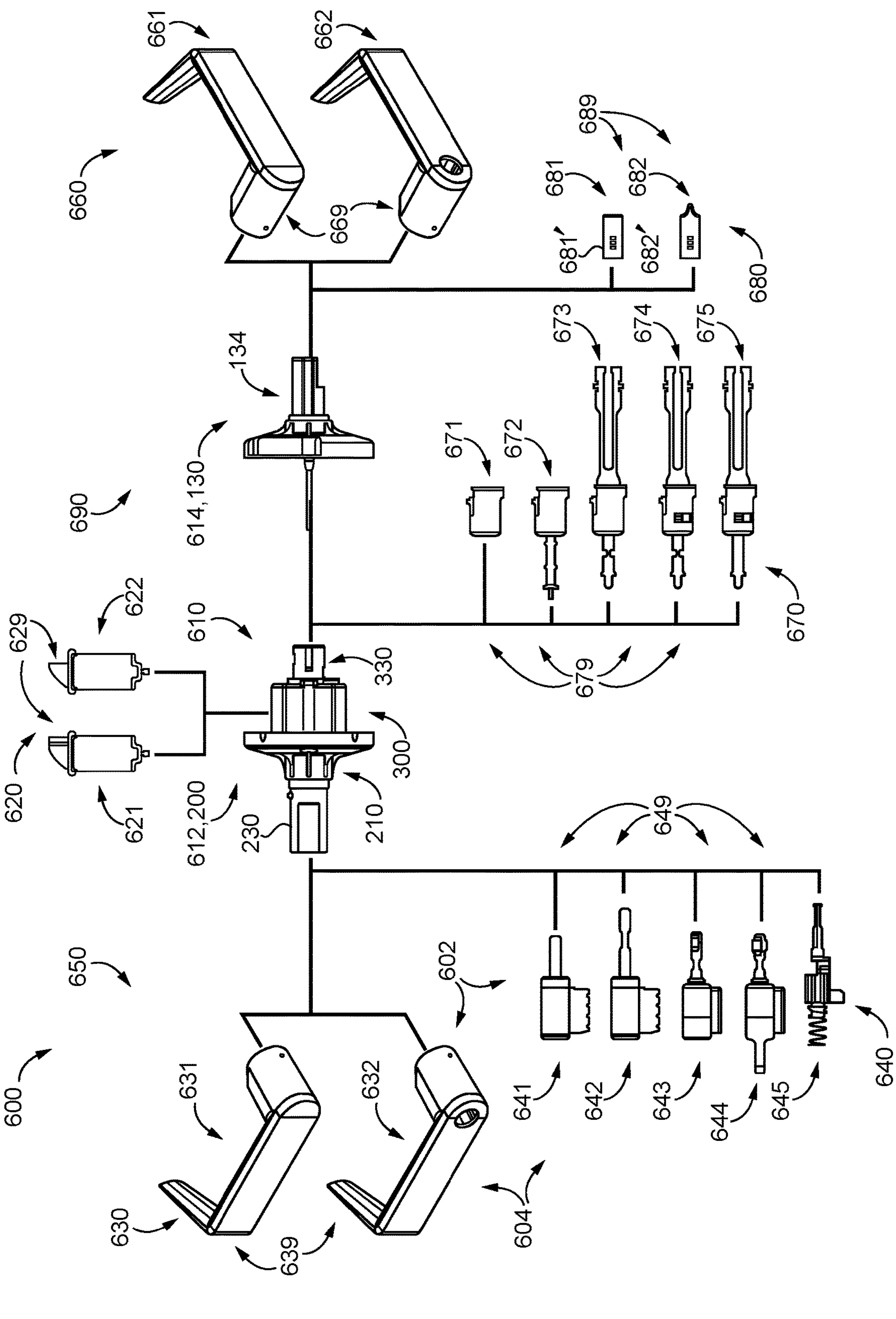
FIG. 8 is a schematic representation of a product line system according to certain embodiments.

With additional reference to FIG. 8, illustrated therein is one example of a product line system 600 which may be associated with certain embodiments of the kit 500. The system 600 includes a common platform 610 and a plurality of peripheral component families 604, and each of the component families 604 includes a plurality of component species 602. The common platform 610 is configured for use with each species 602 of each component family 604, and includes a chassis assembly 612 and an inside drive assembly 614. In the illustrated embodiment, the chassis assembly 612 is provided in the form of the above-described chassis assembly 200, and the inside drive assembly 614 is provided in the form of the above-described inside drive assembly 130.

Each modular component 502 of the kit 500 has a corresponding component family 604 in the product line system 600, and may be provided in the form of any component species 602 of the corresponding component family 604. Additionally, each of the component families 604 is provided with a reference character similar to that of the corresponding modular component 502. For example, the system 600 includes a latchbolt mechanism family 620, an outside actuating assembly family 650, and an inside actuating assembly family 690, which respectively correspond to the latchbolt mechanism 520, the outside actuating assembly 550, and the inside actuating assembly 590. Each of the outside actuating assembly family 650 and the inside actuating assembly family 690 also includes a plurality of component families 604 corresponding to the above-described modular components 502. For example, the outside actuating assembly family 650 includes an outside handle family 630 and an outside actuating mechanism family 640, which respectively correspond to the outside handle 530 and the outside actuating mechanism 540. Similarly, the inside actuating assembly family 690 includes an inside handle family 660, an inside operating mechanism family 670, and an inside actuating mechanism family 680, which respectively correspond to the inside handle 560, the inside operating mechanism 570, and the inside actuating mechanism 580. While not specifically illustrated in FIG. 8, the system 600 may further include one or more sensor assembly species corresponding to the sensor assembly 509 illustrated in FIG. 7. An example of such a sensor assembly species is described below with reference to FIGS. 31 and 32.

The latchbolt mechanism family 620 includes a plurality of latchbolt mechanism species 629, including a first latchbolt mechanism species 621 and a second latchbolt mechanism species 622. Each of the latchbolt mechanism species 629 corresponds to the above-described latchbolt mechanism 150, and includes a housing, a latchbolt movably seated in the housing, and a bolt bar configured for engagement with the shuttle 360. Additionally, each of the latchbolt mechanism species 629 is operable to retract the latchbolt thereof in response to retraction of the shuttle 360. The first latchbolt mechanism species 621 is also operable to deadlock the latchbolt in its extended position, and may alternatively be referred to as the deadlatching latchbolt mechanism species 621. The second latchbolt mechanism species 622 is configured to drive the shuttle 360 in its retracting direction when the latchbolt thereof is driven in its retracting direction, and may alternatively be referred to as the restoring latchbolt mechanism species 622. Further details regarding exemplary forms of the first and second latchbolt mechanism species 621, 622 are provided below with reference to FIG. 11. While two latchbolt mechanism species 621, 622 are illustrated, it is also contemplated that the latchbolt mechanism family 620 may include additional or alternative latchbolt mechanisms. For example, the latchbolt mechanism family 620 may further include a restoring deadlatching latchbolt for use when it is desired to have a push-button lock automatically unlock when the door is closed with a deadlatching latchbolt mechanism.

The outside handle family 630 includes a plurality of outside handle species 639, including a first outside handle species 631 and a second outside handle species 632. In the illustrated form, each of the outside handle species 639 corresponds to the above-described outside handle 104, and is provided in the form of a lever. More specifically, the first outside handle species 631 is provided in the form of the closed-face lever 160, and the second outside handle species 632 is provided in the form of the open-faced lever 160'. Thus, the first and second outside handle species 631, 632 may alternatively be referred to as the closed outside handle species 631 and the open outside handle species 632, respectively. While each of the illustrated outside handle species 639 is provided in the form of a lever, it is also contemplated that the outside handle family 630 may include additional or alternative forms of handles, such as knob-type handles. Additional outside handle species for different types of lock cylinders (e.g., interchangeable core lock cylinders) are also contemplated, but are not illustrated herein.

The outside actuating mechanism family 640 includes a plurality of outside actuating mechanism species 649, including first through fifth outside actuating mechanism species 641-645. Each of the outside actuating mechanism species 641-645 is operable to engage the key cam 400 in a particular manner. For example, the first outside actuating mechanism species 641 is operable to rotate the key cam shell 410 through a lost rotational motion connection, and the second outside actuating mechanism is operable to rotate the key cam plug 420 without rotating the key cam shell 410. Each of the third outside actuating mechanism species 643 and the fourth outside actuating mechanism species 644 includes a tailpiece configured for rotational coupling with the key cam shell 410, such that the third and fourth outside actuating mechanism species 643, 644 are operable to rotate the key cam shell 410 without lost rotational motion. Additionally, the fifth outside actuating mechanism species 645 is operable to prevent remocal of the outside handle on an exit-function lockset, as described herein.

Each of the first and second outside actuating mechanism species 641, 642 includes a lock cylinder, and may respectively be referred to as first and second cylinder-type outside actuating mechanism species 641, 642. As described herein, the rotational coupling provided by the third and fourth outside actuating mechanism species 643, 644 facilitates retraction of the latchbolt when the outside handle is locked, thereby providing for emergency override of the locked state. Accordingly, the third and fourth outside actuating mechanism species 643, 644 may alternatively be referred to as first and second override-type outside actuating mechanism species 643, 644. Additionally, the fifth outside actuating mechanism species 645 configured for use in exit-function locksets, and may alternatively be referred to as the exit-type outside actuating mechanism species 645. Further details regarding exemplary forms of the outside actuating mechanism species 641-645 are provided below with reference to FIG. 9, and further details regarding the operation thereof are provided below with reference to FIGS. 13-16.

The outside actuating assembly family 650 includes a plurality of outside actuating assembly species 659, each of which includes one of the outside handle species 639, and at least some of which further include a corresponding one of the outside actuating mechanism species 649. In the illustrated form, the outside actuating assembly family 650 includes first through sixth outside actuating assembly species 651-656 (FIG. 17). Each of the first through fourth outside actuating assembly species 651-654 includes the open outside handle species 632, and each of the fifth and sixth outside actuating assembly species 655, 656 includes the closed outside handle species 631. Each of the first through fifth outside actuating assembly species 651-655 further includes a corresponding and respective one of the first through fifth outside actuating mechanism species 641-645. For example, the first outside actuating assembly species 651 includes the first outside actuating mechanism species 641, and the third outside actuating assembly species 653 includes the third outside actuating mechanism species 643.

While the outside handle family 630 is illustrated as including a single open outside handle species 632, it is to be appreciated that the outside handle family 630 may include additional open-type handle species of different configurations. For example, if two or more of the outside actuating mechanism species 649 are configured for use with different geometries of the access port 169, the outside handle family 630 may include an open-type outside handle species for each of the different geometries. In certain embodiments, handles with access ports 169 of different geometries may be considered to be sub-species of the open outside handle species 632. By way of illustration, the outside handle family 630 may include a cylinder-type open handle species configured for use with the cylinder-type outside actuating mechanism species 641, 642, and an override-type open handle species configured for use with the override-type outside actuating mechanism species 643, 644.

As another example, the outside handle family 630 may include open handle species configured for use with different formats of lock cylinders, for example in embodiments in which the outside actuating mechanism family 640 includes cylinder-type outside actuating mechanism species of different formats. In the illustrated form, each of the cylinder-type outside actuating mechanism species 641, 642 includes a lock cylinder of the key-in-lever format, and the open outside handle species 632 is configured to receive such lock cylinders. It is also contemplated that the outside actuating mechanism family 640 may include additional or alternative outside actuating mechanism species 649, which may include lock cylinders of different formats. For example, one or more of the outside actuating mechanism species 649 may include a lock cylinder of an interchangeable core format, and one or more of the outside handle species 639 or subspecies may be configured to receive such lock cylinders.

The inside handle family 660 includes a plurality of inside handle species 669, including a first or closed inside handle species 661 and a second or open inside handle species 662. While other forms are contemplated, in the illustrated embodiment, the closed inside handle species 661 is substantially identical to the closed outside handle species 631, and the open inside handle species 662 is substantially identical to the open outside handle species 632. As will be appreciated, the inside handle family 660 may include additional species and/or subspecies in a manner analogous to that described above with reference to the outside handle family 630.

The inside operating mechanism family 670 includes a plurality of inside operating mechanism species 679, each of which includes a cup configured to be mounted in the inside chassis spindle 330. In the illustrated form, the inside operating mechanism family 670 includes first through fifth inside operating mechanism species 671-675. Each of the first inside operating mechanism species 671 and the second inside operating mechanism species 672 is configured to discourage tampering with the internal components of the common platform 610, and the second inside operating mechanism species 672 is further configured to retain the key cam 400 in its locking state. Each of the third through fifth inside operating mechanism species 673-675 is configured to facilitate manipulation of the key cam 400 from the secured region 73, and to at least one locking state. More specifically, the third inside operating mechanism species 673 is operable to provide a releasable locking state, the fifth inside operating mechanism species 675 is operable to provide a persistent locking state, and the fourth inside operating mechanism species 674 is operable to provide each of the releasable locking state and the persistent locking state.

As described herein, the first inside operating mechanism species 671 may alternatively be referred to as the inactive inside operating mechanism species 671, and the second inside operating mechanism species 672 may alternatively be referred to as the fixed inside operating mechanism species 672. Additionally, each of the third through fifth inside operating mechanism species 673-675 includes a plunger that, when manipulated by a user, sets the lockset in a corresponding one of the above-noted locking states. In the illustrated form, each of the third and fourth inside operating mechanism species 673, 674 provide the releasable locking state when the plunger thereof is pushed to a depressed position, and each of the fourth and fifth inside operating mechanism species 674, 675 provide the persistent locking state when the plunger thereof is depressed and rotated. The third through fifth inside operating mechanism species 673 may alternatively be referred to as the push-type inside operating mechanism species 673, the first push/turn inside operating mechanism species 674, and the second push/turn inside operating mechanism species 675, respectively. Further details regarding exemplary forms of the inside operating mechanism species 671-675 are provided below with reference to FIG. 10, and the operation thereof is described below with reference to FIGS. 12 and 13.

The inside actuating mechanism family 680 includes a plurality of inside actuating mechanism species 689, including a first inside actuating mechanism species 681 and a second inside actuating mechanism species 682. Each of the first inside actuating mechanism species 681 and the second inside actuating mechanism species 682 is configured for mounting to a corresponding one of the inside operating mechanism species 679. More specifically, the first inside actuating mechanism species 681 is a push-type inside actuating mechanism species 681 configured for use with the push-type inside operating mechanism species 673, and the second inside actuating mechanism species 682 is a push/turn inside actuating mechanism species 682 configured for use with each of the first and second push/turn inside operating mechanism species 674, 675. The first inside actuating mechanism species 681 and/or the second inside actuating mechanism species 682 may, be provided in the form of a button configured to be manually manipulated by a user. For example, the push-type inside actuating mechanism species 681 may be provided in the form of a push-button 681', and the push/turn inside actuating mechanism species 682 may be provided in the form of a push/turn button 682'.

The inside actuating assembly family 690 includes a plurality of inside actuating assembly species 699, each of which includes one of the inside handle species 669, and at least some of which further include a corresponding one of the inside operating mechanism species 679 and/or a corresponding one of the inside actuating mechanism species 689. As depicted in FIG. 17, the inside actuating assembly family 690 of the illustrated embodiment includes six inside actuating assembly species 691-696. Each of the first, second, and sixth inside actuating assembly species 691, 692, 696 includes the closed inside handle species 661, and each of the third through fifth inside actuating assembly species 693-695 includes the open inside handle species 662. Each of the first through fifth inside actuating assembly species 691-695 also includes a corresponding and respective one of the first through fifth inside operating mechanism species 671-675. For example, the first inside actuating assembly species 691 includes the first inside operating mechanism species 671, and the third inside actuating assembly species 693 includes the third inside operating mechanism species 673. The third inside actuating assembly species 693 further includes the push-button inside actuating mechanism species 681, and each of the fourth inside actuating assembly species 694 and the fifth inside actuating assembly species 695 includes the push/turn inside actuating mechanism species 682.

With additional reference to FIG. 9, illustrated therein are exemplary forms of the above-described species 641-645 of the outside actuating mechanism family 640. More specifically, a standard-type lock cylinder assembly 710 of the first cylinder-type outside actuating mechanism species 641 is illustrated in FIG. 9*a*, and a classroom-type lock cylinder assembly 720 of the second cylinder-type outside actuating mechanism species 642 is illustrated in FIG. 9*b*. Additionally, a tool-assisted override mechanism 730 of the first override-type outside actuating mechanism species 643 is illustrated in FIG. 9*c*, a manual override mechanism 740 of the second override-type outside actuating mechanism species 644 is illustrated in FIG. 9*d*, and a stop assembly 750 of the exit-type outside actuating mechanism species 645 is illustrated in FIG. 9*e*.

Figure 9A:
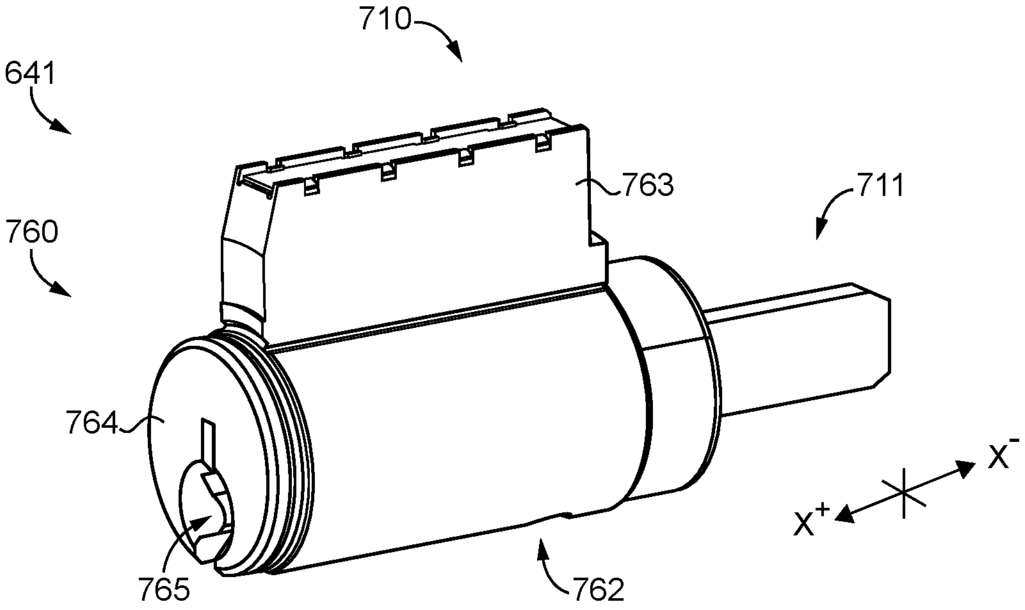
FIGS. 9*a*-9*e* are perspective views of outside actuating mechanisms according to certain embodiments.

With reference to FIG. 9*a*, an outside actuating mechanism 540 of the first cylinder-type outside actuating mechanism species 641 may be provided in the form of a standard-type lock cylinder assembly 710. The standard-type lock cylinder assembly 710 includes a lock cylinder 760 and a standard-type tailpiece 711. The lock cylinder 760 includes a shell 762 and a plug 764 rotatably mounted in the shell 762. The shell 762 includes a tower 763, which partially accommodates a tumbler system 768 (FIG. 15) that selectively prevents rotation of the plug 764 relative to the shell 762. The plug 764 includes a keyway 765 sized and configured to receive a corresponding key during operation. The lock cylinder 760 is configured to be mounted to the outside drive spindle 230 and within the chamber 163 of the open-faced lever 160'. When so mounted, the tower 763 extends through the slot 237 and into the channel 167, thereby providing for proper alignment of the lock cylinder 760 and rotational coupling of the shell 762 with the lever 160'.

With the lock cylinder assembly 710 mounted in the chamber 163 of the open-faced lever 160', the keyway 765 is accessible via the access port 169. When a proper key is inserted into the keyway 765, the tumbler system moves to an unlocking state, thereby permitting rotation of the plug 764 relative to the shell 762. The lock cylinder 760 may be of a conventional type known to those having skill in the art, and the manner in which the tumbler system selectively permits rotation of the plug 764 need not be described herein. The lock cylinder assembly 710 also includes a standard-type tailpiece 711 rotationally coupled with the plug 764. Rotation of the tailpiece 711 is operable to actuate the key cam 400 in the manner described below with reference to FIG. 12.

Figure 9B:
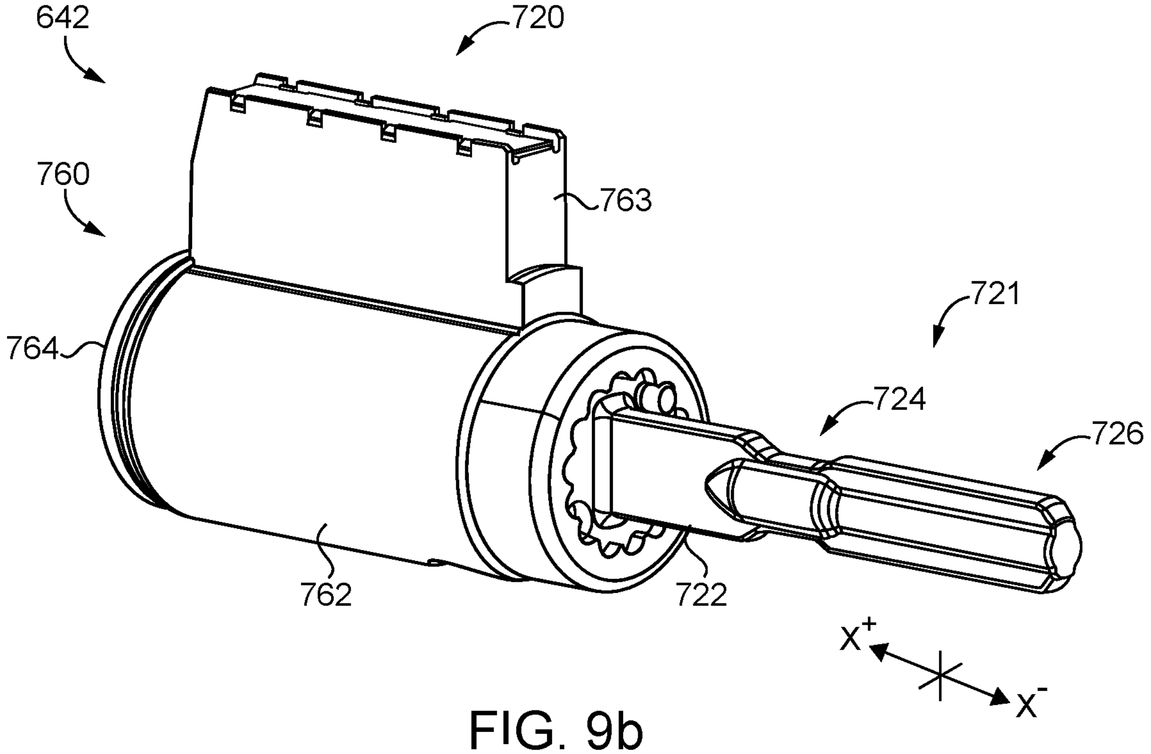

With reference to FIG. 9*b*, an outside actuating mechanism 540 of the second cylinder-type outside actuating mechanism species 642 may be provided in the form of a classroom-type lock cylinder assembly 720 including the lock cylinder 760 and a classroom-type tailpiece 721, which is rotationally coupled with the plug 764. The classroom-type tailpiece 721 has a greater length than the standard-type tailpiece 711, and includes a base portion or first wide section 722 formed adjacent the plug 764, an end portion defining a second wide section 726, and a narrowed section 724 defined between the wide sections 722, 726. With the lock cylinder assembly 720 installed to the common platform 610, rotation of the tailpiece 721 actuates the key cam 400 in the manner described below with reference to FIG. 15.

Figure 9D:
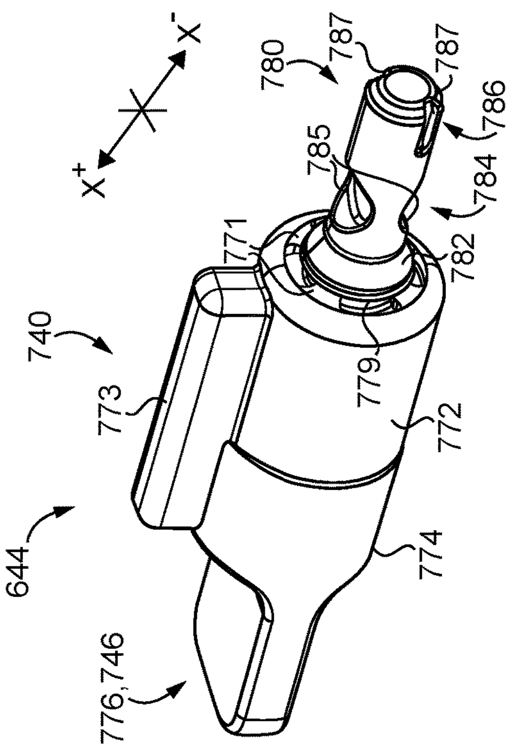
Figure 9C:
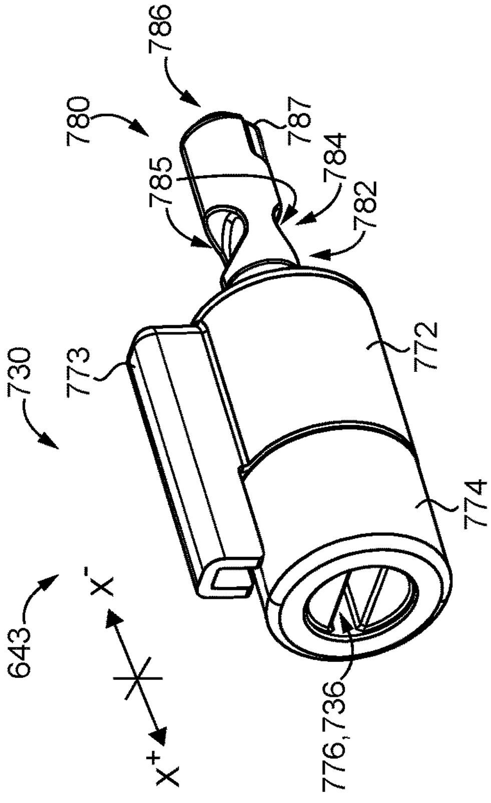

With reference to FIGS. 9*c* and 9*d*, an outside actuating mechanism 540 of the first override-type outside actuating mechanism species 643 may be provided in the form of a tool-assisted override mechanism 730, and an outside actuating mechanism 540 of the second override-type outside actuating mechanism species 644 may be provided in the form of a manual override mechanism 740. Each of the override mechanisms 730, 740 includes a shell 772, a plug 774 rotatably mounted in the shell 772, and a tailpiece 780. The shell 772 includes a tower 773, and has an open distal end including a plurality of flexible tabs 771. The tower 773 is operable to be received in the slot of a drive spindle (e.g., the slot 237 of the outside drive spindle 230), and may further be configured to extend into the channel 167 in the shank 162 of the open-faced lever 160'. A proximal end portion of the plug 774 defines an engagement feature 776 that facilitates rotation of the plug 774 by a user, and the plug 774 further includes an annular channel 779 operable to receive the tabs 771 of the shell 772. The tailpiece 780 extends from the distal end of the plug 774, and is rotationally coupled with the plug 774. In certain forms, the plug 774 and the tailpiece 780 may be integrally formed as a single-piece, monolithic structure.

During assembly, the plug 774 may be inserted into the shell 772 such that the distal end of the plug 774 engages the flexible tabs 771 and the tailpiece 780 extends through the open end of the shell 772. The shell 772 and the plug 774 may then be pushed into engagement with one another, thereby elastically deforming the tabs 771. When the tabs 771 become aligned with the channel 779, the tabs 771 flex inward and enter the channel 779, thereby rotatably coupling the shell 772 and the plug 774. While other forms are contemplated, the illustrated channel 779 extends about the entire circumference of the plug 774, thereby permitting unbounded relative rotation of the shell 772 and the plug 774. In other words, the shell 772 and the plug 774 are capable of relative rotation through angles of 360° and greater.

As indicated above, the proximal end portion of the plug 774 includes an engagement feature 776 that facilitates rotation of the plug 774 by a user. When mounted in the shank 162 of the open-faced lever 160', the engagement feature 776 is accessible via the access port 169, thereby facilitating manipulation of the plug 774 for rotation of the tailpiece 780. As used herein, a component that is described as being accessible via an opening may extend through the opening or may be aligned with the opening such that another element can be inserted into the opening to manipulate the accessible component. For the tool-assisted override mechanism 730, the engagement feature 776 is provided in the form of a slot 736. The slot 736 is configured to receive the tip of an appropriately-shaped tool, thereby facilitating tool-assisted rotation of the plug 774 and tailpiece 780. For the manual override mechanism 740, the engagement feature 776 is provided in the form of a manually graspable flange 746. With the override mechanism 740 mounted in the chamber 163 of the open-type outside handle species 632, at least a portion of the plug 774 extends through the access port 169 such that the flange 746 is positioned at least partially outside of the handle 104. As a result, a user can easily grasp the flange 746 and rotate the plug 774 and the tailpiece 780 without the use of a tool.

The tailpiece 780 includes a base portion 782 formed adjacent the plug 774, an intermediate portion 784, and an end portion 786. The intermediate portion 784 includes a pair of recesses 785 formed on opposite sides thereof, and may alternatively be referred to as the narrowed section 784. The end portion 786 is configured to be received in the bowtie opening 415 of the key cam shell 410, and includes a pair of grooves 787 operable to receive and engage the teeth 411 of the bowtie opening 415. Further details regarding the interaction of the tailpiece 780 and the key cam 400 are provided below with reference to FIG. 14.

Figure 9E:
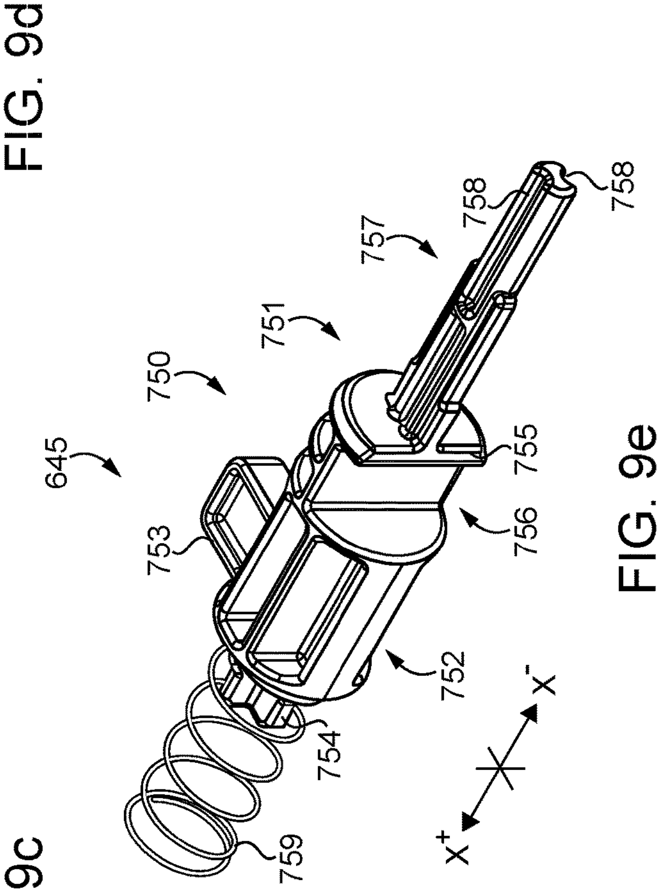

With reference to FIG. 9*e*, an outside actuating mechanism 540 of the exit-type outside actuating mechanism species 645 may be provided in the form of a stop assembly 750. The stop assembly 750 generally includes a stop member 751 and a biasing member in the form of a spring 759. The stop member 751 includes a body portion 752, a tower 753 extending radially from the body portion 752, and a post 754 extending from the proximal end of the body portion 752. The body portion 752 is configured to be received within the outside drive spindle 230, and the tower 753 is configured to be received in the slot 237. The tower 753 may further be configured to project beyond the radially outer surface of the spindle 230, such that the tower 753 extends into the channel 167 when the closed-face lever 160 is mounted to the outside drive spindle 230. In such forms, the tower 753 may provide for alignment and rotational coupling of the stop member 751 relative to the outside handle 104. The body portion 752 includes a distal end wall 755 and a recess 756 that is partially delimited by the end wall 755. The stop member 751 further includes a tailpiece 757 that extends distally from the end wall 755, and which includes a pair of longitudinal grooves 758. The spring 759 is seated on the post 754, and is operable to bias the stop member 751 in the distal direction ($X^-$) when the stop assembly 750 is mounted in the outside drive spindle 230 and the closed-face lever 160. Further details regarding the stop assembly 750 and the operation thereof are provided below with reference to FIG. 16.

With additional reference to FIG. 10, illustrated therein are exemplary forms of the above-described species 671-675 of the inside operating mechanism family 670. More specifically, an inactive cup 810 of the inactive inside operating mechanism species 671 is illustrated in FIG. 10*a*, and a fixed plunger 820 of the fixed inside operating mechanism species 672 is illustrated in FIG. 10*b*. Additionally, a push-type plunger assembly 830 of the push-type inside operating mechanism species 673 is illustrated in FIG. 10*c*, a first push/turn plunger assembly 840 of the first push/turn inside operating mechanism species 674 is illustrated in FIG. 10*d*, and a second push/turn plunger assembly 850 of the second push/turn inside operating mechanism species 675 is illustrated in FIG. 10*e*.

Figure 10A:
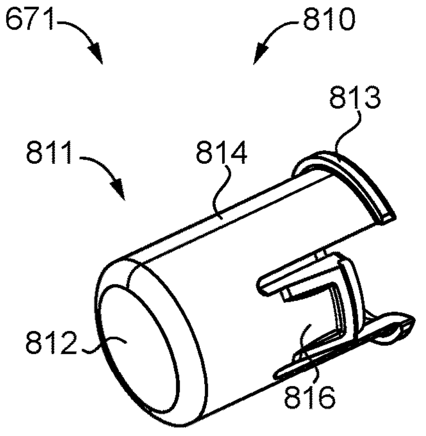
FIGS. 10*a*-10*e* are perspective views of inside operating mechanisms according to certain embodiments.
Figure 10B:
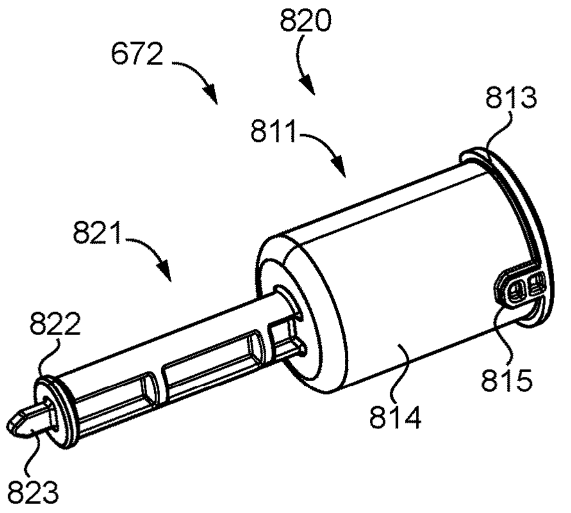

With reference to FIGS. 10*a* and 10*b*, an inside operating mechanism 570 of the inactive inside operating mechanism species 671 may be provided in the form of an inactive cup 810 (FIG. 10*a*), and an inside operating mechanism 570 of the fixed inside operating mechanism species 672 may be provided in the form of a fixed plunger 820 (FIG. 10*b*). Each of the inactive cup 810 and the fixed plunger 820 includes an anti-tamper cup 811. The anti-tamper cup 811 is configured to be mounted in the inside chassis spindle 330, and includes a proximal end wall 812, a distal rim 813, and a generally cylindrical sidewall 814 extending between and connecting the end wall 812 and the rim 813. The cup 811 further includes an alignment ridge 815 extending proximally from the distal rim 813, and a resilient coupling tab 816 positioned in a slot formed in the sidewall 814. The coupling tab 816 has a natural or undeformed state in which it projects radially outward beyond the cylindrical sidewall 814. Upon application of an appropriate radially inward force, the coupling tab 816 flexes to an elastically-deformed state. When the force is subsequently removed, the resiliency of the coupling tab 816 causes the tab 816 to flex outward toward its natural state.

During assembly, the cup 811 may be inserted into the inside chassis spindle 330 such that the alignment ridge 815 is aligned with the alignment notch 338. As the cup 810 is inserted, the wall of the spindle 330 urges the coupling tab 816 radially inward, thereby elastically deforming the coupling tab 816. As the cup 811 becomes more fully inserted, the alignment ridge 815 enters the alignment notch 338, and the coupling tab 816 becomes aligned with the coupling slot 337. When fully inserted, the rim 813 engages the distal end of the spindle 330, and a portion of the coupling tab 816 enters the coupling slot 337 as the tab 816 resiliently flexes toward its undeformed state. A portion of the spindle 330 is thus captured between the rim 813 and the tab 816, and the cup 811 is indexed to the spindle 330 by engagement of the alignment ridge 815 and the alignment notch 338. As a result, the cup 811 is coupled to the inside chassis spindle 330 in the longitudinal directions ($X^+$, $X^-$) as well as the rotational directions. The cup 811 may subsequently be removed from the spindle 330 by depressing the coupling tab 816, thereby enabling extraction of the cup 811.

With specific reference to FIG. 10*b*, the fixed plunger 820 includes the anti-tamper cup 811, and further includes a post 821 extending from the proximal end wall 812. The proximal end portion of the post 821 includes a shoulder 822 and a tip 823 that projects proximally beyond the shoulder 822. While other forms are contemplated, in the illustrated form, the tip 823 is provided as a substantially flat blade. Further details regarding the operation of the fixed plunger 820 are provided below with reference to FIG. 13.

Figure 10C:
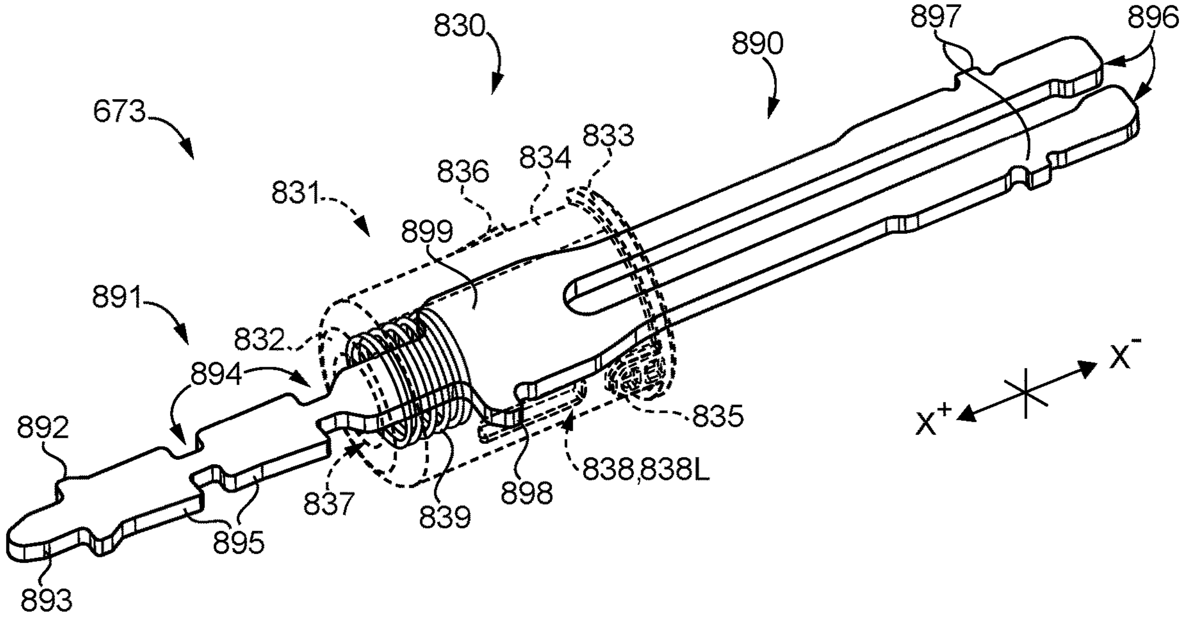

With reference to FIG. 10*c*, an inside operating mechanism 570 of the push-type inside operating mechanism species 673 may be provided in the form of a push-type plunger assembly 830. The push-type plunger assembly 830 includes a cup 831, a plunger 890 movably seated in the cup 831, and a biasing member in the form of a spring 839 seated in the cup 831 and engaged with the plunger 890. The cup 831 is substantially similar to the anti-tamper cup 811, and similar reference characters are used to indicate similar elements and features. For example, the cup 831 includes a proximal end wall 832, a distal rim 833, a generally cylindrical sidewall 834, an alignment ridge 835, and a coupling tab 836. The cup 831 also includes an opening 837 formed in the proximal end wall 832, and a guide slot 838 formed in the circumferential sidewall 834. Each of the opening 837 and the guide slot 838 is sized and configured to receive a respective portion the plunger 890. In the illustrated embodiment, the guide slot 838 is provided as a longitudinal slot 838L.

The illustrated plunger 890 is substantially planar, and includes a proximal portion defining a post 891, a distal portion defining a pair of prongs 896, and a central portion 899 from which the post 891 and prongs 896 extend. The post 891 includes a shoulder 892, a tip 893 that projects proximally beyond the shoulder 892, and a pair of longitudinally-spaced catch sections 894. Each of the catch sections 894 includes a pair of notches that define narrowed sections of the post 891, and each of the notches is defined in part by a proximal edge that extends substantially perpendicular to the longitudinal axis along which the plunger 890 travels relative to the cup 831. The narrowed catch sections 894 are bordered by enlarged sections of the post 891, which define abutment edges 895 operable to slide along the notches 354 of the catch arms 352.

The prongs 896 extend distally from the central portion 899, and include mounting features configured to engage the button-type inside actuating mechanism species 681, 682. For example, each of the prongs 896 may include a mounting tab 897, and each of the buttons 681', 682' may include a pair of mounting slots configured to matingly engage the mounting tabs 897. The plunger 890 further includes a guide arm 898 that extends laterally from the central portion 899 and into the guide slot 838. With the guide arm 898 received in the guide slot 838, the plunger 890 is limited to longitudinal movement between a proximal or depressed position and a distal or projected position. Additionally, the spring 839 is engaged between the central portion 899 and the proximal end wall 832, and biases the plunger 890 toward its distal or projected position.

The central portion 899 has a lateral width that is slightly less than the inner diameter of the cup 831. When the lateral length of the guide arm 898 is combined with the width of the central portion 899, the resulting dimension of the plunger 890 is slightly greater than the inner diameter of the cup 831. The flexible coupling tab 836 facilitates insertion of the plunger 890 during assembly, and aids in preventing removal of the plunger 890 when the cup 831 is installed to the inside chassis spindle 330. The cup 831 has a receiving portion that is operable to receive the central portion 899, and which is defined by the coupling tab 836 and the diametrically opposite surface of the cup 831. As such, the effective dimension of the receiving portion is variable due to the flexible nature of the tab 836.

With the tab 836 in its projected position, the receiving portion that is defined in part by the tab 836 has an effective dimension that is greater than the inside diameter of the cup 831. As a result, the central portion 899 and the guide arm 898 can be received in the receiving portion, thereby enabling the guide arm 898 to be received in the guide slot 838. The lateral width of the central portion 899 (excluding the guide arm 898) is small enough to permit the tab 836 to flex to its fully depressed position as the cup 831 is inserted into the inside chassis spindle 330. With the cup 831 fully inserted, the tab 836 is retained in a partially depressed position by the inner wall of the spindle 330. In this state, the effective dimension of the receiving portion corresponds to the inner diameter of the cup 831. As a result, the radially inner surface of the tab 836 limits radial movement of the plunger 890, thereby preventing the guide arm 898 from exiting the guide slot 838.

Figure 10D:
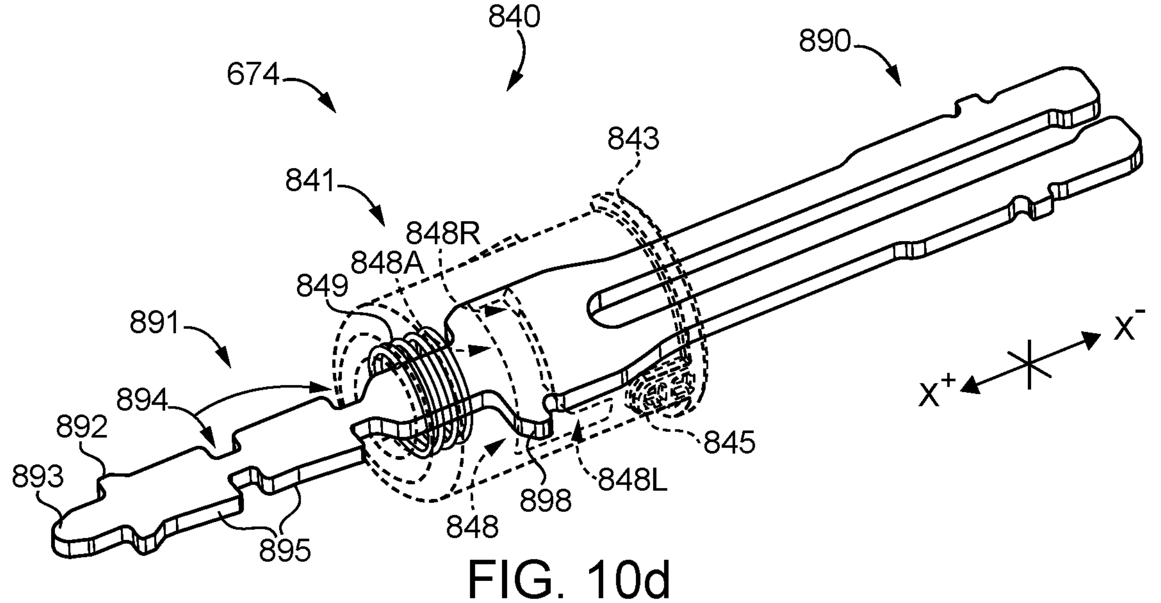

With reference to FIG. 10*d*, an inside operating mechanism 570 of the first push/turn inside operating mechanism species 674 may be provided in the form of a first push/turn plunger assembly 840. The first push/turn plunger assembly 840 includes a cup 841, a spring 849, and the plunger 890. The cup 841 is substantially similar to the cup 831 of the push-type plunger assembly 830, and similar reference characters are used to indicate similar elements and features. Like the above-described guide slot 838, the guide slot 848 of the cup 841 is configured to receive the guide arm 898, and includes a longitudinal slot 848L that provides the plunger 890 with a limited range of longitudinal movement between a proximal or depressed position and a distal or extended position. The guide slot 848 also includes an arc slot 848A that provides the plunger 890 with a limited range of rotational movement between a home position and a rotated position. The guide slot 848 may further include a recess 848R that, when engaged with the guide arm 898, discourages rotation of the plunger 890 from the rotated position toward the home position.

As described in further detail below, the first push/turn-button plunger assembly 840 has an unlocking state, a releasable locking state, and a persistent locking state. With the plunger assembly 840 in the unlocking state, the plunger 890 is in its distal longitudinal position and its home rotational position. In this state, the guide arm 898 is received in the longitudinal slot 848L, and the plunger 890 is longitudinally movable to its proximal longitudinal position to place the plunger assembly 840 in its releasable locking state. As described hereinafter, the plunger catch 350 may selectively retain the plunger 890 in its proximal position against the distal biasing force of the spring 849, thereby selectively retaining the plunger assembly 840 in its releasable locking state. In this state, the plunger 890 is in its proximal longitudinal position and its home rotational position, the guide arm 898 is aligned with the arc slot 848A, and the plunger 890 is rotatable to its rotated position.

From the releasable locking state, rotation of the plunger 890 to its rotated position places the plunger assembly 840 in its persistent locking state, in which the guide arm 898 is received in the arc slot 848A. In the illustrated form, the arc slot 848A includes a recess 848R that receives the guide arm 898 when the plunger assembly 840 is in its persistent locking state. With the guide arm 898 biased into engagement with the distal edge of the arc slot 848A by the spring 849, the recess 848R discourages rotation of the plunger 890 from the rotated position toward the home position. When a torque sufficient to overcome this rotational resistance is exerted on the plunger 890 (for example via the push/turn button 692'), the plunger 890 rotates toward its home position, and the plunger assembly 840 returns to its releasable locking state. When the plunger 890 becomes free to move distally along the longitudinal slot 848L, the spring 849 may return the plunger 890 to its distal position, thereby causing the plunger assembly 840 to return to its unlocking state.

Figure 10E:
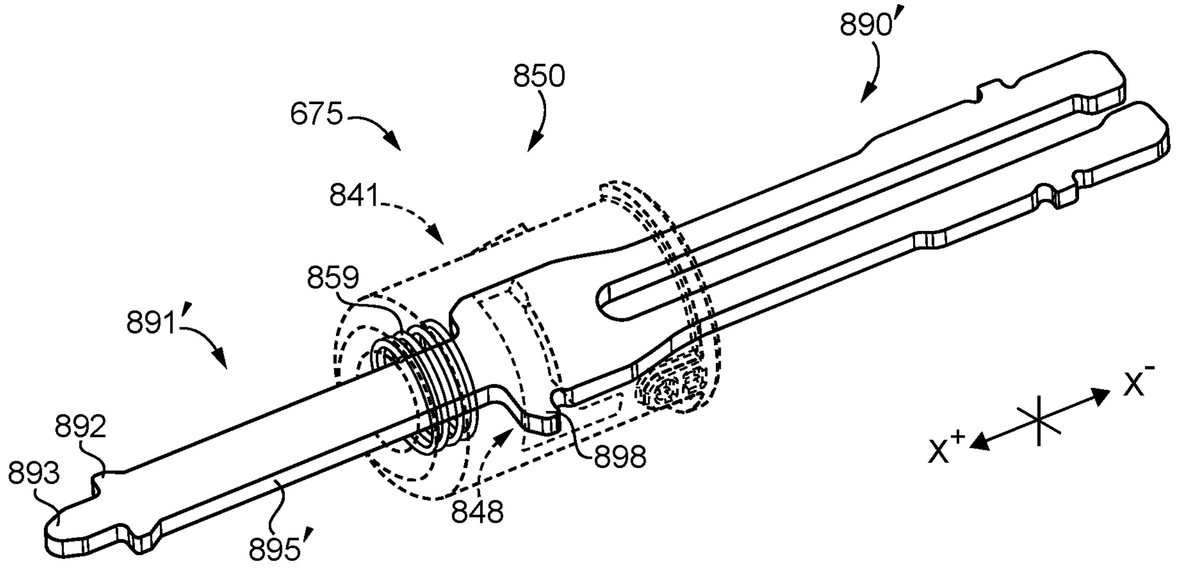

With reference to FIG. 10*e*, an inside operating mechanism 570 of the second push/turn inside operating mechanism species 675 may be provided in the form of a second push/turn plunger assembly 850. The second push/turn plunger assembly 850 is substantially similar to first push/turn plunger assembly 840, and includes the cup 841, a plunger 890' movably seated in the cup 841, and a spring 859 engaged between the cup 841 and the plunger 890'. The plunger 890' is substantially similar to the above-described plunger 890, and includes the prongs 896, the guide arm 898, and the central portion 899. The plunger 890' also includes a post 891', which includes the shoulder 892 and the tip 893. However, the post 891' does not include the catch sections 894 that are defined by the post 891 of the above-described plunger 890. As a result, each side of the post 891' defines a single continuous abutment edge 895'.

Figure 11A:
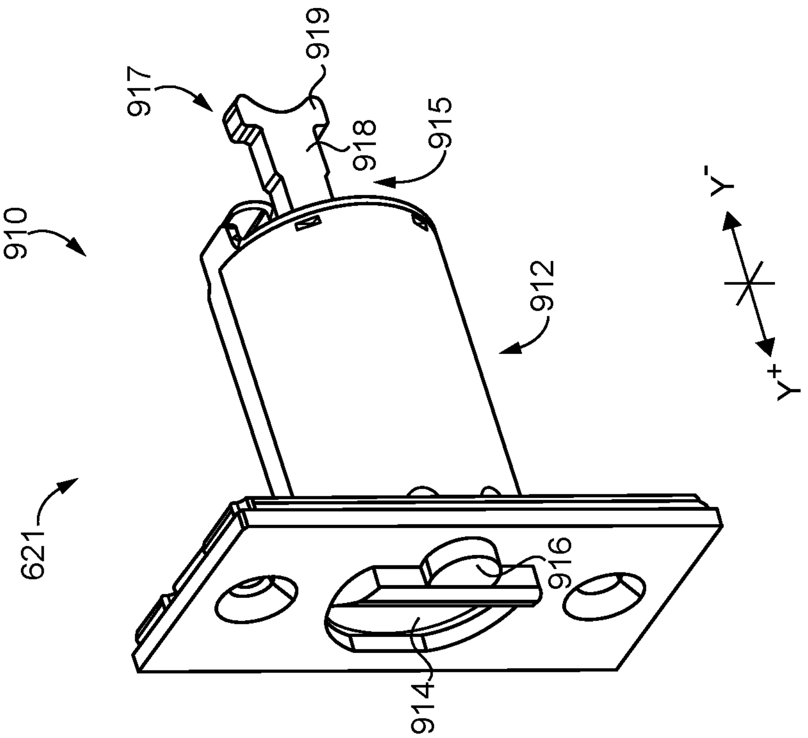
FIGS. 11*a* and 11*b* illustrate latchbolt mechanisms according to certain embodiments.
Figure 11B:
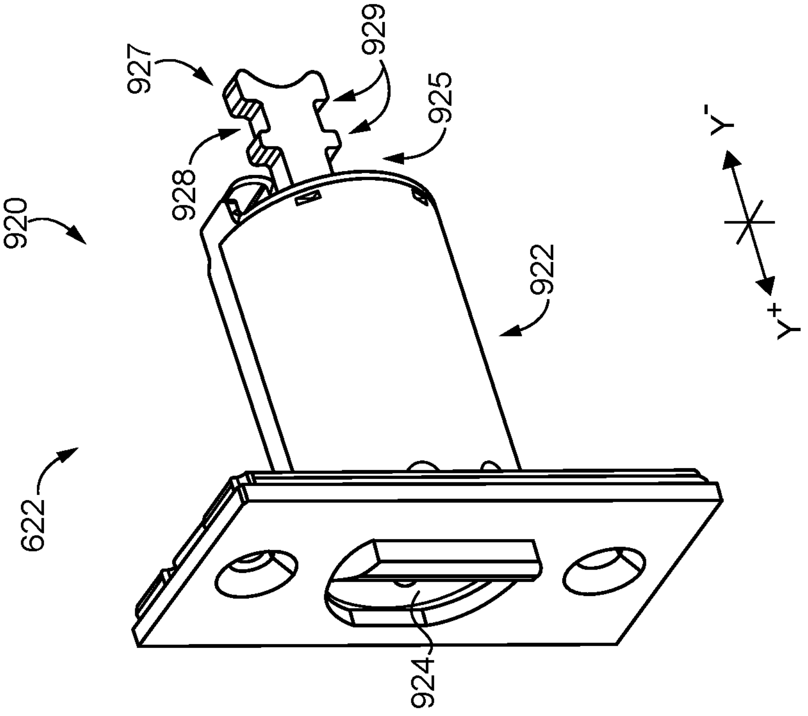

With additional reference to FIG. 11, illustrated therein are exemplary forms of the above-described species 621, 622 of the latchbolt mechanism family 620. More specifically, a deadlatching latchbolt mechanism 910 of the deadlatching latchbolt mechanism species 621 is illustrated in FIG. 11*a*, and a restoring spring-latch latchbolt mechanism 920 of the restoring latchbolt mechanism species 622 is illustrated in FIG. 11*b*.

With reference to FIG. 11*a*, a latchbolt mechanism 520 of the deadlatching latchbolt mechanism species 621 may be provided in the form of a deadlatching latchbolt mechanism 910. The deadlatching latchbolt mechanism 910 is one embodiment of the above-described latchbolt mechanism 150, and similar reference characters are used to indicate similar elements and features. For example, the illustrated latchbolt mechanism 910 includes a housing 912, a latchbolt 914 slidably mounted in the housing 912, a bolt bar 915 coupled with the latchbolt 914, and an auxiliary bolt 916 slidably mounted in the housing 912. In FIG. 11*a*, the latchbolt mechanism 910 is illustrated in an actuated state, in which the bolt bar 915 has been retracted. As a result, each of the latchbolt 914 and the auxiliary bolt 916 is in the retracted position thereof. The latchbolt mechanism 910 also includes a first spring biasing the latchbolt 914 toward its extended position, and a second spring biasing the auxiliary bolt 916 toward its extended position.

The deadlatching latchbolt mechanism 910 is configured to selectively retain the latchbolt 914 in its extended position when the auxiliary bolt 916 is in its retracted position. More specifically, when the auxiliary bolt 916 is held in the retracted position (e.g., by the strike plate 94 when the door 80 is in its closed position), a deadlocking member retains the latchbolt 914 in its extended position against externally-applied pushing forces on the latchbolt 914, while permitting retraction of the latchbolt 914 by the bolt bar 915. The deadlocking member may be provided in any of a number of forms known to those having skill in the art, and the deadlocking functionality of the latchbolt mechanism 910 need not be described in further detail herein.

The laterally-inward end portion of the bolt bar 915 includes an engagement feature 917 configured for unidirectional engagement with the shuttle 360. More specifically, the unidirectional engagement feature 917 is configured such that movement of the shuttle 360 in the laterally-inward retracting direction ($Y^-$) causes a corresponding retraction of the latchbolt 914, while movement of the latchbolt 914 from the extended position toward the retracted position (e.g., upon closing the door 80) does not cause a corresponding laterally-inward movement of the shuttle 360. In other words, the unidirectional engagement feature 917 is operable to transmit pulling forces from the shuttle 360 to the latchbolt 914, but does not transmit pushing forces from the latchbolt 914 to the shuttle 360. While other forms are contemplated, the illustrated unidirectional engagement feature 917 is substantially T-shaped, and includes a narrower section 918 and a wider end 919. When connected with the shuttle 360, the narrower section 918 extends through the shuttle slot 362 such that the housing 912 and the wide end 919 of the bolt bar 915 are positioned on opposite sides of the lips 369.

With reference to FIG. 11*b*, a latchbolt mechanism 520 of the restoring latchbolt mechanism species 622 may be provided in the form of a restoring spring-latch latchbolt mechanism 920. The restoring spring-latch latchbolt mechanism 920 includes a housing 922, a latchbolt 924 slidably mounted in the housing 922, and a bolt bar 925 coupled with the latchbolt 924. In FIG. 11*b*, the latchbolt mechanism 920 is illustrated in an actuated state, in which the bolt bar 925 has been retracted such that the latchbolt 924 is in its retracted position. The latchbolt mechanism 920 also includes a spring biasing the latchbolt 924 toward its extended position. Unlike the deadlatching latchbolt mechanism 910, the restoring spring-latch latchbolt mechanism 920 does not include deadlocking features, and the auxiliary bolt is accordingly omitted.

The laterally-inward end portion of the bolt bar 925 includes an engagement feature 927 configured for bidirectional engagement with the shuttle 360. More specifically, the bidirectional engagement feature 927 is configured to engage the lips 369 to couple the bolt bar 925 and shuttle 360 for joint movement in the laterally-inward retracting direction ($Y^-$). As a result, movement of the shuttle 360 in the laterally-inward retracting direction ($Y^-$) causes a corresponding retraction of the latchbolt 924, and movement of the latchbolt 924 from the extended position toward the retracted position (e.g., upon closing the door 80) causes a corresponding movement of the shuttle 360 in the laterally inward retracting direction ($Y^-$). Thus, the bidirectional engagement feature 927 is operable to transmit both pushing forces and pulling forces between the shuttle 360 and the latchbolt 924. While other forms are contemplated, the illustrated bidirectional engagement feature 927 is substantially H-shaped, and includes a narrower section 928 disposed between two wider sections 929. With the bolt bar 925 engaged with the shuttle 360, the narrower section 928 is received in the shuttle slot 362 such that the lips 369 are captured between the wider sections 929.

Figure 12A:
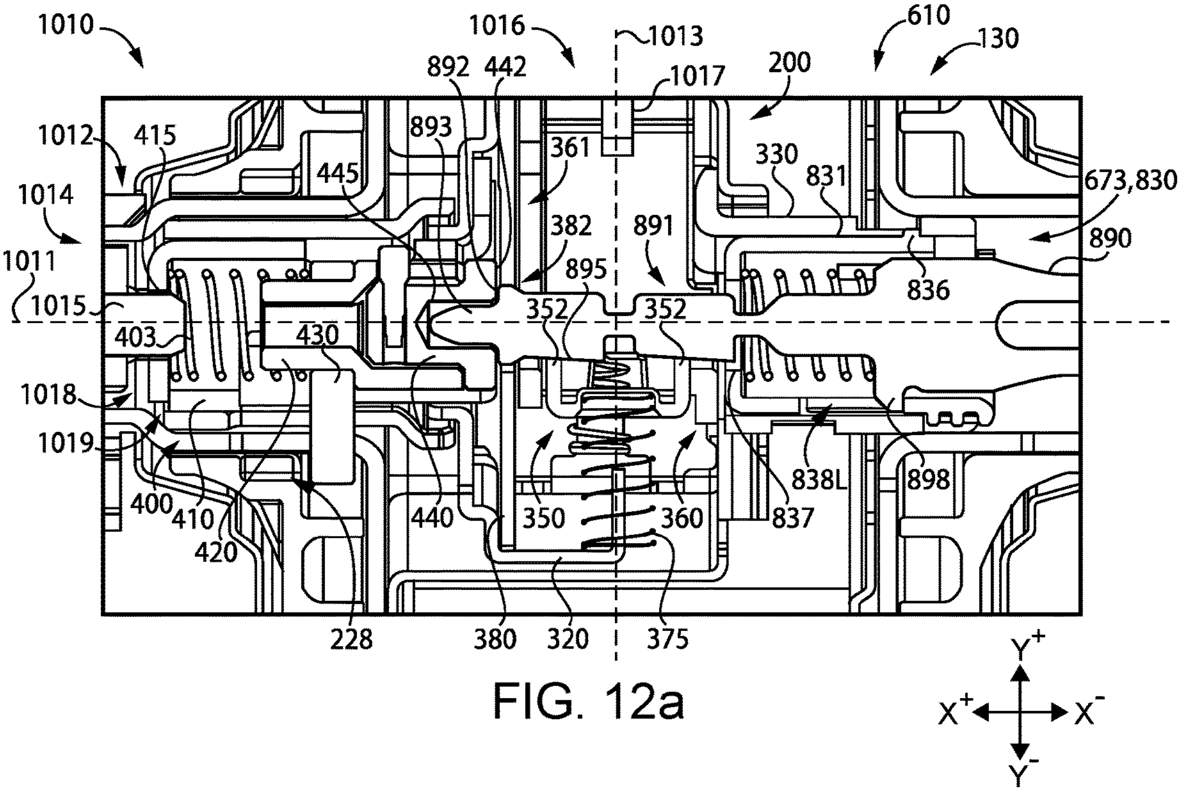
FIGS. 12*a* and 12*b* illustrate a lockset according to certain embodiments in an unlocked state and in a locked state, respectively.
Figure 12B:
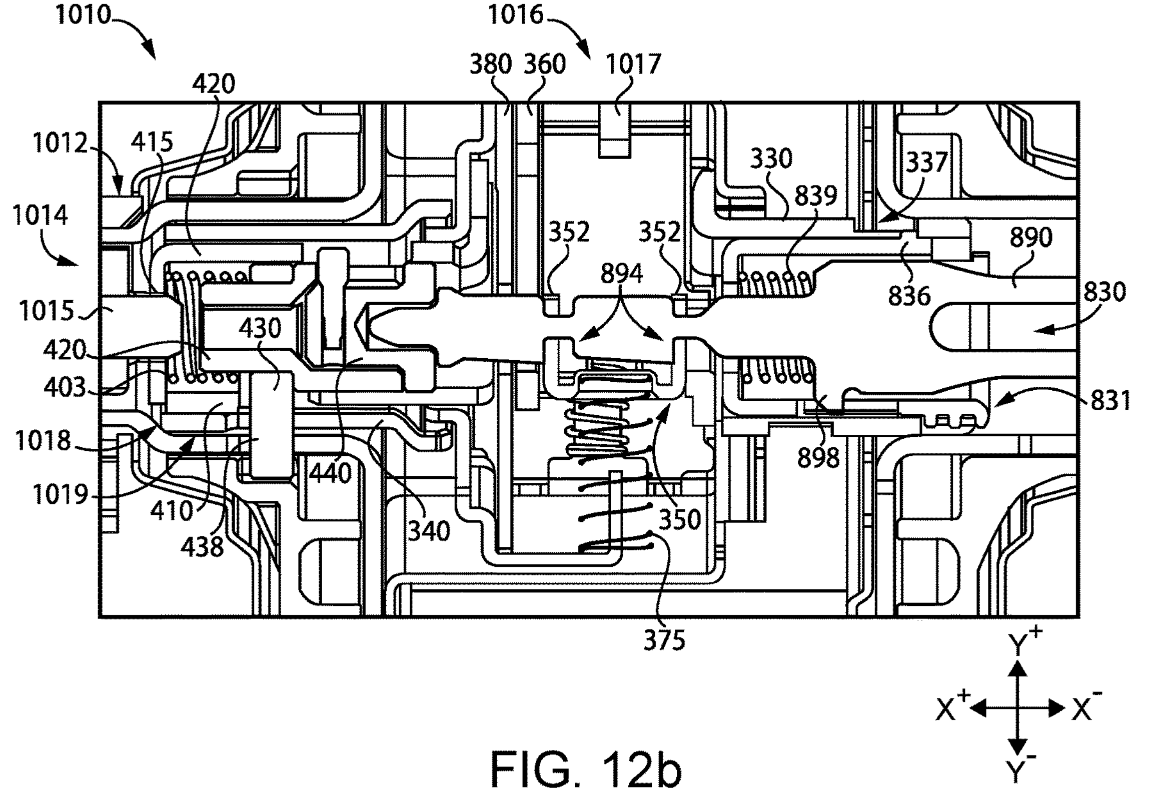
Figure 13:
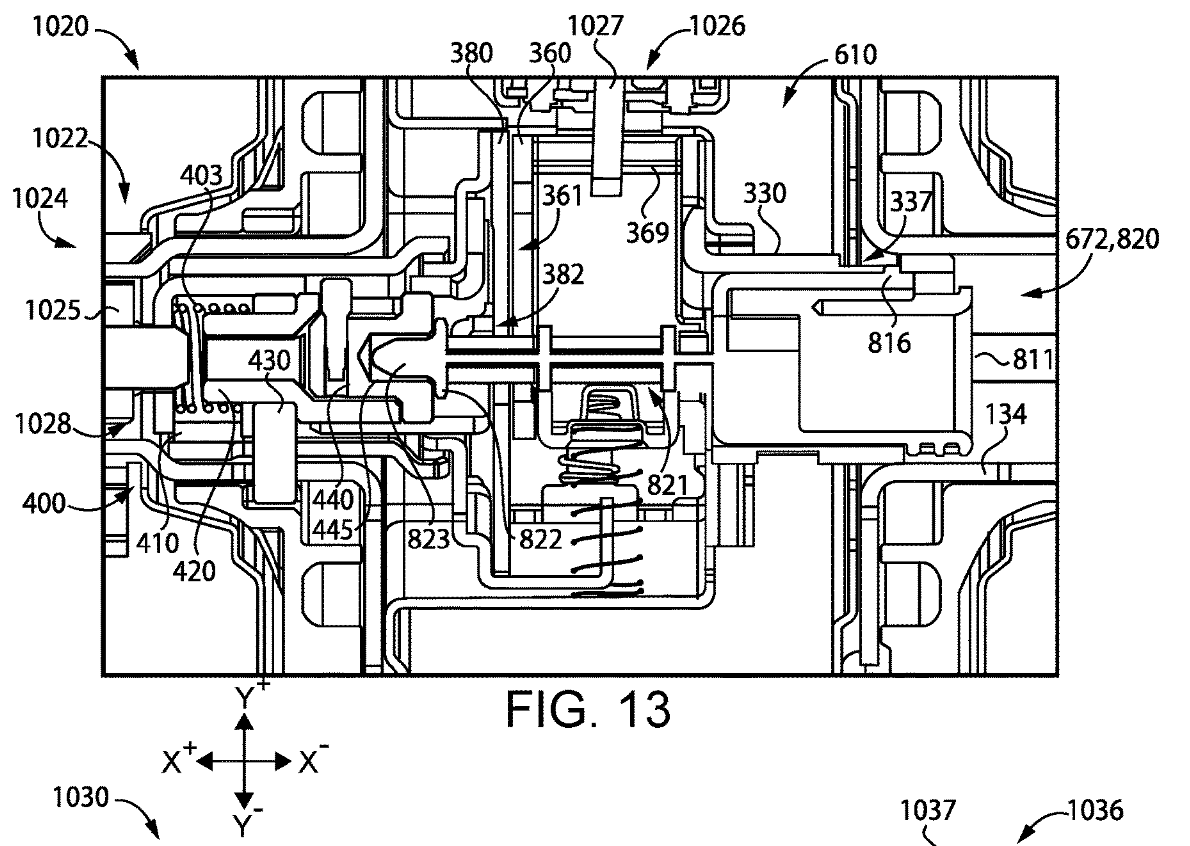
FIG. 13 is a partial sectional illustration of a lockset according to certain embodiments.

With reference to FIGS. 12-16, provided herein are further details regarding the capabilities and characteristics provided by certain species of the above-described component families 604 of the product line system 600. Each of FIGS. 12-16 is a cross-sectional illustration of a lockset including the common platform 610 and one or more of the above-described species 602. For example, the lockset 1010 illustrated in FIG. 12 includes the push-type inside operating mechanism species 673, and FIG. 13 illustrates a lockset 1020 including the fixed inside operating mechanism species 672. Additionally, the lockset 1030 illustrated in FIG. 14 includes the first override-type outside actuating mechanism species 643, FIG. 15 illustrates a lockset 1040 including the second cylinder-type outside actuating mechanism species 642, and the lockset 1050 illustrated in FIG. 16 includes the exit-type outside actuating mechanism species 645.

FIGS. 12*a* and 12*b* are partial sectional views of an assembled lockset 1010 according to certain embodiments. More specifically, FIG. 12*a* illustrates the lockset 1010 in an unlocked state, and FIG. 12*b* illustrates the lockset 1010 in a locked state. The lockset 1010 includes the common platform 610 and the push-type plunger assembly 830 of the push-type inside operating mechanism species 673. The lockset 1010 also includes an outside handle 1012, an outside actuating mechanism 1014 including a tailpiece 1015, a latchbolt mechanism 1016 including a bolt bar 1017, and a locking mechanism 1018 including a plurality of locking mechanism components 1019. As described herein, the locking mechanism 1018 is operable to selectively prevent the outside handle 1012 from actuating the latchbolt mechanism 1016. The lockset 1010 has a longitudinal axis 1011 about which the outside handle 1012 rotates, and a lateral axis 1013 defining directions of extension and retraction for the latchbolt mechanism 1016, the plunger catch 350, and the shuttle 360.

With the push-type plunger assembly 830 assembled to the common platform 610, the cup 831 is mounted to the inside chassis spindle 330 in the manner described above with reference to the inactive cup 810, and the plunger 890 is movably mounted to the cup 831. The post 891 extends through the cup opening 837, the shuttle opening 361, and the fire plate opening 382, and is engaged with the stem 440 of the key cam 400. More specifically, the shoulder 892 of the post 891 abuts the distal end of the stem 442, and the tip 893 of the post 891 is received in the cavity 445 of the stem 440. Additionally, the coupling tab 836 is retained in its partially depressed position by the inside chassis spindle 330, and limits radial movement of the plunger 890 in the manner described above. As a result, the guide arm 898 is retained in the guide slot 838, and movement of the plunger 890 in the distal direction is limited.

In the illustrated embodiment, the locking mechanism 1018 includes the plug 420, the lug 430, and the stem 440 of the key cam 400, as well as the plunger 890 of the push-type plunger assembly 830. The locking mechanism 1018 has an unlocking state (FIG. 12*a*) in which each of the locking mechanism components 1019 is in an unlocking position, and a locking state (FIG. 12*b*) in which each of the components 1019 is in a locking position. In the illustrated form, the locking mechanism components 1019 are configured to move longitudinally between the locking and unlocking positions. Additionally, the spring 403 biases the locking mechanism 1018 toward the unlocking state, and urges the components 1019 into engagement with one another for joint longitudinal movement between the locking and unlocking positions thereof.

With the locking mechanism 1018 in its unlocking state (FIG. 12*a*), the outside handle 1012 is capable of driving the shuttle 360 in the manner described above with reference to FIGS. 2-6. With the plunger 890 in the unlocking position, the catch sections 894 are misaligned with the arms 352 of the plunger catch 350, and the catch 350 is biased into engagement with the abutment edges 895 by the catch spring 375. The plunger 890 may be driven from its unlocking position to its locking position as a result of a pushing force applied to a button mounted to the prongs 896 (e.g., a button of the push-button inside actuating mechanism species 681). When such a pushing force is applied, engagement between the guide arm 898 and the guide slot 838 may constrain the plunger 890 to longitudinal movement between its locking and unlocking positions. As the plunger 890 moves in the proximal direction ($X^+$) toward its locking position, the abutment edges 895 slide along the edges of the plunger catch arms 352. The abutment edges 895 may define a slight taper angle with respect to the longitudinal axis 1011 such that movement of the plunger 890 in the proximal locking direction causes a slight retraction of the plunger catch 350.

As will be appreciated, movement of the plunger 890 in the proximal locking direction causes a corresponding movement of the other locking mechanism components 1019 toward their locking positions, thereby compressing the spring 403. As the locking mechanism 1018 approaches its locking state (FIG. 12*b*), the lock control lug 430 enters the locking slot 228, and the catch sections 894 of the plunger 890 become aligned with the arms 352 of the plunger catch 350. When so aligned, the catch spring 375 urges the arms 352 into the notches of the catch sections 894, and movement of the plunger 890 toward its unlocking position is prevented by engagement between the arms 352 and the proximal edges of the catch sections 894. Thus, the plunger catch 350 retains the locking mechanism 1018 in the locking state against the biasing force of the springs 403, 839.

With the locking mechanism 1018 in its locking state (FIG. 12*b*), the outside handle 1012 is prevented from actuating the latchbolt mechanism 1016 in the manner described above with reference to FIG. 6. More specifically, the lock control lug 430 rotationally couples the outside drive spindle 230 with the outside housing 220, thereby locking the outside handle 1012 against rotation. Additionally, the lock control lug 430 extends through the intersection 486 of the lug opening 480 such that the key cam shell 410 is rotatable relative to the outside drive spindle 230. As such, the key cam shell 410 remains operable to drive the shuttle 360 for actuation of the latchbolt mechanism 1016 by the outside actuating mechanism 1014.

In the illustrated embodiment, the outside actuating mechanism 1014 is provided in the form of the standard-type lock cylinder assembly 710, such that the tailpiece 1015 is provided as the standard-type tailpiece 711. The tailpiece 711 extends into the bowtie opening 415, but does not engage the key cam plug 420 or interfere with movement of the plug 420 between its locking and unlocking positions. The tailpiece 711 has a width dimension that is less than the major diameter 418 and greater than the minor diameter 417. As a result, the tailpiece 711 is operable to be received in the bowtie opening 415 and to engage the teeth 411. The bowtie opening 415 cooperates with the tailpiece 711 to form a lost rotational motion connection, such that the tailpiece 711 is capable of rotating through a predetermined lost motion rotational range without causing a corresponding rotation of the key cam shell 410. Continued rotation causes the tailpiece 711 to engage the teeth 411, thereby rotating the key cam shell 410, retracting the shuttle 360, and actuating the latchbolt mechanism 1016. While the standard-type lock cylinder assembly 710 of the first cylinder-type outside actuating mechanism species 641 is configured to engage the key cam shell 410 via the above-described lost motion connection, other outside actuating mechanism species 649 interact with the key cam 400 in different manners. Further details regarding such interaction are provided below with reference to FIGS. 14 and 15.

With the locking mechanism 1018 in the locking state, movement of the shuttle 360 in the retracting direction ($Y^-$) causes the locking mechanism 1018 to transition to the unlocking state. More specifically, such movement of the shuttle 360 causes a corresponding retraction of the plunger catch 350, thereby causing the catch 350 to move out of engagement with the catch sections 894 of the plunger 890. When the arms 352 exit the notches of the catch sections 894, the locking mechanism 1018 returns to its unlocking state under the biasing force of the spring 403. As will be appreciated, the spring 839 may assist in returning the plunger 890 to its distal position as the plunger assembly 830 returns to its unlocking state.

As is evident from the foregoing, the locking mechanism 1018 is configured to automatically transition from the locking state to the unlocking state in response to movement of the shuttle 360 from the extended position to the retracted position. Thus, the locking state of the locking mechanism 1018 is a releasable locking state, from which the locking mechanism 1018 is configured to automatically transition to the unlocking state in response to a lock-releasing actuation of the lockset 1010. More specifically, each of the lock-releasing actuations drives the shuttle 360 in its retracting direction, thereby disengaging the plunger catch 350 from the plunger 890. For example, the shuttle 360 can be driven in the retracting direction ($Y^-$) by rotation of the inside chassis spindle 330, which may occur as a result of an inside handle being rotated. Thus, rotation of the inside handle is one form of lock-releasing actuation for the lockset 1010. In the illustrated form, the shuttle 360 can also be driven in the retracting direction ($Y^-$) by rotation of the key cam shell 410, which may occur as a result of the tailpiece 1015 being rotated. Thus, actuation of the outside actuating mechanism 1014 is another form of lock-releasing actuation for the lockset 1010. As will be appreciated, the types of actuations operable to serve as a lock-releasing actuation may depend upon the specific configuration of the lockset 1010.

When the lockset 1010 is assembled from a kit 500 associated with the product line system 600, one or more types of lock-releasing actuation may be dependent upon the species selected for the modular components 502. For example, if the latchbolt mechanism 1016 is provided in the form of the restoring spring-latch latchbolt mechanism 920 of the restoring latchbolt mechanism species 622, the shuttle 360 will be driven toward its retracted position when the latchbolt 924 is pushed in the laterally inward direction ($Y^-$), such as by the strike plate 94 during closing movement of the door 80. In such forms, movement of the latchbolt 924 to the retracted position would be an additional form of lock-releasing actuation for the lockset 1010.

While the locking mechanism 1018 illustrated in FIG. 12 includes the push-type plunger assembly 830 of the push-type inside operating mechanism species 673, it is to be appreciated that a similar releasable locking state would be provided if the locking mechanism 1018 were instead assembled with the first push/turn plunger assembly 840 of the push/turn inside operating mechanism species 674. The first push/turn plunger assembly 840 is further capable of providing the locking mechanism 1018 with a persistent locking state in the manner described below.

As noted above, the first push/turn plunger assembly 840 can be moved from its releasable locking state to its persistent locking state by rotating the plunger 890 from its depressed home position to its depressed rotated position. During such rotation of the plunger 890, the catch engagement sections 894 move out of engagement with the plunger catch 350, and the guide arm 898 moves into engagement with the recess 848R. With the cup 841 retaining the plunger 890 in the depressed position, movement of the shuttle 360 no longer serves to release the locking mechanism 1018 from the locking state. Thus, the lock-releasing actuations will not serve to release the plunger assembly 840 and locking mechanism 1018 from the persistent locking states thereof. In the persistent locking state, rotation of plunger 890 to the home position transitions the plunger assembly 840 and locking mechanism 1018 to the releasable locking states thereof, and the lock-releasing actuations once again become capable of returning the plunger assembly 840 and the locking mechanism 1018 to the unlocking states thereof.

As will be appreciated, the second push/turn plunger assembly 850 is operable to provide the locking mechanism 1018 with a persistent locking state in a manner substantially similar to that described above. However, the second push/turn plunger assembly 850 is not operable to provide the locking mechanism 1018 with a releasable locking state. As noted above, the plunger 890' of the second push/turn plunger assembly 850 does not include the notched engagement sections 894 that are provided on the plunger 890. With the engagement sections 894 omitted, the plunger catch 350 is not operable to retain the plunger 890' in the depressed position. In order for the second push/turn plunger assembly 850 to maintain the key cam 400 in its locking state, the plunger 890' may be driven to the rotated position, thereby placing the locking mechanism 1018 in the persistent locking state.

With reference to FIG. 13, illustrated therein is a lockset 1020 according to certain embodiments. Like the lockset 1010 illustrated in FIG. 12, the lockset 1020 includes the common platform 610, an outside handle 1022, an outside actuating mechanism 1024 including a tailpiece 1025, a latchbolt mechanism 1026 including a bolt bar 1027, and a locking mechanism 1028. The lockset 1020 also includes the fixed plunger 820 of the fixed inside operating mechanism species 672. The locking mechanism 1028 includes the plug 420, the lug 430, and the stem 440 of the key cam 400, and may be considered to further include the fixed plunger 820.

With the fixed plunger 820 assembled to the common platform 610, the cup 811 is mounted to the inside chassis spindle 330 in the manner described above with reference to the inactive cup 810. The post 821 extends through the shuttle opening 361 and the fire plate opening 382, and is engaged with the stem 440 of the key cam 400. More specifically, the shoulder 822 of the post 821 abuts the distal end of the stem 440, and the tip 823 of the post 821 is received in the cavity 445 of the stem 440. The longitudinal length of the post 821 is selected such that the shoulder 822 retains the stem 440 in its locking position against the biasing force of the spring 403. As a result, the outside handle 1022 is prevented from driving the shuttle 360 to actuate the latchbolt mechanism 1026.

As is evident from the foregoing, the locking mechanism 1028 cannot be transitioned to an unlocking state when the fixed plunger 820 is installed. The locking mechanism 1028 may therefore be considered to have a fixed locking state, from which the locking mechanism 1028 cannot be transitioned without altering (e.g., removing or replacing) one or more components of the lockset 1020, such as the fixed plunger 820. The fixed locking state is thus distinguishable from the above-described persistent locking state, from which the locking mechanism 1018 can be transitioned by merely manipulating one or more components of the lockset 1010.

In the illustrated embodiment, the lockset 1020 includes an outside actuating mechanism 1024, the tailpiece 1025 of which is operable to rotate the shell 410 of the key cam 400. Accordingly, the outside actuating mechanism 1024 remains operable to drive the shuttle 360 to actuate the latchbolt mechanism 1026 despite the fixed locking state provided by the fixed plunger 820. As will be appreciated, if the lockset 1020 were provided with a different form of outside actuating assembly, such as one from which the outside actuating mechanism 1024 is omitted, the lockset 1020 may prevent actuation of the latchbolt mechanism 1026 from the unsecured region 72 when the door 80 is latched in its closed position.

In addition to providing the locking mechanism 1028 with a fixed locking state, the fixed plunger 820 also discourages tampering with the locking mechanism 1028 from the inner side 83 of the door 80. More specifically, the proximal wall 812 of the anti-tamper cup 811 prevents access to the locking mechanism 1028 via the inside drive spindle 134. As a result, a person that has removed the inside handle will nonetheless be inhibited from manipulating the locking mechanism 1028 in an effort to permit unauthorized access from the outer side 82 of the door 80.

While the illustrated lockset 1020 includes the fixed plunger 820, it is to be appreciated that the lockset 1020 may instead be provided with the inactive cup 810. Unlike the above-described plunger assemblies 820, 830, 840, the inactive cup 810 is not operable to place the stem 440 in its locking position. As a result, the biasing force of the spring 403 retains the locking mechanism components 1029 in the unlocking positions thereof, thereby maintaining the locking mechanism 1028 in a fixed unlocking state. As will be appreciated, the inactive cup 810 may also provide the lockset 1020 with tamper-defeating characteristics analogous to those described above. More specifically, the proximal wall 812 of the inactive cup 810 may prevent access to the locking mechanism 1028 via the inside drive spindle 134, thereby discouraging manipulation of the locking mechanism 1028 when the inside handle is removed.

Figure 14:
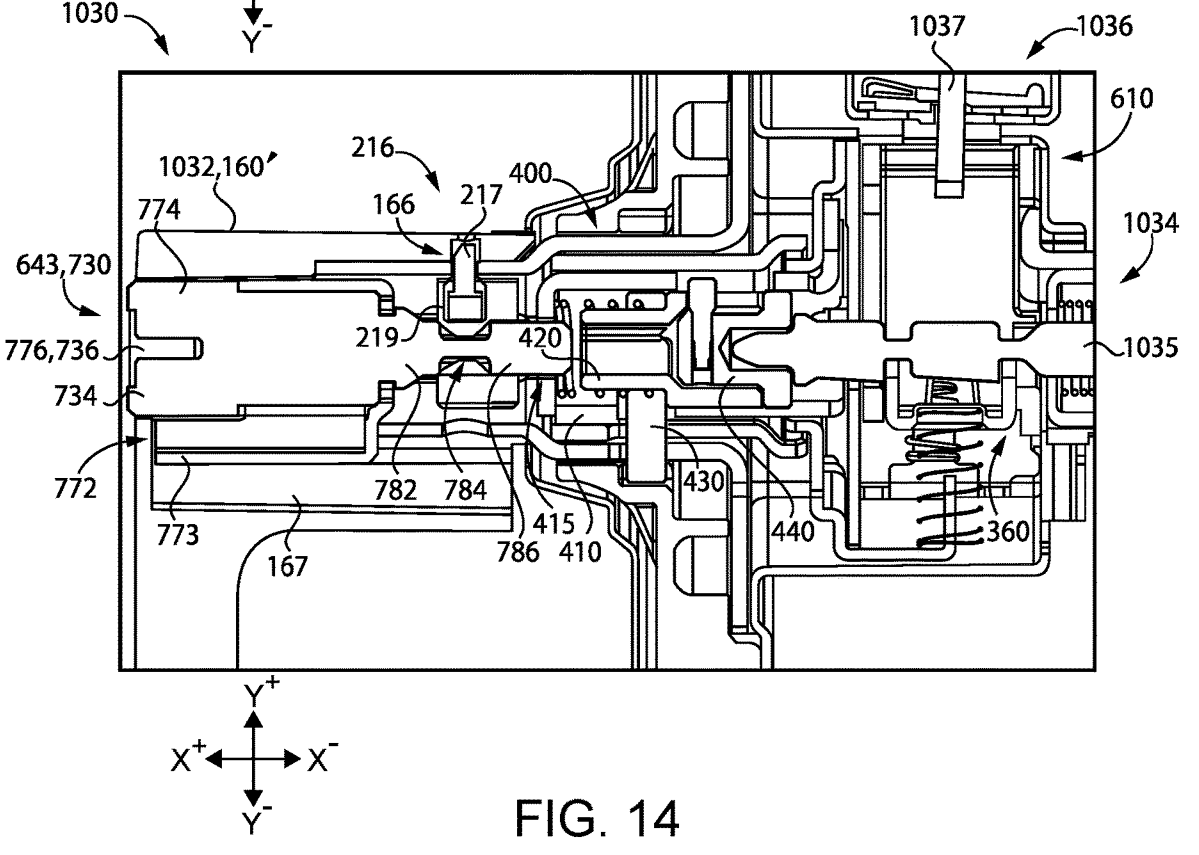
FIG. 14 is a partial sectional illustration of a lockset according to certain embodiments.

With reference to FIG. 14, illustrated therein is a lockset 1030 according to certain embodiments. The lockset 1030 includes the common platform 610, an outside handle 1032, an inside operating mechanism 1034 including a plunger 1035, a latchbolt mechanism 1036 including a bolt bar 1037, and a locking mechanism 1038. The lockset 1030 further includes the tool-assisted override mechanism 730 of the first override-type outside actuating mechanism species 643. The locking mechanism 1038 includes the plug 420, the lug 430, and the stem 440 of the key cam 400, as well as the plunger 1035. In certain embodiments, the locking mechanism 1038 may be considered to further include one or more components of the override mechanism 730, such as the tailpiece 780.

In the illustrated embodiment, the outside handle 1032 is provided as the lever 160 of the open outside handle species 632. Additionally, the plunger 1035 is provided as the plunger 890, and the inside operating mechanism 1034 is provided as either the push-type plunger assembly 830 of the push-type inside operating mechanism species 673 or the first push/turn plunger assembly 840 of the first push/turn inside operating mechanism species 674. It is also contemplated that the inside operating mechanism 1034 may be provided in another form, such as the fixed plunger 820 of the inside operating mechanism species 672, or the second push/turn plunger assembly 850 of the second push/turn inside operating mechanism species 675.

With the override mechanism 730 installed to the lockset 1030, the shell 772 rotatably supports the plug 774 within the chamber 163 of the open-faced lever 160', and the slot 736 is accessible via the access port 169. The plug 774 has a home position and a rotated position, and the slot 736 may facilitate tool-assisted rotation of the plug 774, for example by receiving the tip of a tool such as a screwdriver. The end portion 786 of the tailpiece 780 extends into the bowtie opening 415 of the key cam shell 410, and the narrowed section 784 is aligned with the handle catch 216. With the plug 774 in its home position, the narrowed section 784 provides clearance for the post 219 that enables the catch plate 217 to move between its projected and depressed positions, thereby facilitating installation and removal of the outside handle 1032.

With the lockset 1030 assembled, the teeth 411 of the bowtie opening 415 are received in the tailpiece grooves 787, which are sized and shaped to closely engage the teeth 411. The close engagement of the grooves 787 with the teeth 411 substantially eliminates the lost rotational motion that may otherwise be provided by the bowtie opening 415, thereby rotationally coupling the plug 774 and the key cam shell 410. As a result, rotation of the plug 774 from its home position causes a corresponding rotation of the key cam shell 410, which in turn retracts the shuttle 360 and actuates the latchbolt mechanism 1036.

The term "substantially" as used herein may be applied to modify a quantitative representation which could permissibly vary without resulting in a change in the basic function to which it is related. For example, the tailpiece 780 is described above as substantially eliminating the lost motion, such that rotation of the plug 774 causes a corresponding rotation of the key cam shell 410 without a significant delay. As will be appreciated, there may nonetheless be some degree of lost rotational motion, for example due to manufacturing tolerances. The tailpiece 780 may nonetheless be considered to substantially eliminate the lost motion, so long as the resulting delay in rotation of the shell 410 is not noticeable. For example, the total degree of lost motion may be less than ten degrees (10°), and is preferably less than five degrees (5°).

As noted above, the ear 416 of the key cam shell 410 is engaged with a proximal ramp 365 of the shuttle 360, which is biased toward its extended position by the shuttle springs 376. Engagement of the ear 416 and the ramp 365 translates the linear biasing force on the shuttle 360 to a rotational biasing force on the key cam shell 410. Thus, the rotational coupling of the plug 774 and the key cam shell 410 also results in the plug 774 being biased toward its home position by the shuttle springs 376.

Certain conventional emergency release mechanisms suffer from a variety of drawbacks that may be alleviated by the override mechanism 730. For example, certain conventional emergency release mechanisms require as many as five parts, and permit only limited relative rotation of the turn piece and housing, such as through a range of about 180°. The limited rotational range provided by such mechanisms may make installation of the outside handle more difficult, as the pushbutton of the inside locking mechanism must be depressed into the locked position, and the turn piece must be rotated as the lever is installed. In contrast, the clearance provided by the narrowed section 784 of the illustrated override mechanism 730 enables movement of the catch plate 217 between its projected and depressed positions, thereby permitting the plug 774 to remain stationary during installation and removal of the outside handle 1032. Thus, the override mechanism 730 may provide for simplified assembly and disassembly of the lockset 1030, thereby facilitating installation and/or maintenance procedures. Additionally, the illustrated override mechanism 730 includes just two components (i.e., the shell 772 and the plug 774), which is significantly fewer than certain conventional emergency release mechanisms. The reduced number of parts may facilitate manufacture and/or assembly of the override mechanism 730, which may result in decreased costs.

As indicated above, the manual override mechanism 740 is substantially similar to the tool-assisted override mechanism 730. Those having skill in the art will readily appreciate that the lockset 1030 would operate in a manner substantially similar to that described above if the lockset 1030 were provided with the manual override mechanism 740 in place of the tool-assisted override mechanism 730. As noted above, actuation of the tool-assisted override mechanism 730 is typically provided by engaging the tip of a tool with the slot 736 and rotating the tool. In contrast, the plug 774 of the manual override mechanism 740 extends through the access port 169 of the open-faced lever 160', and includes a graspable flange 746 that facilitates manual rotation of the plug 774 without the use of tools.

Figure 15A:
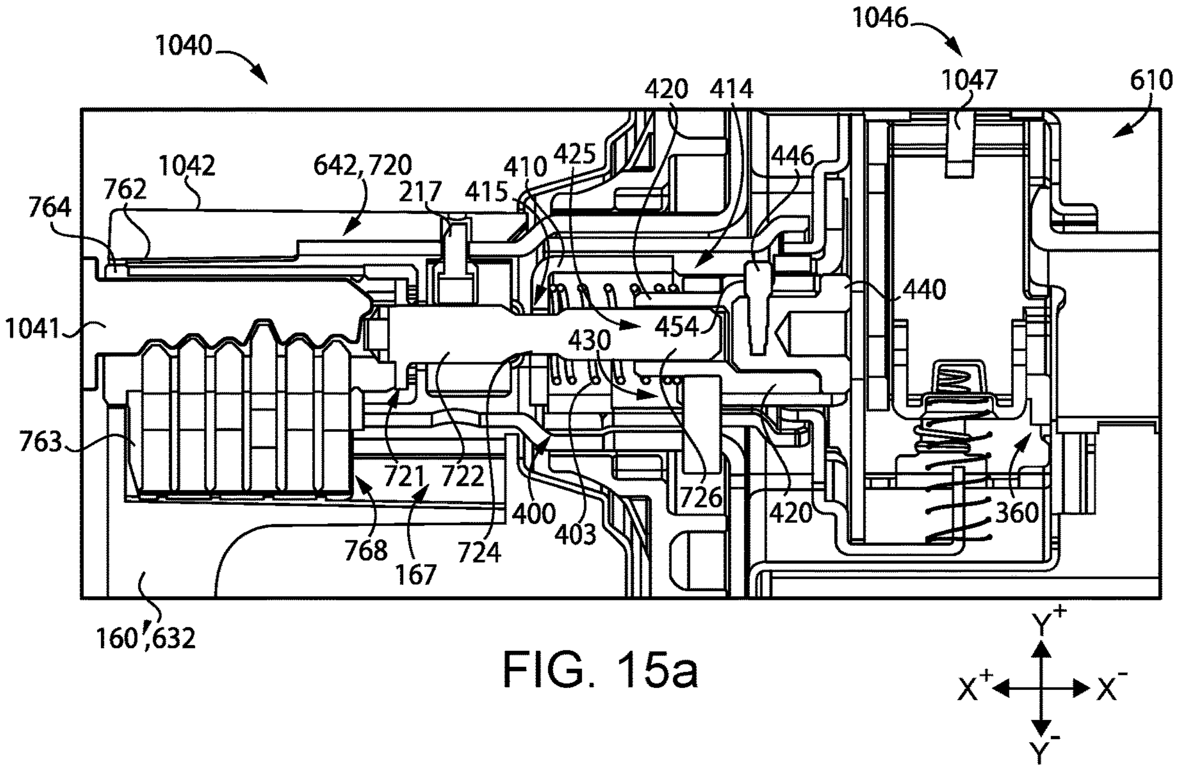
FIGS. 15*a* and 15*b* are partial sectional illustrations a lockset according to certain embodiments in an unlocked state and in a locked state, respectively.
Figure 15B:
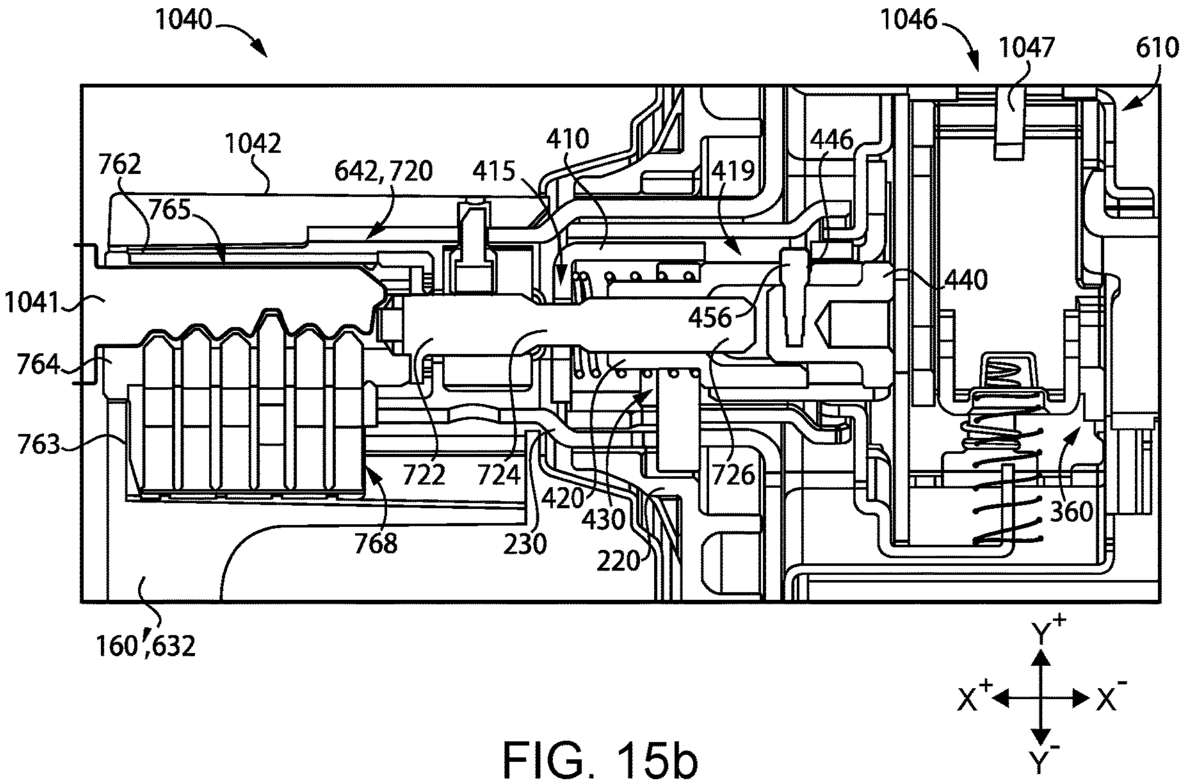

FIGS. 15*a* and 15*b* are partial sectional views of an assembled lockset 1040 according to certain embodiments. More specifically, FIG. 15*a* illustrates the lockset 1040 in an unlocked state, and FIG. 15*b* illustrates the lockset 1040 in a locked state. The lockset 1040 includes the common platform 610 and the classroom-type lock cylinder assembly 720 of the second cylinder-type outside actuating mechanism species 642. The lockset 1040 also includes an outside handle 1042, a latchbolt mechanism 1046 including a bolt bar 1047, and a locking mechanism 1048. As described herein, the locking mechanism 1048 is operable to selectively prevent the outside handle 1042 from actuating the latchbolt mechanism 1046. The locking mechanism 1048 includes the plug 420, the lug 430, and the stem 440 of the key cam 400. In certain embodiments, the locking mechanism 1048 may be considered to further include one or more components of the lock cylinder assembly 720, such as the tailpiece 721.

With the classroom-type lock cylinder assembly 720 assembled to the lockset 1040, the tailpiece 721 extends through the bowtie opening 415 of the key cam shell 410 and into the bowtie opening 425 of the key cam plug 420. The base portion 722 is aligned with the handle catch 216, and is operable to retain the catch plate 217 in its projected position. More specifically, when the tailpiece 721 is in its home position and the catch plate 217 is pushed radially inward, the post 219 engages an edge of the tailpiece 721, thereby preventing the catch plate 217 from moving to its depressed position. The narrowed section 724 is received in the bowtie opening 415 of the shell 410, and has a width dimension that is less than the minor diameter 417 of the bowtie opening 415. As a result, the narrowed section 724 is not operable to engage the teeth 411, and the tailpiece 721 is rotationally decoupled from the key cam shell 410. By contrast, the end portion 726 of the tailpiece 721 has a width dimension that is greater than the minor diameter of the plug bowtie opening 425, such that the tailpiece 721 is connected with the plug 420 via a lost rotational motion connection. With the distal end portion of the tailpiece 721 received in the plug bowtie opening 425, the plug 420 is longitudinally slidable relative to the tailpiece 721, and is biased toward its distal unlocking position by the spring 403.

FIG. 15*a* illustrates the lockset 1040 in an unlocked state, in which the locking mechanism 1048 is in its unlocking state. In this state, the outside drive spindle 230 and the key cam shell 410 are rotationally coupled to one another by the lock control lug 430, and the outside handle 1042 is capable of driving the shuttle 360 to actuate the latchbolt mechanism 1046 in the manner described above. Additionally, the key cam plug 420 is in its distal unlocking position, in which the proximal or unlocking landing 454 of the cam surface 452 is engaged with the pin 446 of the key cam stem 440. With the pin 446 engaged with the unlocking landing 454, relative rotation of the plug 420 and stem 440 in a first direction is prevented by engagement of the pin 446 with the first sidewall 427. Additionally, relative rotation of the plug 420 and stem 440 in an opposite second direction is resisted by engagement of the pin 446 with the helical ramp 458.

FIG. 15*b* illustrates the lockset 1040 in a locked state, in which the locking mechanism 1048 is in its locking state. In this state, the outside drive spindle 230 is rotationally coupled with the outside housing 220 by the lock control lug 430. As a result, the outside handle 1042 is locked stationary in its home position, and is prevented from driving the shuttle 360 to actuate the latchbolt mechanism 1046 in the manner described above. Additionally, the key cam plug 420 is in its proximal locking position, in which the distal or locking landing 456 of the cam surface 452 is engaged with the pin 446 of the key cam stem 440. With the pin 446 engaged with the locking landing 456, relative rotation of the plug 420 and stem 440 in the first direction is resisted by engagement of the pin 446 with the minor ramp 457. Additionally, relative rotation of the plug 420 and stem 440 in the opposite second direction is prevented by engagement of the pin 446 with the second sidewall 428.

The locking mechanism 1048 can be moved between its unlocking state (FIG. 15*a*) and its locking state (FIG. 15*b*) by operating the classroom-type lock cylinder assembly 720 with an appropriate key 1041. With the key 1041 inserted, the tumbler system 768 permits rotation of the lock cylinder plug 764 and the tailpiece 721 in an unlocking direction and an opposite locking direction. As noted above, the narrowed section 724 is received in the bowtie opening 415 of the key cam shell 410, and the distal end portion of the tailpiece 721 extends into the bowtie opening of the key cam plug 420. As a result, the tailpiece 721 is rotationally decoupled from the shell 410, and is connected with the plug 420 via a lost rotational motion connection. Thus, rotation of the tailpiece 721 does not cause a corresponding rotation of the shell 410, but eventually causes a corresponding rotation of the plug 420.

When the key cam stem 440 is free to rotate relative to the shell 410, rotating the key 1041 may initially cause joint rotation of the plug 420 and the stem 440 due to the above-described engagement of the pin 446 and the plug 420. Continued rotation of the key 1041 brings the pin 446 into contact with an edge of the pin opening 419 in the key cam shell 410, thereby preventing further rotation of the stem 440 relative to the shell 410. When the plug 420 is free to move axially, further rotation of the key 1041 may cause the plug 420 to move axially within the shell 410 as the helical ramp 458 rides against the pin 446. With the lug 430 biased into engagement with the plug 420 by the spring 403, such axial movement of the plug 420 causes the lock control lug 430 to move axially with the plug 420, such that the plug 420 and lug 430 move jointly between the locking and unlocking positions thereof.

With the tailpiece 721 in its home position and the locking mechanism 1048 in its locking state (FIG. 15*b*), continued rotation of the tailpiece 721 in the unlocking direction causes the locking mechanism 1048 to move to its unlocking state. More specifically, rotation of the key cam plug 420 causes the minor ramp 457 to urge the pin 446 into contact with the edge of the pin opening 419, which prevents further rotation of the stem 440. As a result, the minor ramp 457 rides along the pin 446, and the spring 403 drives the helical ramp 458 into engagement with the pin 446. The spring 403 drives the plug 420 and lock control lug 430 distally toward the unlocking positions thereof, and engagement between the pin 446 and the helical ramp 458 rotates the plug 420 in its unlocking direction. As the plug 420 approaches its unlocking position, the proximal or unlocking landing 454 comes into engagement with the pin 446, and the locking mechanism 1048 returns to its unlocking state.

With the tailpiece 721 in its home position and the locking mechanism 1048 in its unlocking state (FIG. 15*a*), rotation of the key 1041 in the locking direction eventually causes a corresponding rotation of the plug 420 in the locking direction. As the plug 420 is rotated in the locking direction, the helical ramp 458 rides along the pin 446, such that the cam mechanism 450 urges the plug 420 in the proximal locking direction against the distal biasing force of the spring 403. As a result, the plug 420 slides along the tailpiece 721 in the proximal direction ($X^+$), thereby driving the lock control lug 430 toward its locking position. When the plug 420 reaches its locking position, the distal or locking landing 456 is engaged with the pin 446, and the minor ramp 457 resists relative rotation of the plug 420 and stem 440. From this state, the lock cylinder plug 764 may be returned to its home position in order to permit removal of the key 1041.

The key cam 400 is configured to permit the lock cylinder plug 764 and tailpiece 721 to return to the home positions thereof while retaining the locking mechanism 1048 in its locking state. As the tailpiece 721 rotates toward its home position, the initial rotation in the unlocking direction is not transmitted to the key cam plug 420 due to the lost rotational motion connection provided by the bowtie opening 425. Thus, the bowtie opening 425 permits the tailpiece 721 to rotate partially toward its home position before causing a corresponding rotation of the key cam plug 420 in the unlocking direction. As the plug 420 begins to rotate in the unlocking direction, the minor ramp 457 engages the pin 446, thereby urging the stem 440 to rotate with the plug 420. With the pin 446 received in the pin opening 419 of the shell 410, the stem 440 is free to rotate with the plug 420, and the tailpiece 721 is able to return to its home position without returning the locking mechanism 1048 to its unlocking state.

With the lockset 1040 in the locked state illustrated in FIG. 15*b*, the classroom-type lock cylinder assembly 720 is capable of actuating the latchbolt mechanism 1046 without returning the locking mechanism 1048 to its unlocking state. In other words, the lock cylinder assembly 720 is capable of retracting the latchbolt without unlocking the outside handle 1042. With the locking mechanism 1048 in its locking state, rotation of the key 1041 in the locking direction causes a corresponding rotation of the plug 420 in the locking direction, and engagement between the pin 446 and the second sidewall 428 causes a corresponding rotation of the stem 440. The pin 446 also engages an edge of the pin opening 419, thereby rotating the shell 410, which retracts the shuttle 360 to actuate the latchbolt mechanism 1046.

Figure 16A:
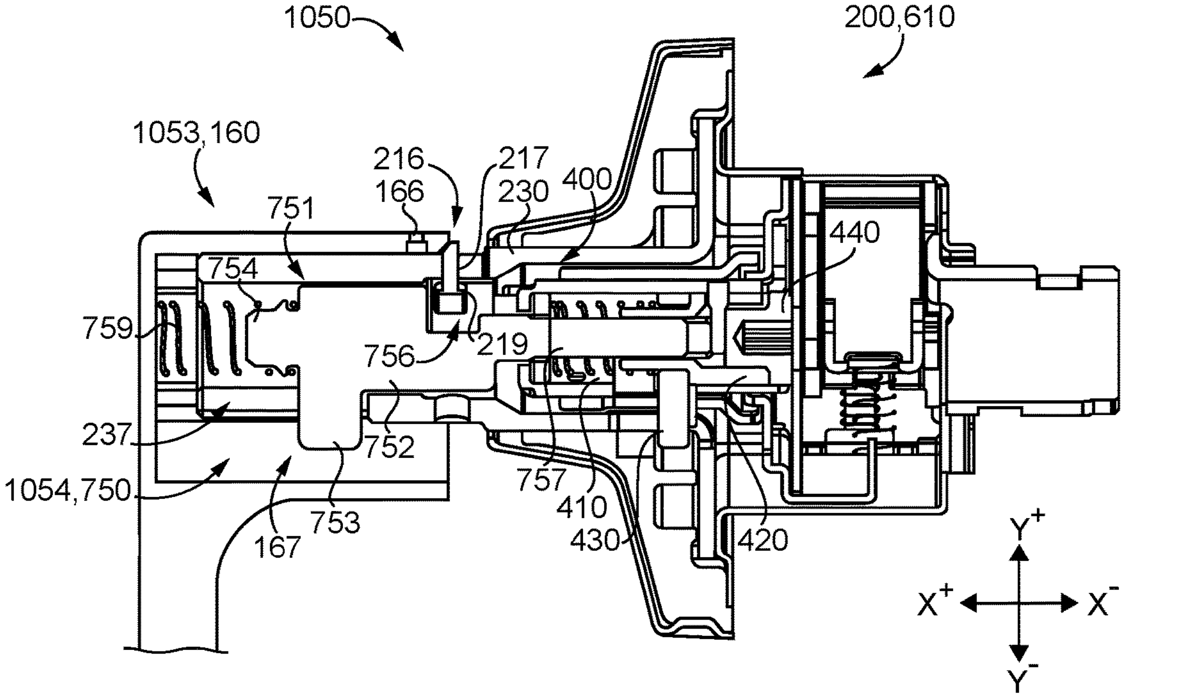
FIGS. 16*a* and 16*b* are cross-sectional illustrations of a lockset according to certain embodiments in a partially-assembled state and a more-assembled state, respectively.
Figure 16B:
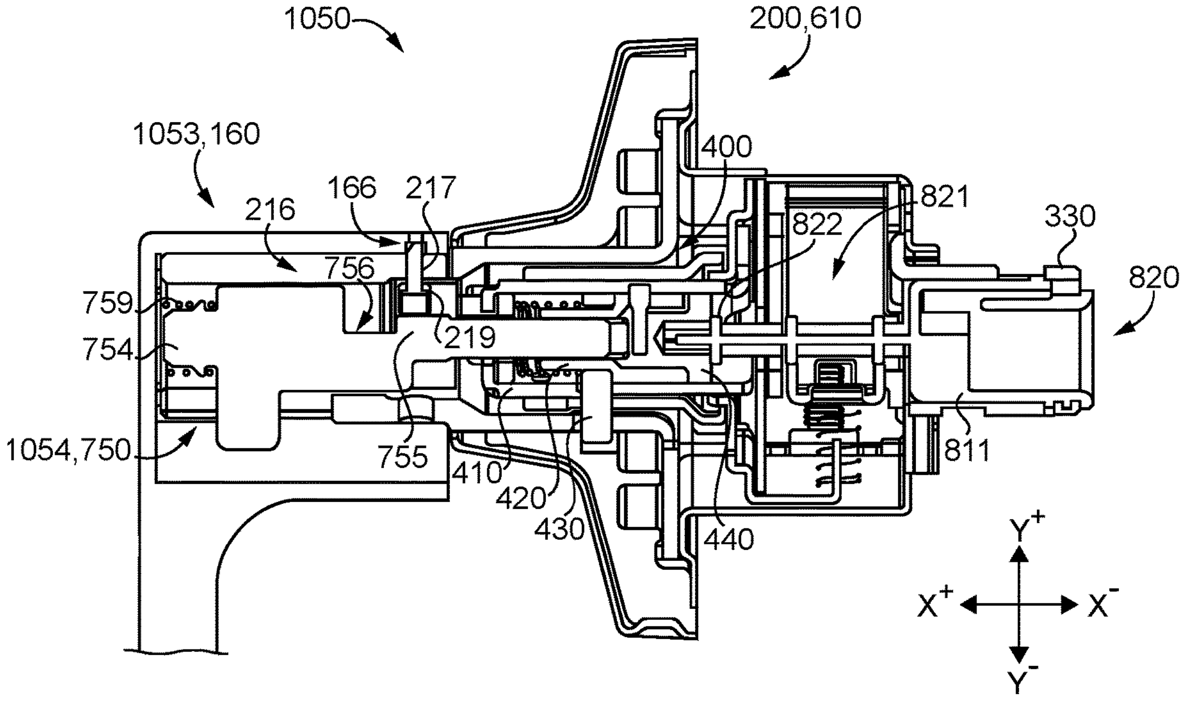

With additional reference to FIGS. 16*a* and 16*b*, illustrated therein is a partially-assembled lockset 1050 according to certain embodiments. More specifically, FIG. 16*a* illustrates the lockset 1050 in a less-assembled state, and FIG. 16*b* illustrates the lockset 1050 in a more-assembled state. The lockset 1050 includes the common platform 610, an outside actuating assembly 1055, and an inside operating mechanism 1057. The outside actuating assembly 1055 includes an outside handle 1053 and an outside actuating mechanism 1054, which are respectively provided as the closed-face lever 160 of the closed-type outside handle species 631 and the stop assembly 750 of the exit-type outside actuating mechanism species 645. Additionally, the inside operating mechanism 1057 is provided as the fixed plunger 820 of the fixed inside operating mechanism species 672.

During assembly of the lockset 1050, the outside actuating assembly 1055 is mounted to the chassis assembly 200 prior to installation of the inside operating mechanism 1057. Mounting the outside actuating assembly 1055 to the chassis assembly 200 involves installing the outside actuating mechanism 1054, which is provided as the stop assembly 750 of the exit-type outside actuating mechanism species 645, and installing the outside handle 1053, which is provided as the closed-face lever 160 of the closed outside handle species 631. Installing the outside actuating mechanism 1054 involves inserting the stop member 751 into the outside drive spindle 230 such that the tower 753 extends radially outward through the slot 237. The stop member 751 is pushed in the distal direction X such that the end portion of the tailpiece 757 is received in the bowtie opening 425 of the plug 420. The tailpiece 757 may include grooves 758 that receive and engage the teeth 425' of the bowtie opening 425, thereby preventing rotation of the plug 420. With the stop member 751 in its distal position, the recess 756 is aligned with the handle catch 216.

With the spring 759 mounted to the proximal post 754, the outside handle 1053 may be mounted to the outside drive spindle 230. During such mounting, the tower 753 enters the channel 167 in the shank 162, thereby rotationally coupling the stop member 751 with the lever 160. As the tubular portion 234 of the drive spindle 230 enters the chamber 163, the catch plate 217 is driven radially inward by the shank 162, and the catch post 219 enters the recess 756. When the catch opening 166 becomes aligned with the catch plate 217, the leaf spring 218 drives the catch plate 217 to its projected position, and the catch post 219 exits the recess 756.

After installing the outside actuating assembly 1055 in the manner described above, the inside operating mechanism 1057 may be installed. Installing the inside operating mechanism 1057 involves inserting the fixed plunger 820 into the inside chassis spindle 330 such that the post 821 extends through the retractor 360. As the plunger 820 is inserted, the shoulder 822 engages the distal end face of the stem 440, thereby driving the stop member 751, the plug 420, the lug 430, and the stem 440 proximally against the distal biasing force of the springs 759, 403. With the plunger 820 fully inserted, the cup 811 engages the chassis spindle 330 in the manner described above, thereby retaining the lug 430 in its proximal locking position. As a result, the fixed plunger 820 provides the lockset 1050 with a fixed locking state in a manner analogous to that described above with reference to FIG. 13. The plunger 820 also serves to retain the stop member 751 in its proximal position, in which the distal end wall 755 is aligned with the handle catch 216. As a result, the catch plate 217 is prevented from moving to its depressed position, thereby preventing removal of the outside handle 1053.

With reference to FIG. 17, illustrated therein is an example of a product line 1100 according to certain embodiments. The product line 1100 includes a plurality of lockset species 1190, each of which may be assembled from a corresponding species of the kit 500 illustrated in FIG. 7. Thus, each lockset species 1190 includes a common platform 510, a latchbolt mechanism 520, an outside actuating assembly 550, and an inside actuating assembly 590. In the illustrated embodiment, the product line 1100 is associated with the product line system 600 illustrated in FIG. 8. Accordingly, for each of the lockset species 1190, the common platform 510 is provided as the common platform 610, the latchbolt mechanism 520 is provided as a species 629 of the latchbolt mechanism family 620, the outside actuating assembly 550 is provided as a species 659 of the outside actuating assembly family 650, and the inside actuating assembly 590 is provided as a species 699 of the inside actuating assembly family 690.

As described herein, each of the lockset species 1190 has a corresponding function, and each of the functions has a corresponding set of features and characteristics. At least some of the functions described herein are defined by the standards set forth by the American National Standards Institute (ANSI) and the Builders Hardware Manufacturers Association (BHMA) in ANSI/BHMA A156.2 ("Bored & Preassembled Locks and Latches") as that standard exists on Aug. 1, 2017.

In the illustrated product line 1100, each of the lockset species 1190 provides for free egress, such that the inside handle is at all times capable of retracting the latchbolt to open the door. In other embodiments, a product line may include one or more species in which the inside handle is selectively prevented from retracting the shuttle 360. In the illustrated embodiment, free egress is provided in part by the common platform 610, in which the inside chassis spindle 330 is at all times capable of driving the shuttle 360. As described herein, the common platform 610 also cooperates with the peripheral components of each lockset species 1190 to provide the lockset with a particular set of features and characteristics corresponding to the function associated with the lockset species 1190.

A first lockset species 1101 provides a passage function corresponding to ANSI function F75 ("Passage, Closet"), and may alternatively be referred to as the passage species 1101. The passage species 1101 includes the common platform 610, the restoring latchbolt mechanism species 622, the sixth outside actuating assembly species 656, and the first inside actuating assembly species 691. As noted above, the sixth outside actuating assembly species 656 includes the closed outside handle species 631, and the first inside actuating assembly species 691 includes the inactive inside operating mechanism species 671 and the closed inside handle species 661. While other forms are contemplated, in the illustrated embodiment, the sixth outside actuating assembly species 656 does not include an outside actuating mechanism 540, and the first inside actuating assembly species does not include an inside actuating mechanism 580. A lockset of the first species 1101 may, for example, be assembled from a passage-function species of the kit 500, in which the latchbolt mechanism 520 and the inside operating mechanism 570 are respectively provided in the form of the restoring spring-latch latchbolt mechanism 920 and the inactive cup 810.

A primary characteristic of passage-function locksets is that both the inside handle and outside handle are at all times unlocked and capable of retracting the latchbolt. In the first lockset species 1101, the lock control lug 430 is biased to its unlocking position by the spring 403. Additionally, the first lockset species 1101 does not include components that would enable a user to drive the lock control lug 430 to its locking position against the biasing force of the spring 403.

As such, the first lockset species 1101 is provided with the fixed unlocking state characteristic of passage-function locksets.

A second lockset species 1102 provides a bedroom privacy function corresponding to ANSI function F76A ("Privacy Bath/Bedroom"), and may alternatively be referred to as the bedroom privacy species 1102. The bedroom privacy species 1102 includes the common platform 610, the restoring latchbolt mechanism species 622, the third outside actuating assembly species 653, and the third inside actuating assembly species 693. As noted above, the third outside actuating assembly species 653 includes the open outside handle species 632 and the first override-type outside actuating mechanism species 643, and the third inside actuating assembly species 693 includes the push-type inside operating mechanism species 673, the push-button inside actuating mechanism species 681, and the open inside handle species 662. A lockset of the second species 1102 may, for example, be assembled from a first privacy-function species of the kit 500, in which the latchbolt mechanism 520, the outside actuating mechanism 540, and the inside operating mechanism 570 are respectively provided in the form of the restoring spring-latch latchbolt mechanism 920, the tool-assisted override mechanism 730, and the push-type plunger assembly 830.

The common platform 610 cooperates with the modular components included in the second lockset species 1102 to provide various features that are characteristic of privacy-function locksets, including selective locking of the outside handle, automatic unlocking, and emergency access provisions. One characteristic of the privacy function is that the outside handle is selectively locked by a locking mechanism that can be manipulated from the secured or inner side of the lockset. In the second lockset species 1102, this characteristic is provided in part by the push-type plunger assembly 830, which facilitates selective locking of the outside handle in the manner described above with reference to FIG. 12. Another characteristic of certain privacy locksets is the presence of an emergency release mechanism that enables tool-assisted operation from the unsecured or outer side of the lockset when the outside handle is locked. In the second lockset species 1102, this characteristic is provided in part by the override mechanism 730, which facilitates tool-assisted actuation of the latchbolt mechanism in the manner described above with reference to FIG. 14.

Another characteristic of the privacy function is the automatic unlocking of the outside handle in response to certain actuating inputs. In the second lockset species 1102, this characteristic is provided in part by the push-type plunger assembly 830, which facilitates a releasable locking state in the manner described above with reference to FIG. 12. When in such a releasable locking state, locksets of the second species 1102 automatically transition to the unlocking state in response to the shuttle 360 being driven to its retracted position by a lock-releasing actuation of the lockset. For the second lockset species 1102, lock-releasing actuations include rotation of the key cam shell 410 by the override mechanism 730, rotation of the inside chassis spindle 330 by the inside handle, and depression of the latchbolt 924. Depression of the latchbolt 924 may, for example, be provided by the strike plate 94 as the door 80 is moved to its closed position. Thus, when in the releasable locking state, locksets of the second species 1102 automatically unlock in response to each of emergency release by the override mechanism, rotation of the inside handle, and closing of the door.

A third lockset species 1103 provides a hospital privacy function similar to the bedroom privacy function, and may alternatively be referred to as the hospital privacy species 1103. The hospital privacy species 1103 includes the common platform 610, the restoring latchbolt mechanism species 622, the fourth outside actuating assembly species 654, and the third inside actuating assembly species 693. As noted above, the fourth outside actuating assembly species 654 includes the open outside handle species 632 and the second override-type outside actuating mechanism species 644, and the third inside actuating assembly species 693 includes the push-type inside operating mechanism species 673, the push-button inside actuating mechanism species 681, and the open inside handle species 662. A lockset of the third species 1103 may, for example, be assembled from a second privacy-function species of the kit 500, in which the latchbolt mechanism 520, the outside actuating mechanism 540, and the inside operating mechanism 570 are respectively provided in the form of the restoring spring-latch latchbolt mechanism 920, the second override mechanism 740, and the push-type plunger assembly 830.

The modular components included in the third lockset species 1103 interact with the common platform 610 to provide various features characteristic of privacy-function locksets, including selective locking of the outside handle, automatic unlocking, and emergency access provisions. These characteristics are provided to locksets of the hospital privacy species 1103 in a manner substantially similar to that described above with reference to the bedroom privacy species 1102, the details of which need not be repeated herein.

In contrast to the bedroom privacy species 1102, in which emergency release is provided via the tool-assisted override mechanism 730, the graspable flange 746 facilitates direct manual manipulation of the manual override mechanism 740, thereby expediting emergency access for locksets of the hospital privacy species 1103. The hospital privacy species 1103 may provide for a certain degree of privacy and security, while still enabling rapid access in the event of an emergency situation. Such a feature may be advantageous in healthcare settings, particularly in situations in which caretakers need to render assistance to a patient locked within a room.

A fourth lockset species 1104 provides a first entry/office function corresponding to ANSI function F82A ("Entry, Office"), and may alternatively be referred to as the first entry/office species 1104. The fourth lockset species 1104 includes the common platform 610, the deadlatching latchbolt mechanism species 621, the first outside actuating assembly species 651, and the third inside actuating assembly species 693. As noted above, the first outside actuating assembly species 651 includes the open outside handle species 632 and the first cylinder-type outside actuating mechanism species 641, and the third inside actuating assembly species 693 includes the push-type inside operating mechanism species 673, the push-button inside actuating mechanism species 681, and the open inside handle species 662. A lockset of the fourth species 1104 may, for example, be assembled from a first entry/office-function species of the kit 500, in which the latchbolt mechanism 520, the outside actuating mechanism 540, and the inside operating mechanism 570 are respectively provided in the form of the deadlatching latchbolt mechanism 910, the standard-type lock cylinder assembly 710, and the push-type plunger assembly 830.

The common platform 610 cooperates with the modular components included in the fourth lockset species 1104 to provide various features that are characteristic of entry/office-function locksets, including selective locking of the outside handle from the secured or inner side of the lockset, key-assisted opening from the outer side of the lockset, and deadlocking of the latchbolt. One characteristic of the entry/office function is that the outside handle is selectively locked by a locking mechanism that can be manually manipulated from the secured or inner side of the lockset. In the fourth lockset species 1104, this characteristic is provided in part by the push-type plunger assembly 830, which facilitates selective locking of the outside handle in the manner described above with reference to FIG. 12.

Another characteristic of the entry/office function is the presence of a lock cylinder that enables key-assisted operation from the unsecured or outer side of the lockset when the outside handle is locked. In the fourth lockset species 1104, this characteristic is provided in part by the standard-type lock cylinder assembly 710, which facilitates key-assisted actuation of the latchbolt mechanism in the manner described above with reference to FIG. 12. Entry/office locksets also typically deadlock the latchbolt when the door is closed in order to prevent the latchbolt from being driven to its retracted position by an externally-applied pushing force. In the fourth lockset species 1104, this feature is provided in part by the deadlatching latchbolt mechanism 910, which deadlocks the latchbolt 914 in the manner described above with reference to FIG. 11*a*.

A further characteristic of certain entry/office locksets is the automatic unlocking of the outside handle in response to certain actuating inputs. In the fourth lockset species 1104, this characteristic is provided in part by the push-type plunger assembly 830, which facilitates a releasable locking state in the manner described above with reference to FIG. 12. When in such a releasable locking state, locksets of the fourth species 1104 automatically transition to the unlocking state in response to the shuttle 360 being driven to its retracted position, such as by a lock-releasing actuation. For the fourth lockset species 1104, lock-releasing actuation include rotation of the key cam shell 410 by the lock cylinder assembly 710 and rotation of the inside chassis spindle 330 by the inside handle. However, due to the unidirectional engagement feature 917 provided on the bolt bar 915, depression of the latchbolt 924 does not serve as a lock-releasing actuation for the fourth lockset species 1104. Thus, when in the releasable locking state, locksets of the fourth species 1104 automatically unlock when the lock cylinder 760 is actuated or the inside handle is rotated, but remain locked when the door 80 is moved to its closed position.

A fifth lockset species 1105 provides a second entry/office function corresponding to ANSI function F81 ("Entry"), and may alternatively be referred to as the second entry/office species 1105. The fifth lockset species 1105 includes the common platform 610, the deadlatching latchbolt mechanism species 621, the first outside actuating assembly species 651, and the fifth inside actuating assembly species 695. As noted above, the first outside actuating assembly species 651 includes the open outside handle species 632 and the first cylinder-type outside actuating mechanism species 641, and the fifth inside actuating assembly species 695 includes the second push/turn inside operating mechanism species 675, the push/turn inside actuating mechanism species 682, and the open inside handle species 662. A lockset of the fifth species 1105 may, for example, be assembled from a second entry/office-function species of the kit 500, in which the latchbolt mechanism 520, the outside actuating mechanism 540, and the inside operating mechanism 570 are respectively provided in the form of the deadlatching latchbolt mechanism 910, the standard-type lock cylinder assembly 710, and the second push/turn plunger assembly 850.

As noted above, certain entry/office locksets provide for automatic unlocking of the outside handle, for example when the inside handle is rotated. Other types of entry/office locksets, such as those of the second entry/office species 1105, do not provide for such a releasable locking state, and instead provide for a persistent locking state. In locksets of the second entry/office species 1105, this feature is provided in part by the second push/turn plunger assembly 850, which operates in the manner described above with reference to FIG. 12.

A sixth lockset species 1106 provides an entry function corresponding to ANSI function F109 ("Entry"), and may alternatively be referred to as the entry species 1106. The sixth lockset species 1106 includes the common platform 610, the deadlatching latchbolt mechanism species 621, the first outside actuating assembly species 651, and the fourth inside actuating assembly species 694. As noted above, the first outside actuating assembly species 651 includes the open outside handle species 632 and the first cylinder-type outside actuating mechanism species 641, and the fourth inside actuating assembly species 694 includes the second button-type inside operating mechanism species 674, the push/turn inside actuating mechanism species 682, and the open inside handle species 662. A lockset of the sixth species 1106 may, for example, be assembled from an entry-function species of the kit 500, in which the latchbolt mechanism 520, the outside actuating mechanism 540, and the inside operating mechanism 570 are respectively provided in the form of the deadlatching latchbolt mechanism 910, the standard-type lock cylinder assembly 710, and the first push/turn plunger assembly 840.

The common platform 610 cooperates with the modular components included in the sixth lockset species 1106 to provide various features that are characteristic of entry-function locksets, including selective locking of the outside handle from the secured or inner side of the lockset, key-assisted opening from the unsecured or outer side of the lockset, and deadlocking of the latchbolt. These characteristics are provided to locksets of the entry species 1106 in a manner similar to that described above with reference to the entry/office species 1104, the details of which need not be repeated herein.

An additional characteristic of the entry function is user-selectable automatic unlocking. In locksets of the entry species 1106, this feature is provided in part by the first push/turn plunger assembly 840, which can be manipulated to adjust the lockset between a releasable locking state and a persistent locking state in the manner described above with reference to FIG. 12. When in the unlocked state, a lockset of the entry species 1106 can be placed in the releasable locking state by pressing the push/turn button 682' to drive the plunger 890 to its proximal or depressed position. When in the releasable locking state, the lockset automatically returns to the unlocking state in response to the shuttle 360 being driven to its retracted position, for example by a lock-releasing actuation. Lock-releasing actuations for the entry species 1106 include rotation of the key cam shell 410 by the lock cylinder assembly 710 and rotation of the inside chassis spindle 330 by the inside handle. However, due to the unidirectional engagement feature 917 provided on the bolt bar 915, depression of the latchbolt 914 does not serve as an actuating input for the entry species 1106.

When in the releasable locking state, a lockset of the entry species 1106 can be placed in the persistent locking state by rotating the push/turn button 682' to drive the plunger 890 to its rotated position. With the lockset in the persistent locking state, the actuating inputs do not cause the lockset to return to the unlocking state. Rotating the push/turn button 682' to return the plunger 890 to its home position causes the lockset to return to the releasable locking state, from which the lockset can be transitioned to the unlocking state by each and any of the lock-releasing inputs for the entry species 1105.

A seventh lockset species 1107 provides a storeroom function corresponding to ANSI function F86 ("Storeroom/Closet"), and may alternatively be referred to as the storeroom species 1107. The seventh lockset species 1107 includes the common platform 610, the deadlatching latchbolt mechanism species 621, the first outside actuating assembly species 651, and a second inside actuating assembly species 692. As noted above, the first outside actuating assembly species 651 includes the open outside handle species 632 and the first cylinder-type outside actuating mechanism species 641, and the second inside actuating assembly species 692 includes the closed inside handle species 661 and the fixed inside operating mechanism species 672. A lockset of the seventh species 1107 may, for example, be assembled from a storeroom-function species of the kit 500, in which the latchbolt mechanism 520, the outside actuating mechanism 540, and the inside operating mechanism 570 are respectively provided in the form of the deadlatching latchbolt mechanism 910, the standard-type lock cylinder assembly 710, and the fixed plunger 820.

The common platform 610 cooperates with the modular components included in the seventh lockset species 1107 to provide various features that are characteristic of storeroom-function locksets, including deadlocking of the latchbolt. This characteristic is provided in part by the deadlatching latchbolt mechanism 910 in a manner similar to that described above with reference to the entry/office species 1104. Another feature that is characteristic of the storeroom function is that the outside handle is locked at all times, and is therefore always inoperable to retract the latchbolt. In locksets of the storeroom species 1107, this feature is provided in part by the fixed plunger 820, which provides a fixed locking state in the manner described above with reference to FIG. 13. A further characteristic of the storeroom function is key-assisted latchbolt retraction from the unsecured or outer side of the lockset. In locksets of the storeroom species 1107, this feature is provided in part by the standard-type lock cylinder assembly 710, which is operable to retract the latchbolt in the manner described above with reference to FIG. 12. With the fixed plunger 820 retaining the lockset in the fixed locking state, neither operation of the lock cylinder assembly 710 nor rotation of the inside handle will serve to unlock the outside handle.

An eighth lockset species 1108 provides an exit function corresponding to ANSI function F89 ("Exit"), and may alternatively be referred to as the exit species 1108. The eighth lockset species 1108 includes the common platform 610, the deadlatching latchbolt mechanism species 621, the fifth outside actuating assembly species 655, and the second inside actuating assembly species 692. As noted above, the fifth outside actuating assembly species 655 includes the closed outside handle species 631 and the exit-type outside actuating mechanism species 645, and the second inside actuating assembly species 692 includes the fixed inside operating mechanism species 672 and the closed inside handle species 661. A lockset of the eighth species 1108 may, for example, be assembled from an exit-function species of the kit 500, in which the latchbolt mechanism 520, the outside actuating mechanism 540, and the inside operating mechanism 570 are respectively provided in the form of the deadlatching latchbolt mechanism 910, the stop assembly 750, and the fixed plunger 820.

One feature that is characteristic of the exit function is the presence of a deadlocking latchbolt that cannot be operated by the outside handle. In the locksets of the exit species 1108, this feature is provided in part by the fixed plunger 820, which retains the lock control lug 430 in the locking position in the manner described above with reference to FIGS. 13 and 16.

Those skilled in the art will readily recognize that if the outside handle of an exit-function lockset were removed, a user may be able to manipulate the internal components of the lockset to permit unauthorized entry from the unsecured region 72. Accordingly, it may be advantageous in exit-function locksets to prevent removal of the outside handle from the unsecured region 72 when the door 80 is latched in its closed position. In locksets of the exit species 1108, this feature is provided in part by the fixed plunger 820 and the stop assembly 750. More specifically, the fixed plunger 820 retains the stop member 751 in its proximal position, in which the wall 755 engages the catch post 219 and prevents the catch plate 217 from being driven to its depressed position. In order to permit removal of the outside handle, the lockset may be partially disassembled to remove the fixed plunger 820.

A ninth lockset species 1109 provides a classroom function corresponding to ANSI function F84 ("Classroom"), and may alternatively be referred to as the classroom species 1109. The ninth lockset species 1109 includes the common platform 610, the deadlatching latchbolt mechanism species 621, the second outside actuating assembly species 652, and the sixth inside actuating assembly species 696. As noted above, the second outside actuating assembly species 652 includes the open outside handle species 632 and the second cylinder-type outside actuating mechanism species 642, and the sixth inside actuating assembly species 696 includes the closed inside handle species 661. A lockset of the ninth species 1109 may, for example, be assembled from a classroom-function species of the kit 500, in which the latchbolt mechanism 520 and the outside actuating mechanism 540 are respectively provided in the form of the deadlatching latchbolt mechanism 910 and the classroom-type lock cylinder assembly 720. While the inside actuating assembly species 696 of the illustrated ninth lockset species 1109 does not include an inside operating mechanism 570, it is also contemplated that the ninth lockset species 1109 may be provided with the first inside actuating assembly species 691, which includes the inactive cup 810 of the first inside operating mechanism species 671.

The common platform 610 cooperates with the modular components included in the ninth lockset species 1109 to provide various features that are characteristic of classroom-function locksets, including deadlocking of the latchbolt. This characteristic is provided in part by the deadlatching latchbolt mechanism 910 in a manner similar to that described above with reference to the entry/office species 1104. Another feature that is characteristic classroom-function locksets is key-assisted locking and unlocking of the outside handle from the unsecured or outer side of the lockset. In locksets of the classroom species 1109, this feature is provided in part by the classroom-type lock cylinder assembly 720, which cooperates with the key cam 400 to drive the lock control lug 430 between its locking and unlocking positions in the manner described above with reference to FIG. 15.

In certain classroom-function locksets, when the outside handle is locked, the outside lock cylinder is capable of retracting the latchbolt without unlocking the outside handle. In locksets of the classroom species 1109, this feature is provided in part by the classroom-type lock cylinder assembly 720, which is capable of rotating the key cam shell 410 without driving the lug 430 to its unlocking position. As described above with reference to FIG. 15, when the key cam 400 is in its locking state, the classroom-type lock cylinder assembly 720 is capable of returning the key cam 400 to its unlocking state, and is also capable of rotating the key cam shell 410 while maintaining the locking state of the key cam 400. More specifically, rotation of the classroom tailpiece 721 in the unlocking direction causes the lug 430 to move to its unlocking position, whereas rotation of the tailpiece 721 in the locking direction causes the pin 446 to engage and rotate the key cam shell 410 while the lug 430 remains in its locking position.

As will be appreciated, the product line 1100 may include additional or alternative lockset species 1190 not specifically illustrated in FIG. 17. In certain embodiments, such additional or alternative species may be provided by selecting a set 501 of peripheral components 502 in a combination not specifically in illustrated the product line 1100. As one example, an alternative lockset species may be substantially similar to the bedroom privacy species 1102, while including one of the push/turn inside operating mechanism species 674, 675 and the push/turn inside actuating mechanism species 682 in place of the push-type inside operating mechanism species 673 and push-type inside actuating mechanism species 681. Locksets of such a species would be provided with a persistent locking state in addition or as an alternative to the releasable locking state.

Additionally, the product line 1100 may include one or more lockset species 1190 including peripheral components not specifically illustrated in the product line system 600, such as a sensor assembly. As one example, the system 600 may include a request-to-exit (REX) sensor assembly species, such as the REX sensor assembly illustrated in FIGS. 31 and 32. In such forms, one or more of the illustrated lockset species 1101-1109 may have a corresponding lockset species 1190 in which the REX sensor assembly is included. For instance, a storeroom-REX lockset species may include the REX sensor assembly species in addition to the component species that are included in the storeroom lockset species 1107.

Furthermore, while the product line 1100 has been described as including a plurality of lockset species 1190 and lockset kits 500, it is to be appreciated that the product line 1100 may additionally or alternatively include one or more species of the peripheral component kit 500'. Species of such a peripheral component kit 500' may include the same set 501 of peripheral components 502 as a corresponding one of the lockset species 1190, while omitting the common platform 610. For example, an exit-function species of the peripheral component kit 500' may include a latchbolt mechanism 520 of the first latchbolt mechanism species 621, an outside actuating assembly 550 of the fifth outside actuating assembly species 655, and an inside actuating assembly 590 of the second inside actuating assembly species 592.

As is evident from the foregoing, the product line system 600 facilitates the creation of a product line 1100 in which a common platform 610 is utilized in each of a plurality of lockset species 1190 having different functions. Additionally, the modular nature of the system 600 facilitates the assembly of a lockset having a desired function, as the peripheral components can be installed to the common platform 610 without requiring disassembly of the chassis assembly 612 or the inside drive assembly 614. Thus, the common platform 610 may be partially assembled prior to final assembly and/or installation, which may facilitate such final assembly and/or installation. As one example, the common platform 610 may be provided with each of the chassis assembly 612 and the inside drive assembly 614 in a preassembled state, and a peripheral component kit 500' may be provided with the set of peripheral components 502 corresponding to a desired function for the lockset. As another example, such a peripheral component kit 500' may be provided in combination with the common platform 610 as a lockset kit 500. These features among others may simplify various stages of the supply chain, including manufacture, sale/purchase, distribution, assembly, and installation.

From a manufacturer's perspective, the common platform 610 may be produced en masse without regard to the particular functions that may eventually be requested by the customer. Kits or partially assembled locksets may then be put together at final assembly, thereby obviating the need to inventory function-specific chassis assemblies. With the chassis assembly 612 and inside drive assembly 614 having been previously assembled, for example in the manufacturing and/or initial assembly stages, preparation of a kit 500 including the appropriate modular components may be simplified.

The above-noted features of the system 600 may also simplify matters for other parties, such as by reducing inventory requirements. By way of example, a locksmith or distributor may have in inventory the common platform 610 along with various species 602 of the modular component families 604, which may be selectively combined based upon the requirements of a particular customer order. In many conventional product line systems, by contrast, a distributor or locksmith may be required to inventory function-specific formats of chassis assemblies, or even function-specific formats of complete locksets.

The system 600 may further provide for simplified modification or retrofitting of an existing lockset that was assembled from the system 600 by facilitating the removal of one or more previously-installed modular components and the addition of one or more newly-selected modular components without requiring that the lockset be uninstalled and/or fully disassembled. An example of a process for converting a lockset from one function to another is provided below. While the following description is made with reference to converting an existing lockset of the passage species 1101 to the bedroom privacy species 1102, it is to be appreciated that similar steps may be undertaken to provide for different types of conversions.

The conversion of a lockset from one function to another may involve procuring the modular components that are associated with the new function, but which are not provided in the existing lockset. When converting a lockset of the passage species 1101 to the privacy species 1102, this step may involve procuring an outside handle of the open-type outside handle species 632, a tool-assisted override mechanism 730 of the first override-type outside actuating mechanism species 643, an inside handle of the open-type inside handle species 662, a push-type plunger assembly 830 of the push-type inside operating mechanism species 673, and a push-button of the push-button inside actuating mechanism species 681.

The conversion process also includes partially disassembling the previously-installed lockset. The user may partially disassemble the installed lockset of the passage species 1101 by removing the outside handle of the closed-type outside handle species 631 and removing the inside handle of the closed-type inside handle species 661. Each of the handles may be removed by engaging the appropriate handle catch 216 to drive the catch plate 217 to the depressed positions thereof, thereby enabling removal of the handle from the corresponding one of the drive spindles 230, 134.

As will be appreciated, partially disassembling the installed lockset may also include removing the chassis assembly 200, 612 from the door 80. In such embodiments, the common platform 610 may be partially disassembled by decoupling the inside drive assembly 130, 614 from the chassis assembly 200, 612 without disassembling the chassis assembly 200, 612. This step may, for example, involve disengaging the mounting bolts 136 from the mounting posts 212, and separating the inside drive assembly 130, 614 from the chassis assembly 200, 612. When converting a lockset of the passage species 1101 to the privacy species 1102, the inactive cup 810 of the inactive inside operating mechanism species 671 may be removed from the inside chassis spindle 330, for example by depressing the coupling tab 816 and pulling the cup 810 out of the inside chassis spindle 330.

The conversion process also involves installing the one or more newly-selected modular components to the chassis assembly 200. When converting a lockset of the passage species 1101 to the privacy species 1102, this step may involve installing the handle of the open-type outside handle species 632 and the tool-assisted override mechanism 730 of the first override-type outside actuating mechanism species 643 to the outside drive assembly 210. Installing the tool-assisted override mechanism 730 may involve inserting the override mechanism 730 into the outside drive spindle 230 such that the narrowed section 784 of the tailpiece 780 is aligned with the handle catch 216 and permits movement of the catch plate 217 to its depressed position. Installing the outside handle may involve depressing the catch plate 217 and sliding the shank 162 onto the outside drive spindle 230 such that the tower 773 enters the channel in the shank 162, and the splines 165 in the shank 162 enter the grooves 235 of the drive spindle 230. When the catch opening 166 in the shank 162 becomes aligned with the catch opening 239 in the drive spindle 230, the catch plate 217 returns to its projected position under the biasing force of the leaf spring 218, thereby longitudinally coupling the handle with the drive spindle 230.

When converting a lockset of the passage species 1101 to the privacy species 1102, the reassembly step also includes installing the push-type plunger assembly 830 of the push-type inside operating mechanism species 673 to the chassis assembly 200 and installing the push-button of the push-button inside actuating mechanism species 681 to the push-type plunger assembly 830. Installing the push-type plunger assembly 830 may involve inserting the cup 831 into the inside chassis spindle 330 such that the alignment ridge 835 enters the alignment notch 338 and the coupling tab 836 projects into the coupling slot 337, thereby rotationally and longitudinally coupling the spindle 330 and the cup 831. With the spindle 330 retaining the coupling tab 836 in a partially-depressed position, the tab 836 limits radial movement of the plunger 890 and prevents the guide arm 898 from exiting the guide slot 838. Installing the push-button of the push-button inside actuating mechanism species 681 may involve mounting the push-button to the prongs 896 such that the mounting tabs 897 engage and retain the push-button 681.

The conversion process may further include reassembling the lockset and/or reinstalling the lockset to the door. When converting a lockset of the passage species 1101 to the privacy species 1102, this step may involve reattaching the inside drive assembly 130, 614 to the chassis assembly 200, 612, and mounting the inside handle of the open-type inside handle species 662 to the inside drive assembly 130, 614. Reattaching the inside drive assembly 130, 614 may involve sliding the inside drive spindle 134 onto the inside chassis spindle 330 such that the splines 334 of the chassis spindle 330 enter receiving slots in the drive spindle 134.

With the outside spring cage housing 220 adjacent or abutting the outer surface 82 of the door and the inside spring cage housing 132 adjacent or abutting the inner side 83 of the door 80, the mounting bolts 136 may be engaged with the mounting posts 212 to secure the partially-assembled lockset to the door 80. With the inside rose 107 mounted to the inside drive assembly 130 and covering the inside housing 132, the inside handle may be installed such that the push-button extends into the access port 169, thereby completing the conversion process. With the conversion process complete, the lockset is of the bedroom privacy species 1102, and operates according to the bedroom privacy function.

Figure 18:
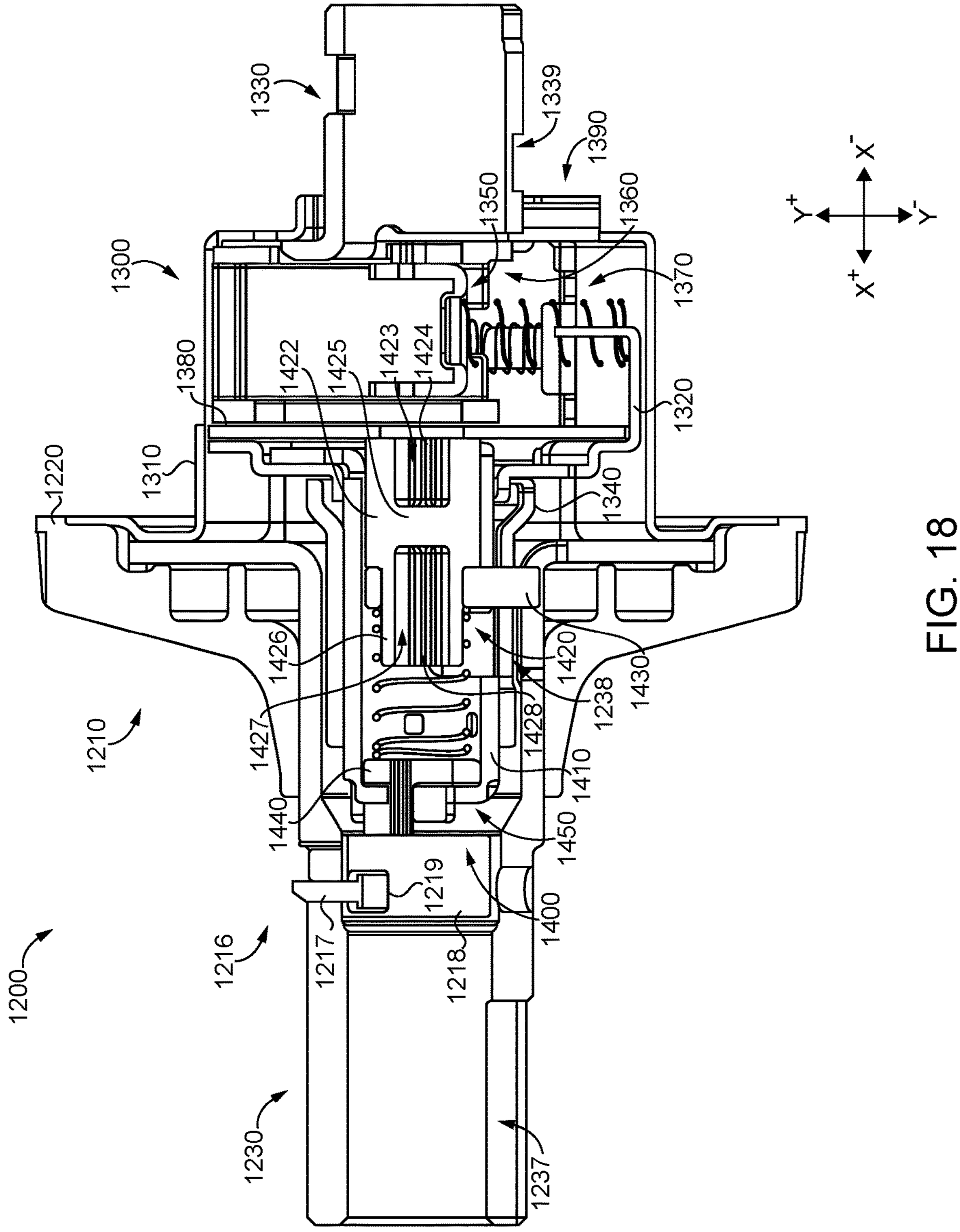
FIG. 18 is a cross-sectional illustration of a chassis assembly according to certain embodiments.

With reference to FIG. 18, illustrated therein is a chassis assembly 1200 according to certain embodiments. The chassis assembly 1200 includes an outside drive assembly 1210 and a chassis 1300, which are substantially similar to the outside drive assembly 200 and chassis 300 illustrated in FIGS. 2 and 3. Unless indicated otherwise, similar reference characters are used to indicate similar elements and features. For example, the outside drive assembly 1210 includes an outside housing 1220 and an outside drive spindle 1230, which respectively correspond to the outside housing 220 and outside drive spindle 230 illustrated in FIG. 2. Likewise, the chassis 1300 includes, among other elements and features, an inside chassis spindle 1330, a key cam sleeve 1340, and a shuttle 1360, which respectively correspond to the inside chassis spindle 330, key cam sleeve 340, and shuttle 360 illustrated in in FIG. 3. In the interest of conciseness, the following descriptions are primarily focused on elements and features of the chassis assembly 1200 that are different from and/or were not specifically described with respect to the chassis assembly 200.

Figure 19A:
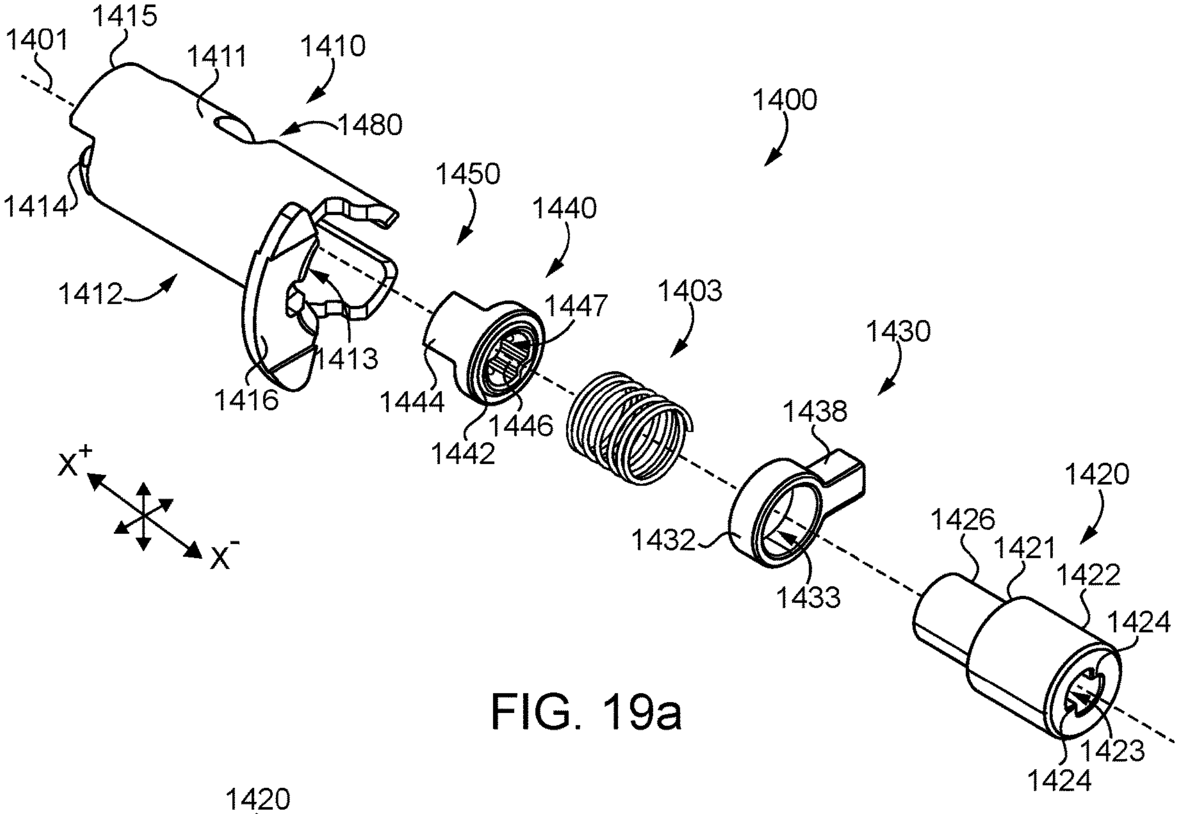
FIGS. 19*a* and 19*b* are exploded assembly views of a key cam according to certain embodiments.
Figure 19B:
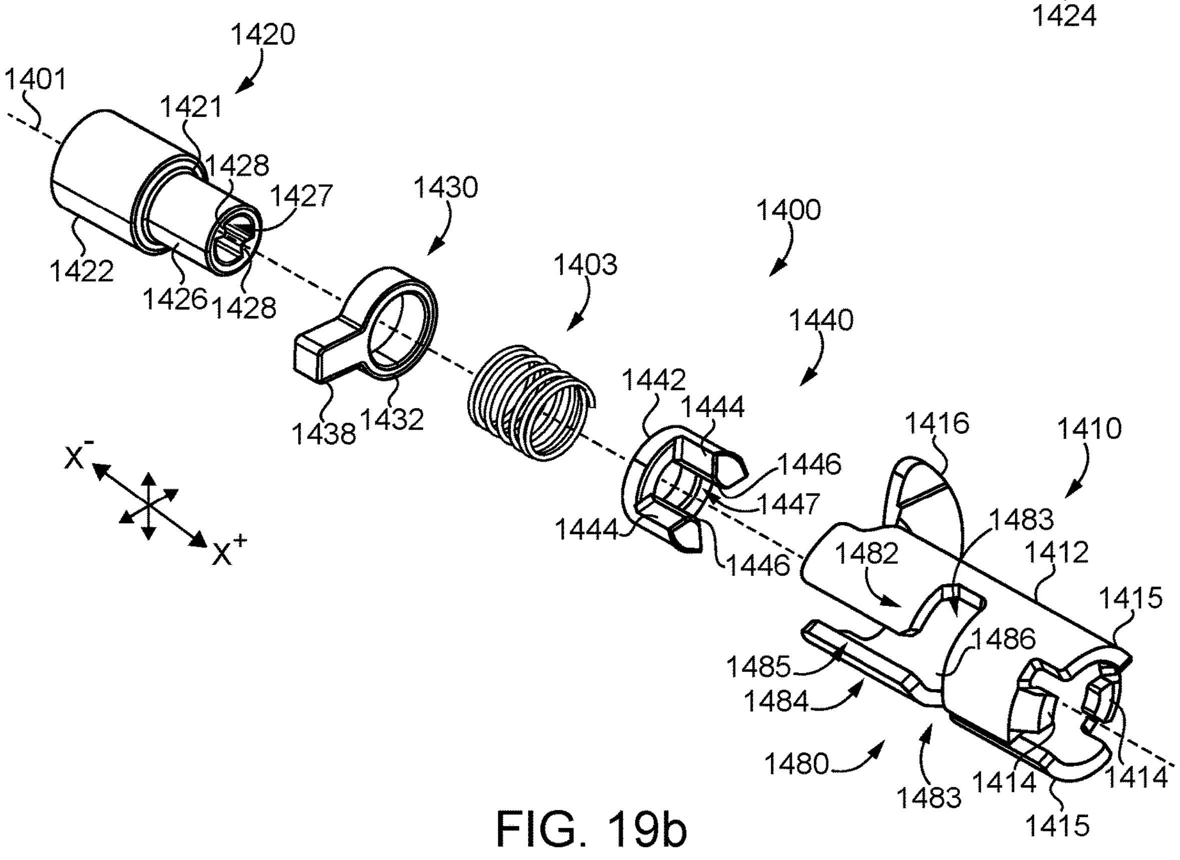

With additional reference to FIGS. 19*a* and 19*b*, the chassis 1300 further includes a key cam 1400, which performs certain features analogous to those of the key cam 400 illustrated in FIG. 4. The key cam 1400 generally includes a shell 1410, a plug 1420 movably mounted in the shell 1410, a lock control lug 1430 mounted in the shell 1410 and supported by the plug 1420, and a lost motion driver 1440 movably seated in the shell 1410. The key cam 1400 also includes a biasing member in the form of a spring 1403, which is seated between the lug 1430 and the driver 1440. The spring 1403 biases the plug 1420 and the lug 1430 in the distal direction ($X^-$), and biases the driver 1440 in the proximal direction ($X^+$). As described herein, the lost motion driver 1440 cooperates with the shell 1410 to form a lost rotational motion connection 1450.

The shell 1410 includes a tubular body portion 1412 that is defined by a circumferential sidewall 1411, and which has a chamber 1413 formed therein. The chamber 1413 has an open distal end, and a proximal end portion that is partially enclosed by a pair of key cam shell teeth or fingers 1414, and which may include a pair of proximally-extending support walls 1415. The fingers 1414 define a bowtie opening in the proximal end of the shell 1410. An ear 1416 is formed adjacent a distal end of the body portion 1412, and is configured to engage the shuttle 1360 in the manner described above with reference to the key cam shell 410 and the shuttle 360. Thus, rotation of the shell 1410 from its home position towards its rotated position is operable to retract the shuttle 1360 for actuation of a latchbolt mechanism.

The shell 1410 also includes a lug opening 1480 that is formed in the wall 1411, and which is in communication with the chamber 1413. The lug opening 1480 is substantially similar to the lug opening 480 of the above-described key cam shell 410, and similar reference characters are used to indicate similar features. For example, the lug opening 1480 is substantially T-shaped, and includes an arc slot 1482 having arc slot portions 1483, a longitudinal slot 1484 having a longitudinal slot portion 1485, and an intersection 1486, which respectively correspond to the arc slot 482, longitudinal slot 484, and intersection 486 of the above-described lug opening 480.

The plug 1420 includes a body portion 1422 and a post 1426 extending proximally from the body portion 1422. The body portion 1422 has a greater diameter than the post 1426, such that a shoulder 1421 is formed at a proximal end of the body portion 1422. The plug 1420 includes a pair of bowtie openings 1423, 1427 that are separated from one another by a wall 1425 (FIG. 18). More specifically, a distal bowtie opening 1423 is formed in the body portion 1422, a proximal bowtie opening 1427 is formed in the post 1426, and the wall 1425 is defined between the bowtie openings 1423, 1427. The distal bowtie opening 1423 has an open distal end, and is defined in part by a pair of distal teeth 1424. Similarly, the proximal bowtie opening 1427 has an open proximal end, and is defined in part by a pair of proximal teeth 1428.

The lock control lug 1430 includes an annular portion 1432 that is seated in the chamber 1413, and a lock control arm 1438 that extends radially outwardly from the annular portion 1432. The annular portion 1432 defines an opening 1433 sized and configured to receive the plug post 1426, on which the lock control lug 1430 is rotatably mounted. The arm 1438 extends into the receiving slot 1238 of the outside drive spindle 1230 via the lug opening 1480 of the shell 1410. The lug 1430 is configured to selectively couple the spindle 1230 with the shell 1410, and is movable between a proximal locking position and a distal unlocking position. With the lug 1430 in its locking position, the arm 1438 is received in the intersection 1486, and the arc slot 1482 enables relative rotation of the spindle 1230 and the shell 1410. With the lug 1430 in its unlocking position, the arm 1438 is received in the longitudinal slot portion 1485, and couples the spindle 1230 and the shell 1410 for joint rotational movement.

The lost motion driver 1440 includes an annular base 1442, a pair of driver lugs 1444 extending proximally from the annular base 1442, and a pair of driver teeth 1446. The teeth 1446 are formed on the radially inner surface of the driver 1440, and extend along the lugs 1444. The driver 1440 also includes a bowtie opening 1446, which is defined in part by the teeth 1446.

With the key cam 1400 assembled, the fingers 1414 bear against the proximal face of the annular base 1442, thereby limiting movement of the driver 1440 in the proximal direction ($X^+$). The shell 1410 may include one or more features that limit movement of the driver 1440 in the distal direction ($X^-$). By way of example, the shell 1410 may be subjected to a staking operation to form projections on the radially-inner surface thereof. The support walls 1415 may provide radial support for the driver lugs 1444, thereby discouraging pivoting of the driver 1440 about axes transverse to the rotational axis 1401. The fingers 1414 cooperate with the lugs 1444 to form a lost rotational motion connection 1450 between the shell 1410 and the driver 1440, thereby permitting for limited relative rotation of the shell 1410 and the driver 1440. While other lost motion angles are contemplated, in the illustrated embodiment, the fingers 1414 and the lugs 1444 are sized and shaped to enable relative rotation of the shell 1410 and the driver 1440 through a lost rotational motion angle of about sixty degrees (60°).

In FIG. 18, the chassis assembly 1200 is illustrated in an unlocking state, in which the lug 1430 is in its unlocking position, and the outside drive spindle 1230 is capable of rotating the key cam shell 1410 to retract the shuttle 1360. In this state, the lug arm 1438 extends into the receiving slots 1238, 1348 via the longitudinal slot portion 1485, thereby rotationally coupling the outside spindle 1230 with the key cam shell 1410. The chassis assembly 1200 also has a locking state, in which the lug 1430 is in its locking position, and the outside drive spindle 1230 is not capable of rotating the key cam shell 1410. With the chassis assembly 1200 in its locking state, the arm 1438 is received in the intersection 1486, and the outside spindle 1230 is rotationally decoupled from the key cam shell 1410. As will be appreciated, the chassis assembly 1200 can be transitioned between its locking and unlocking states by longitudinally driving the lug 1430 between its proximal locking position and its distal unlocking position.

The illustrated chassis assembly 1200 has a freewheel-type locking state, in which the lug 1430 does not engage the housing 1220, and the outside drive spindle 1230 is capable of rotating without retracting the shuttle 1360. In the illustrated embodiment, the length of the lug arm 1438 is selected such that the arm 1438 does not significantly protrude beyond the radially outer surface of the outside drive spindle 1230, and therefore does not engage the housing 1220 when the lug 1430 is in its locking position. It is also contemplated that the chassis assembly 1200 may be configured to provide for freewheel-type locking in another manner. For example, the housing 1220 may include an arcuate recess that receives the arm 1438 when the lug 1430 is in its locking position. In such forms, the arm 1438 may travel along the arcuate recess and the arc slot 1482 such that the outside spindle 1230 is capable of rotating relative to the housing 1220 and the key cam shell 1410. In further embodiments, the chassis assembly 1200 may have a locked-stationary locking state, in which the lug 1430 engages the housing 1220 and prevents rotation of the outside drive spindle 1230 in a manner analogous to that described above with reference to FIG. 6.

The chassis assembly 1200 may be utilized as a portion of a lockset, such as the lockset 100 illustrated in FIG. 1. For example, the chassis assembly 180 of the lockset 100 may be provided in the form of the chassis assembly 1200. In certain forms, the chassis assembly 1200 may be provided in a kit from which the lockset 100 can be assembled, such as the lockset kit 500 illustrated in FIG. 7. For example, the common platform 510 of the kit 500 may include a chassis assembly 512 in the form of the chassis assembly 1200, and an inside drive assembly 514 in the form of the inside drive assembly 130. The kit 500 may further include one or more modular peripheral components 502 configured for use with the chassis assembly 512, 1200. One or more of the peripheral components 502 may have a corresponding component family, and may be provided in the form of a modular component species within the corresponding component family. The component families and species may be defined by a system with which the kit 500 is associated, such as the product line system 1600 illustrated in FIG. 20.

Figure 20:
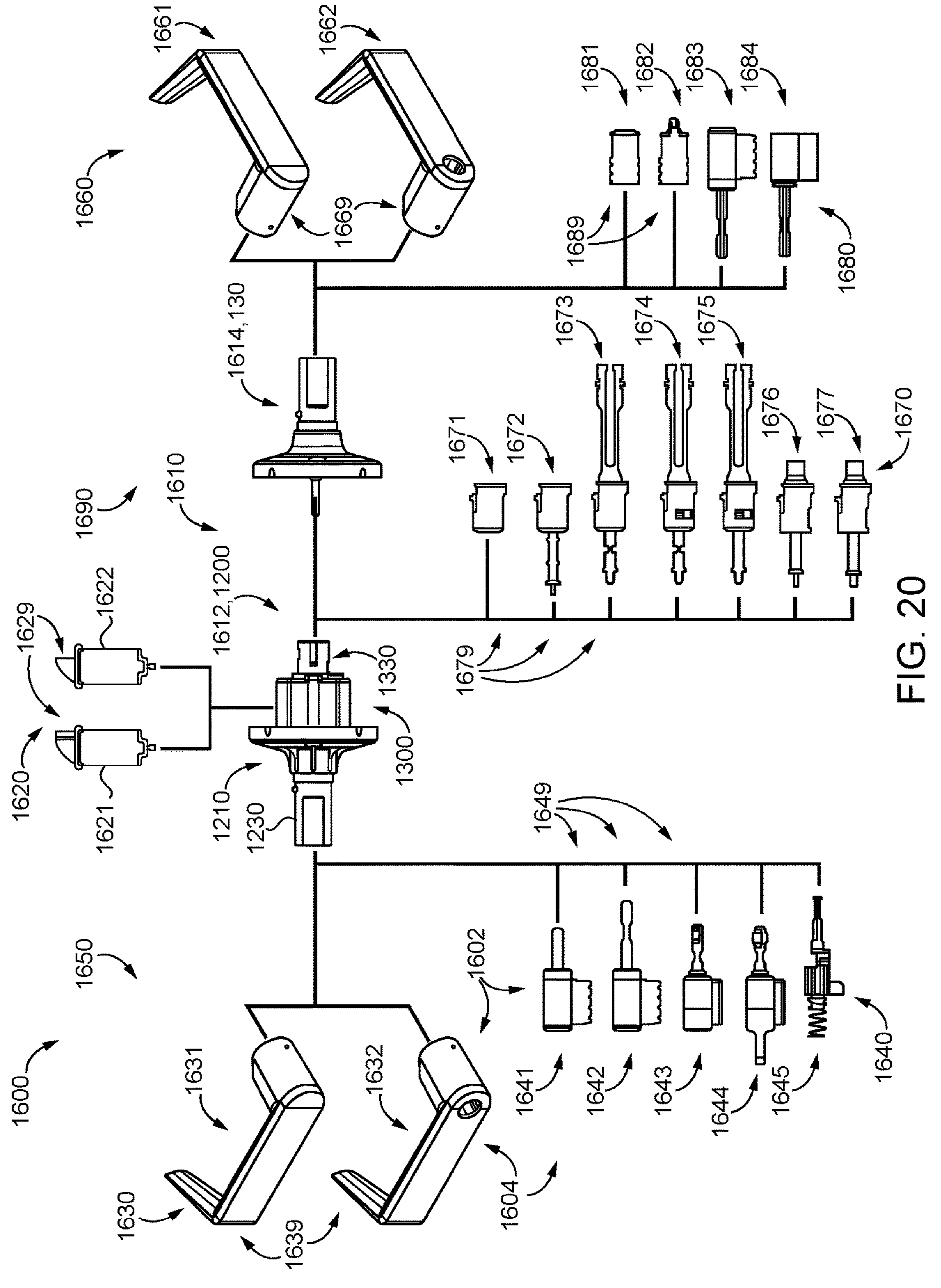
FIG. 20 is a schematic representation of a product line system according to certain embodiments.

FIG. 20 illustrates a product line system 1600 according to certain embodiments. The system 1600 includes a common platform 1610 and a plurality of peripheral component species 1602. The common platform 1610 includes a chassis assembly 1612 and an inside drive assembly 1614, which in the illustrated embodiment are respectively provided as the chassis assembly 1200 and the inside drive assembly 130. The system 1600 also includes a plurality of peripheral component families 1604, each of which includes a subset of the component species 1602. Each of the component species 1602 is configured for use with the common platform 1610, and species 1602 within a given family 1604 are operable to be interchangeably installed to the common platform 1610. As described herein, each species 1602 of each family 1604 is configured to interact with the common platform 1610 and/or one or more species 1602 of another family 1604 to provide the assembled lockset with one or more features and/or characteristics.

The component families 1604 of the product line system 1600 are substantially similar to component families 604 of the product line system 600 illustrated in FIG. 8, and similar reference characters are used to indicate similar elements and features. For example, the system 1600 includes a latchbolt mechanism family 1620, an outside actuating assembly family 1650, and an inside actuating assembly family 1690, which respectively correspond to the latchbolt mechanism family 620, outside actuating assembly family 650, and inside actuating assembly family 690 of the above-described system 600. Additionally, the outside actuating assembly family 1650 includes an outside handle family 1630 and an outside actuating mechanism family 1640, which respectively correspond to the outside handle family 630 and outside actuating mechanism family 640 of the above-described outside actuating assembly family 650. Similarly, the inside actuating assembly family 1690 includes an inside handle family 1660, an inside operating mechanism family 1670, and an inside actuating mechanism family 1680, which respectively correspond to the inside handle family 660, inside operating mechanism family 670, and inside actuating mechanism family 680 of the above-described inside actuating assembly family 690.

Furthermore, several of the component families 1604 include species 1602 that are substantially similar to those described above with reference to FIGS. 9-16. Unless indicated otherwise, similar reference characters are used to indicate similar elements and features. In the interest of conciseness, the following descriptions are primarily focused on elements and features of the system 1600 that are different from those of the above-described system 600 and/or were not specifically described with reference to the system 600. It is to be appreciated, however, that the descriptions provided above with reference to the illustrated and alternative embodiments of the system 600 may be equally applicable to the illustrated and alternative embodiments of the system 1600. Thus, to the extent that the foregoing descriptions do not conflict with the descriptions made hereinafter, such non-conflicting descriptions of the system 600 may also be considered to describe corresponding elements and features of the system 1600.

The outside actuating mechanism family 1640 includes a plurality of outside actuating mechanism species 1649, and in the illustrated form includes first through fifth outside actuating mechanism species 1641-1645. The first, second, and fifth outside actuating mechanism species 1641, 1642, 1645 are substantially similar to the above-described outside actuating mechanism species 641, 642, 645, and may, for example, be provided in the form of the standard-type lock cylinder assembly 710, the classroom-type lock cylinder assembly 720, and the stop assembly 750, respectively. Additionally, the third and fourth outside actuating mechanism species 1643, 1644 are configured to provide an override functionality similar to that provided by the override-type outside actuating mechanism species 643, 644 of the system 600, and may alternatively be referred to as the first and second override-type outside actuating mechanism species 1643, 1644. Further details regarding exemplary forms of the override-type outside actuating mechanism species 1643, 1644 are provided below with reference to FIG. 21.

The outside actuating assembly family 1650 includes a plurality of outside actuating assembly species, each of which includes an outside handle species 1639 of the outside handle family 1630, and some of which further include an outside actuating mechanism species 1649 of the outside actuating mechanism family 1640. As depicted in FIG. 25, the outside actuating assembly family of the illustrated embodiment includes six outside actuating assembly species 1651-1656. Each of the first through fourth outside actuating assembly species 1651-1654 includes the open outside handle species 1632, and each of the fifth and sixth outside actuating assembly species 1655, 1656 includes the closed outside handle species 1631. Each of the first through fifth outside actuating assembly species further includes a corresponding and respective one of the outside actuating mechanism species 1649. The first outside actuating assembly species 1651 includes the first cylinder outside actuating mechanism species 1641, and the second outside actuating assembly species 1652 includes the second cylinder outside actuating mechanism species 1642. The third outside actuating assembly species 1653 includes the first override outside actuating mechanism species 1643, and the fourth outside actuating assembly species 1654 includes the second override outside actuating mechanism species 1644. Additionally, the fifth outside actuating assembly species 1655 includes the exit-type outside actuating mechanism species 1645, and the sixth outside actuating assembly species 1656 does not include an outside actuating mechanism.

The inside operating mechanism family 1670 includes a plurality of inside operating mechanism species 1679, and in the illustrated form includes first through seventh inside operating mechanism species 1671-1677. The first through fifth inside operating mechanism species 1671-1675 are similar to the above-described inside operating mechanism species 671-675, and may, for example, be provided in the form of the corresponding components illustrated in FIG. 10. Additionally, each of the sixth and seventh inside operating mechanism species 1676, 1677 is operable to transition the key cam 1400 between its locking and unlocking states in response to operation of an inside actuating mechanism, such as a lock cylinder. The seventh inside operating mechanism species 1677 is also operable to transition the key cam 1400 between its locking and unlocking states in response to rotation of the key cam plug 1420. As described herein, the sixth inside operating mechanism species 1676 may alternatively be referred to as the vestibule inside operating mechanism species 1676, and the seventh inside operating mechanism species 1677 may alternatively be referred to as the classroom inside operating mechanism species 1677. Further details regarding exemplary forms of the sixth and seventh inside operating mechanism species 1676, 1677 are provided below with reference to FIG. 22.

The inside actuating mechanism family 1680 includes a plurality of inside actuating mechanism species 1689, and in the illustrated form includes first through fourth inside actuating mechanism species 1681-1684. More specifically, the illustrated inside actuating mechanism family 1680 includes a push-type inside actuating mechanism species 1681 and a push/turn inside actuating mechanism species 1682, which respectively correspond to the first and second inside actuating mechanism species 681, 682 of the above-described inside actuating mechanism family 680. Each of the third inside actuating mechanism species 1683 and the fourth inside actuating mechanism species 1684 is configured to cooperate with the sixth inside operating mechanism species 1676 and/or the seventh inside operating mechanism species 1677 to facilitate manipulation of the key cam 1400 between its locking and unlocking states. In the illustrated form, the third inside actuating mechanism species 1683 includes an active lock cylinder, and the fourth inside actuating mechanism species 1684 includes a fixed component having the general configuration of a lock cylinder, such as a dummy lock cylinder. Accordingly, the third and fourth inside actuating mechanism species 1683, 1684 may alternatively be referred to as the cylinder-type inside actuating mechanism species 1683 and the fixed or dummy inside actuating mechanism species 1684. The cylinder-type inside actuating mechanism species 1683 may, for example, be provided in the form of the classroom-type lock cylinder assembly 720 illustrated in FIG. 9*b*. Further details regarding an exemplary form of the fixed/dummy inside actuating mechanism species 1684 are provided below with reference to FIG. 23.

The inside actuating assembly family 1690 includes a plurality of inside actuating assembly species, each of which includes an inside handle species 1669 of the inside handle family 1660, and an inside operating mechanism species 1679 of the inside operating mechanism family 1670. As depicted in FIG. 25, the inside actuating assembly family 1690 of the illustrated embodiment includes eight inside actuating assembly species 1691-1698. Each of the first through fifth inside actuating assembly species 1691-1695 is substantially similar to the corresponding one of the first through fifth inside actuating assembly species 691-695 described above. The sixth inside actuating assembly species 1696 includes the open inside handle species 1662, the vestibule inside operating mechanism species 1676, and the cylinder-type inside actuating mechanism species 1683. The seventh inside actuating assembly species 1697 includes the closed inside handle species 1661, the classroom inside operating mechanism species 1677, and the fixed/dummy inside actuating mechanism species 1684. The eighth inside actuating assembly species 1698 includes the open inside handle species 1662, the classroom inside operating mechanism species 1677, and the cylinder-type inside actuating mechanism species 1683.

Figure 21A:
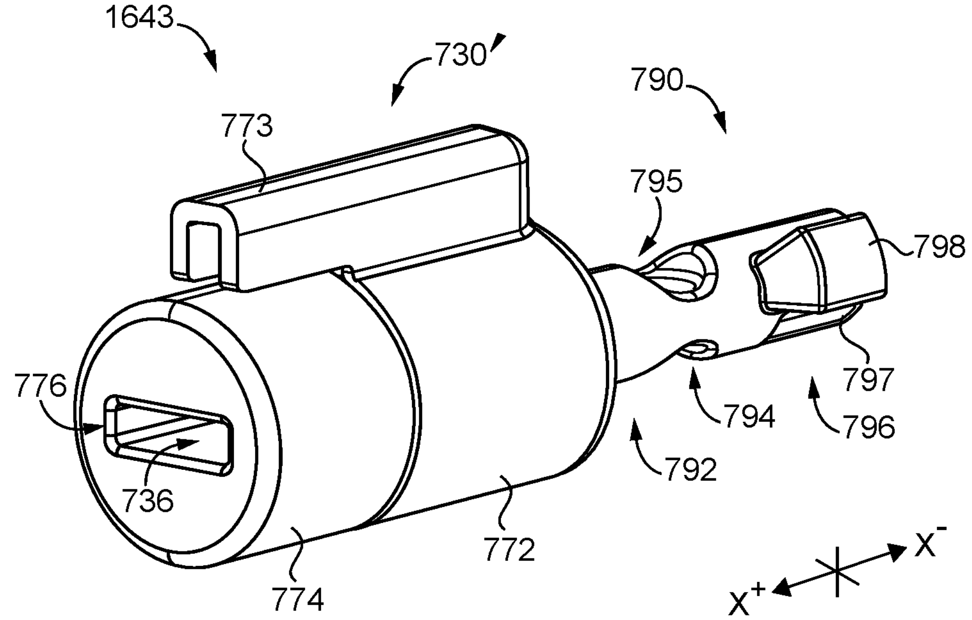
FIGS. 21*a* and 21*b* are perspective views of outside actuating mechanisms according to certain embodiments.
Figure 21B:
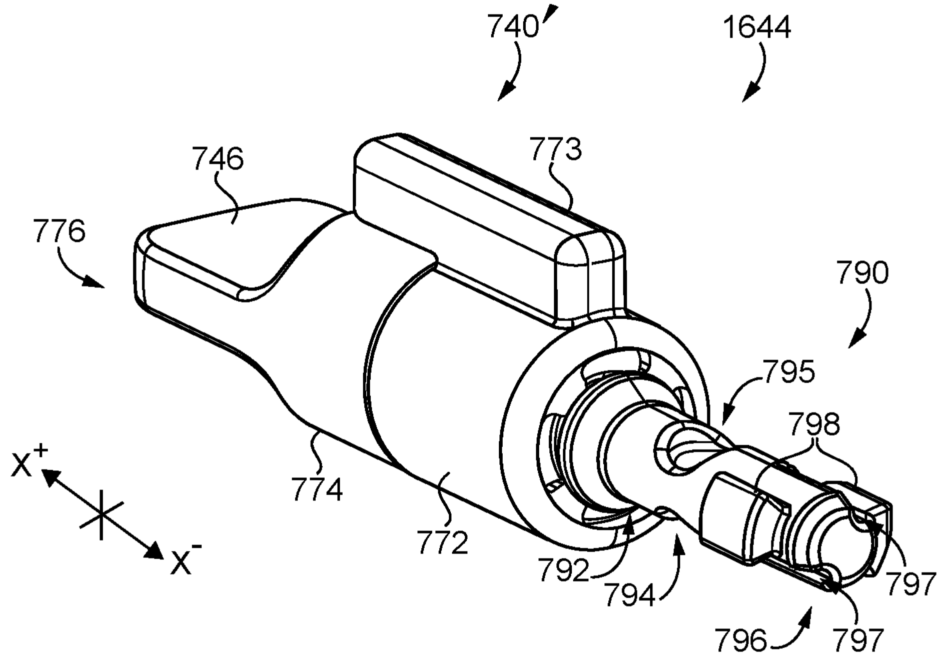

With additional reference to FIG. 21, illustrated therein are exemplary forms of the first and second override-type outside actuating mechanism species 1643, 1644 of the outside actuating mechanism family 1640. More specifically, a tool-assisted override mechanism 730' of the first override-type outside actuating mechanism species 1643 is illustrated in FIG. 21*a*, and a manual override mechanism 740' of the second override-type outside actuating mechanism species 1644 is illustrated in FIG. 21*b*. The override mechanisms 730', 740' are substantially similar to the above-described override mechanisms 730, 740, and each includes the shell 772 and plug 774 described with reference to FIGS. 9*c* and 9*d*. Each of the override mechanisms 730', 740' further includes a tailpiece 790. The tailpiece 790 includes certain features that are analogous to those of the above-described tailpiece 780, and which are indicated with similar reference characters. For example, the tailpiece 790 includes a base portion 792 formed adjacent the plug 774, a narrowed intermediate portion 794 including a pair of recesses 795, and an end portion 796 including a pair of notches 797. The end portion 796 further includes a pair of tailpiece lugs 798, each of which is formed adjacent a corresponding one of the notches 797. The notches 797 and lugs 798 are configured to engage corresponding features of the driver 1440 to provide for rotational coupling of the tailpiece 790 and the driver 1440. Further details regarding such engagement are provided below with reference to FIG. 24*c*.

Figure 22A:
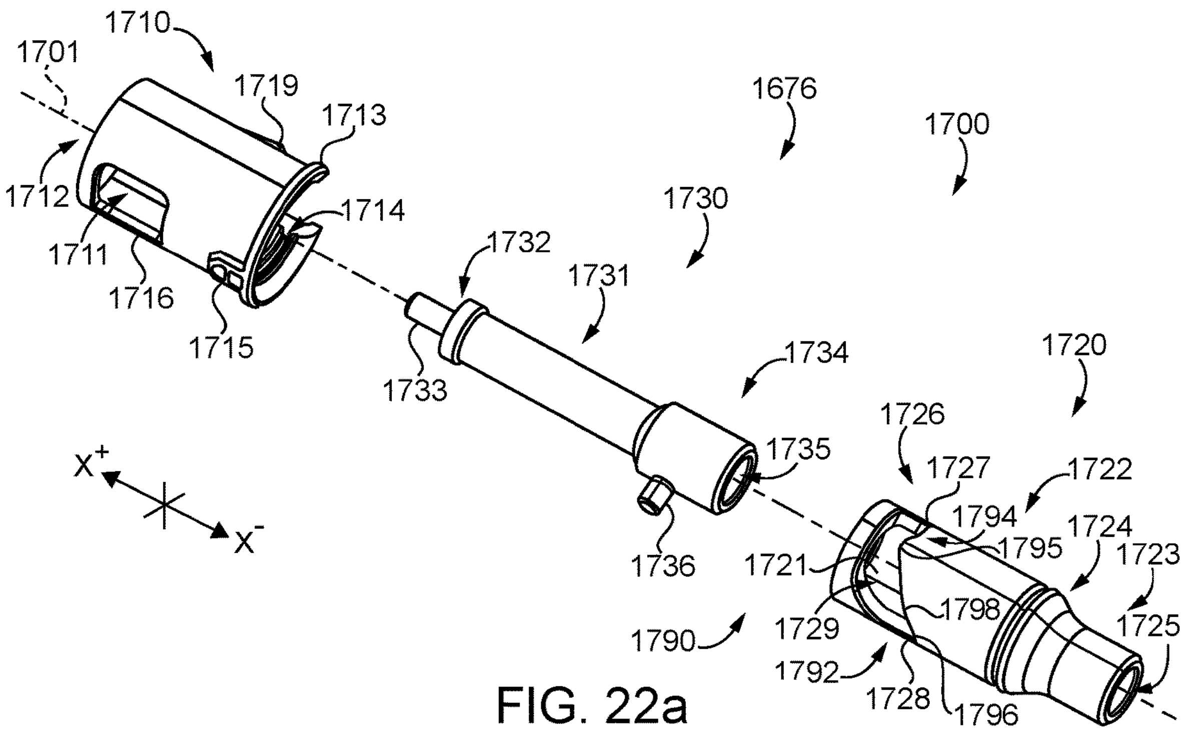
FIGS. 22*a* and 22*b* are perspective views of inside operating mechanisms according to certain embodiments.
Figure 22B:
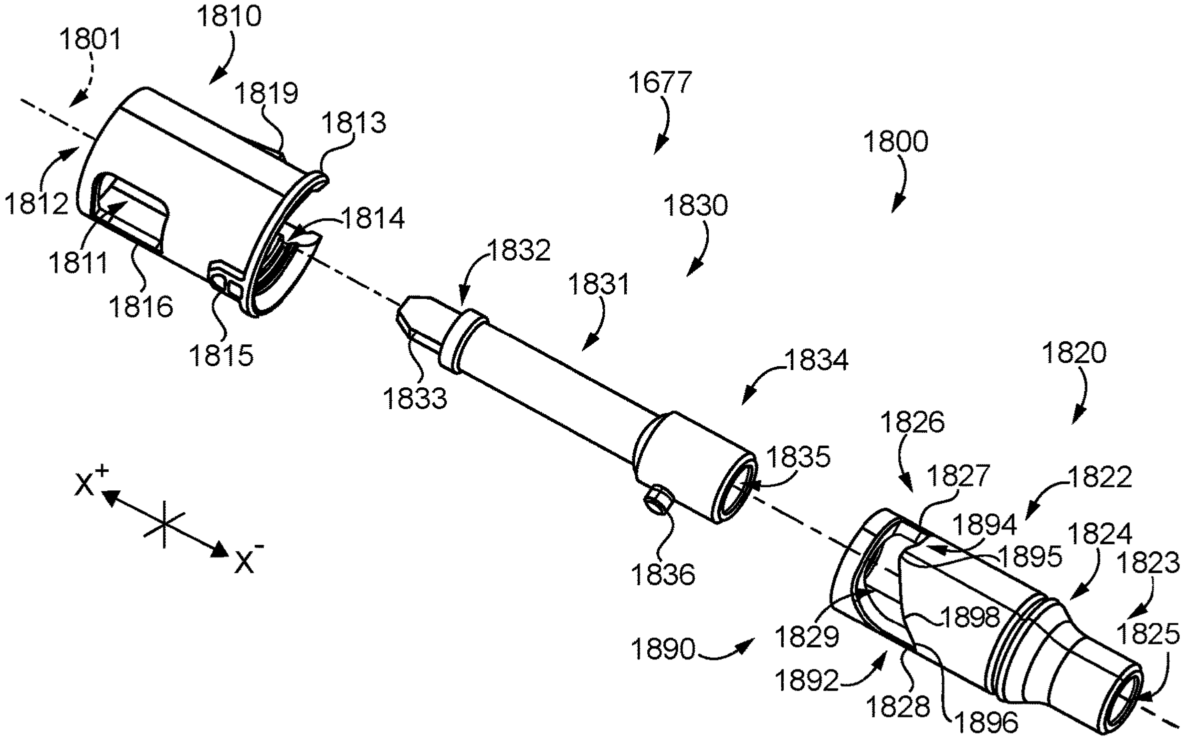

With additional reference to FIG. 22, illustrated therein are exemplary forms of the sixth and seventh inside operating mechanism species 1676, 1677. More specifically, a vestibule plunger assembly 1700 of the sixth inside operating mechanism species 1676 is illustrated in FIG. 22*a*, and a classroom plunger assembly 1800 of the seventh inside operating mechanism species 1677 is illustrated in FIG. 22*b*.

With reference to FIG. 22*a*, an inside operating mechanism 570 of the vestibule inside operating mechanism species 1676 may be provided in the form of a vestibule plunger assembly 1700. The vestibule plunger assembly 1700 includes a sleeve 1710, a plug 1720 mounted seated in the sleeve 1710, and a plunger 1730 movably seated in the plug 1720. The plunger assembly 1700 further includes a cam mechanism 1790, which is configured to drive the plunger 1730 linearly in response to relative rotation of the plug 1720 and plunger 1730.

The sleeve 1710 is configured to be mounted to the inside chassis spindle 1330, and may include various features that facilitate such mounting. For example, the illustrated sleeve 1710 includes a distal rim 1713, an alignment ridge 1715, and a coupling tab 1719, which operate in a manner analogous to that described above with reference to the rim 813, ridge 815, and tab 816 of the anti-tamper cup 811. The sleeve 1710 defines a chamber 1711, has an open proximal end 1712, and includes a window 1716 in communication with the chamber 1711.

The plug 1720 includes a tubular body portion 1722, which defines a chamber 1721 and a pin opening 1726 in communication with the chamber 1721. The plug 1720 also includes a stem 1723 that extends from the body portion 1722 in the distal direction ($X^-$), and which includes a bowtie opening 1725. The pin opening 1726 is partially delimited by a first longitudinal edge 1727, a second longitudinal edge 1728, and a proximal-facing edge 1729 extending between and connecting the longitudinal edges 1727, 1728.

The plunger 1730 includes a post 1731, a body portion 1734, and a cam rider 1736 mounted to the body portion 1734. The post 1731 extends proximally from the body portion 1734, which may have an opening 1735 formed in the distal end thereof. The post 1731 includes a shoulder 1732 and a tip 1733 extending beyond the shoulder 1732 in the proximal direction ($X^+$). The shoulder 1732 is configured to engage the distal end of the key cam plug 1420, and the tip 1733 is configured to be received in the distal bowtie opening 1423 without engaging the teeth 1424. For example, the tip 1733 may have a circular cross-section having a diameter less than the minor diameter of the bowtie opening 1423. As a result, the tip 1733 is not operable to transmit torque between the key cam plug 1420 and the plunger 1730. The cam rider 1736 extends radially outwardly from the body portion 1734, and in the illustrated embodiment is provided in the form of a pin 1736. The pin 1736 may, for example, be coupled to the body portion 1734 via a press-fit coupling.

The cam mechanism 1790 includes a cam surface 1792 defined by the proximal-facing edge 1729 of the plug 1720, and may be considered to further include the cam rider 1736. The cam surface 1792 includes a proximal landing 1794 adjacent the first longitudinal edge 1727, a distal landing 1796 adjacent the second longitudinal edge 1728, and a helical ramp 1798 extending between and connecting the proximal landing 1794 and the distal landing 1796. The proximal landing 1794 is defined in part by a minor ramp 1795, which extends distally from the apex of the helical ramp 1798.

The plug 1720 is rotatably mounted in the sleeve 1710, such that the plug body portion 1722 is seated in the sleeve chamber 1711. The sleeve 1710 and the plug 1720 are longitudinally coupled with one another and are rotationally decoupled from one another by a rotatable coupling. For example, the sleeve 1710 may include an internal engagement ridge 1714, and the plug 1720 may include an annular groove 1724 that receives and engages the ridge 1714.

The plunger 1730 is movably mounted in the plug 1720 such that the plunger body portion 1734 is seated in the plug chamber 1721. The pin 1736 projects through the pin opening 1726 and into the window 1716. As a result, the edges of the window 1716 and the edges of the pin opening 1726 are operable to engage the pin 1736, thereby limiting relative movement of the sleeve 1710, plug 1720, and plunger 1730. The plunger 1730 is longitudinally movable between a proximal locking position and a distal unlocking position, and is rotatable between a home position and a rotated position. The proximal landing 1794 is configured to engage the pin 1736 when the plunger 1730 is in its proximal locking position, and the distal landing 1796 is configured to engage the pin 1736 when the plunger 1730 is in its distal unlocking position. Accordingly, the proximal landing 1794 and the distal landing 1796 may alternatively be referred to as the locking landing 1794 and the unlocking landing 1796, respectively.

The cam mechanism 1790 is operable to translate relative rotation of the plug 1720 and plunger 1730 to relative longitudinal movement of the plug 1720 and plunger 1730. For example, when the pin 1736 is engaged with the distal or unlocking landing 1796, relative rotation of the plug 1720 and plunger 1730 in a locking direction causes the helical ramp 1798 to drive the plunger 1730 toward its proximal locking position. With the plunger 1730 in its proximal locking position, the pin 1736 is engaged with the proximal or locking landing 1794, and the minor ramp 1795 discourages relative rotation of the plug 1720 and plunger 1730 in an unlocking direction opposite the locking direction. The cam mechanism 1790 is also operable to translate relative longitudinal movement of the plug 1720 and plunger 1730 to relative rotation the plug 1720 and plunger 1730. For example, when the pin 1736 is engaged with the helical ramp 1798 and the plunger 1730 is driven toward its distal unlocking position, the cam mechanism 1790 causes relative rotation of the plug 1720 and plunger 1730 in the unlocking direction, and the pin 1736 moves into engagement with the distal or unlocking landing 1796. Further details regarding the operation of the vestibule plunger assembly 1700 are provided below with reference to FIG. 26.

With reference to FIG. 22*b*, an inside operating mechanism 570 of the classroom inside operating mechanism species 1677 may be provided in the form of a classroom plunger assembly 1800. The classroom plunger assembly 1800 is substantially similar to the vestibule plunger assembly 1700, and similar reference characters are used to indicate similar elements and features. For example, the classroom plunger assembly 1800 includes a sleeve 1810, a plug 1820, a plunger 1830, and a cam mechanism 1890, which respectively correspond to the sleeve 1710, plug 1720, plunger 1730, and cam mechanism 1790 described above. In the interest of conciseness, the following description of the classroom plunger assembly 1800 focuses primarily on features that are different from those described above with reference to the vestibule plunger assembly 1700.

As noted above, the tip 1733 of the plunger 1730 is sized and shaped to be received in the distal bowtie opening 1423, but does not transmit torque between the key cam plug 1420 and the plunger 1730. The tip 1833 of the plunger 1830 is likewise sized and shaped to be received in the distal bowtie opening 1423. However, the tip 1833 is also configured to engage the teeth 1424 and to transmit torque between the key cam plug 1420 and the plunger 1830. For example, the tip 1833 may have a width greater than the minor diameter of the bowtie opening 1423. The tip 1833 may further be configured to engage the teeth 1424 in a manner that provides a lost rotational motion connection between the key cam plug 1420 and the plunger 1830. In the illustrated form, the tip 1833 is substantially flat, and the lost rotational motion connection is provided in a manner substantially similar to that described above with reference to the standard-type tailpiece 711 and the bowtie opening 415. The substantially flat tip 1833 may alternatively be referred to as a blade 1833.

Like the above-described pin 1736, the pin 1836 extends into the pin opening 1826, thereby limiting relative movement of the plug 1820 and the plunger 1830. However, the pin 1836 is of a shorter length than the above-described pin 1736, and does not extend into the window 1816. As a result, the pin 1836 does not limit rotation of the plug 1820 and plunger 1830 relative to the sleeve 1810.

Figure 23:
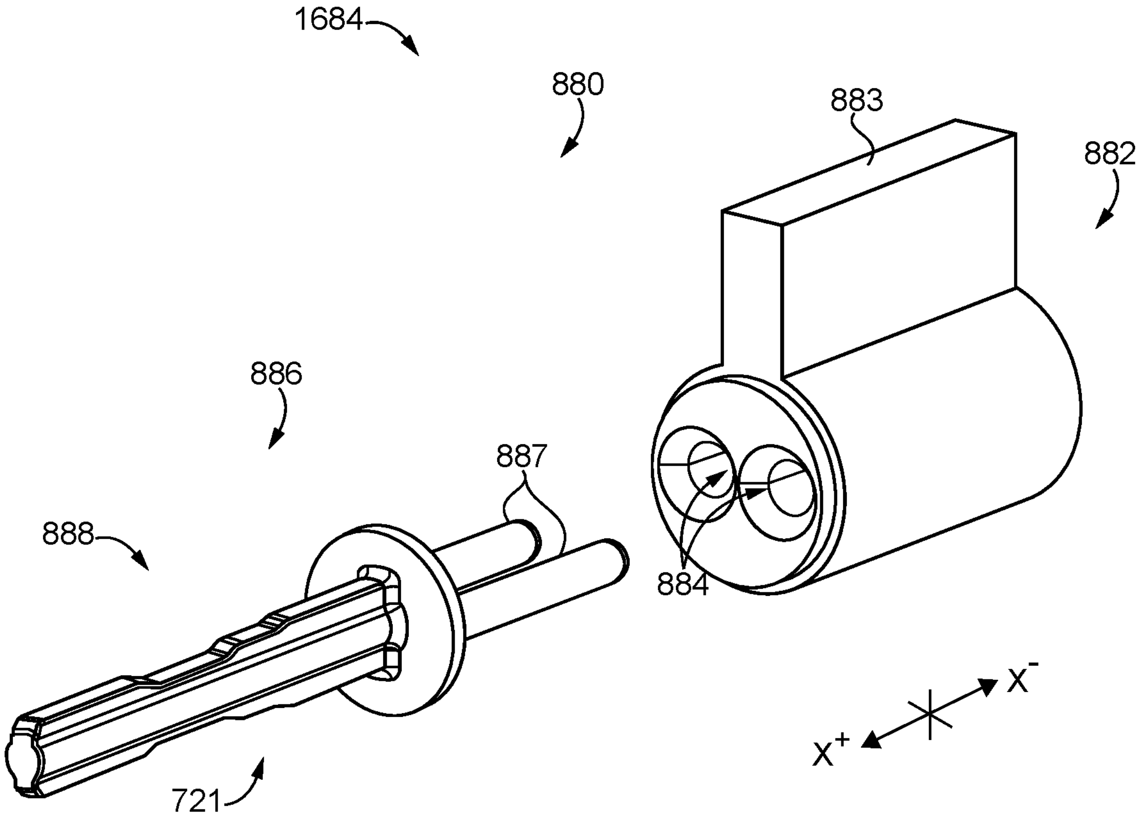
FIG. 23 is a perspective view of an inside actuating mechanism according to certain embodiments.

With reference to FIG. 23, an inside actuating mechanism 580 of the fixed/dummy inside actuating mechanism species 1684 may be provided in the form of a dummy cylinder assembly 880. The dummy cylinder assembly 880 includes a body portion 882 that is configured to be mounted to the inside drive spindle 134, and which includes a tower 883 that is sized and shaped to be received in the slot 137. The body portion 882 may, for example, substantially mimic the outer geometry of the lock cylinder shell 762. The dummy cylinder assembly 880 further includes a tailpiece member 886 that is rotationally coupled with the body portion 882. For example, the body portion 882 may include a pair of openings 884, and the tailpiece member 886 may include a pair of posts 887 that extend into the openings 884. The tailpiece member 886 also includes a tailpiece 888, which in the illustrated embodiment is provided in the form of the classroom-type tailpiece 721.

Figure 24B:
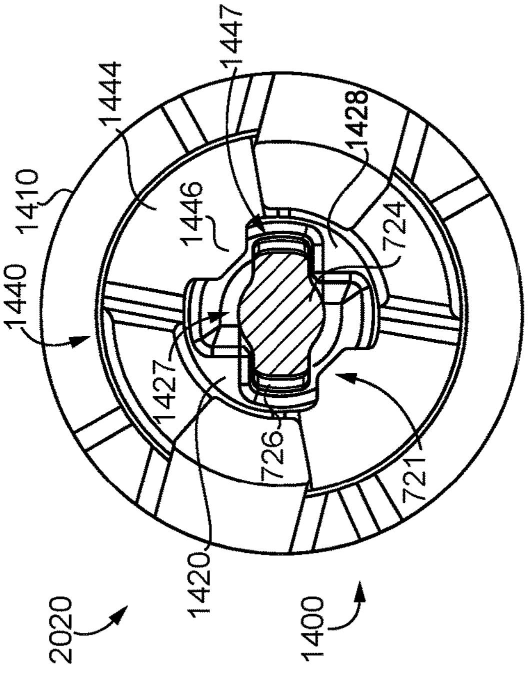
FIGS. 24*a*-24*c* are cutaway illustrations of the key cam illustrated in FIG. 19 along with tailpieces according to certain embodiments.
Figure 24A:
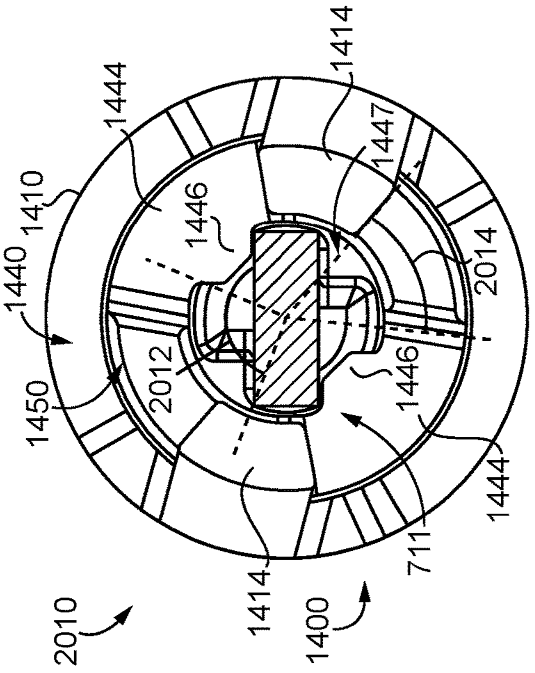
Figure 24C:
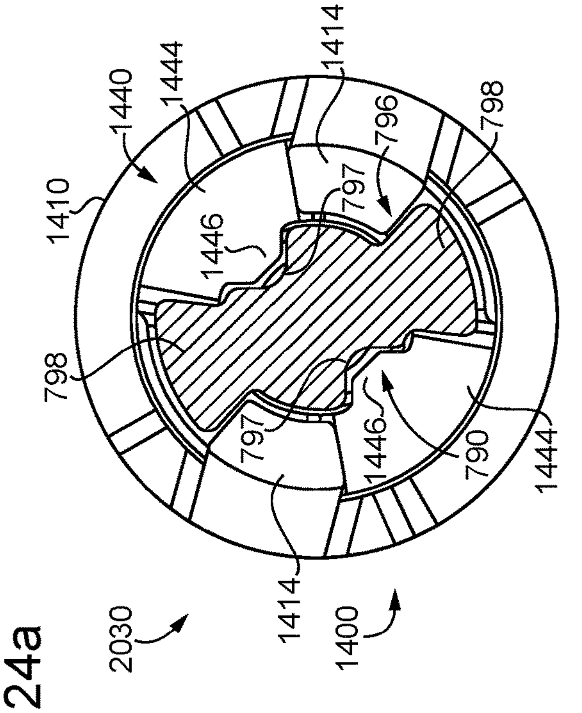

With reference to FIG. 24, further details regarding the interaction between the key cam 1400 and certain tailpieces of the outside actuating mechanism family 1640 will now be provided. Each of FIGS. 24*a*-24*c* is a cutaway view of the key cam 1400 along with the tailpiece of a corresponding one of the outside actuating mechanism species 1641-1644. More specifically, the standard-type tailpiece 711 of the first cylinder-type outside actuating mechanism species 1641 is illustrated in FIG. 24*a*, the classroom-type tailpiece 721 of the second cylinder-type outside actuating mechanism species 1642 is illustrated in FIG. 24*b*, and the override-type tailpiece 790 of the first and second override-type outside actuating mechanism species 1643, 1644 is illustrated in FIG. 24*c*. Each of FIGS. 24*a*-24*c* further illustrates a rotational association between the key cam shell 1410 and the illustrated tailpiece. More specifically, FIG. 24*a* illustrates a lost rotational motion connection 2010, FIG. 24*b* illustrates a rotational decoupling 2020, and FIG. 24*c* illustrates a rotational coupling 2030.

With reference to FIG. 24*a*, the key cam 1400 interfaces with the standard-type tailpiece 711 to form a lost rotational motion connection 2010 between the tailpiece 711 and the key cam shell 1410. With the tailpiece 711 received in the bowtie opening 1447 of the driver 1440, the driver 1440 permits limited rotation of the tailpiece 711 relative to the shell 1410. In the illustrated form, the driver 1440 is configured to permit clockwise (CW) rotation of the tailpiece 711 through a first lost motion angle 2012, and to permit counter-clockwise (CCW) rotation of the tailpiece 711 through a second lost motion angle 2014.

In the state illustrated in FIG. 24*a*, the tailpiece 711 is in its home position, and is generally aligned with the fingers 1414 of the key cam shell 1410. The CW-facing surfaces of the teeth 1446 are positioned adjacent the CCW-facing edges of the tailpiece 711, and the first lost motion angle 2012 is defined between the CCW-facing surfaces of the teeth 1446 and the CW-facing edges of the tailpiece 711. Similarly, the CW-facing surfaces of the driver lugs 1444 are positioned adjacent the CCW-facing edges of the fingers 1414, and the second lost motion angle 2014 is defined between the CCW-facing surfaces of the lugs 1444 and the CW-facing edges of the fingers 1414.

During CW rotation of the tailpiece 711, the tailpiece 711 is initially free to rotate through the first lost motion angle 2012. As the tailpiece 711 reaches the end of its lost rotation range, engagement between the CW-facing edges of the tailpiece 711 and the CCW-facing edges of the teeth 1446 drives the lugs 1444 into engagement with the CCW-facing edges of the fingers 1414. Thus, continued CW rotation of the tailpiece 711 beyond the first lost motion angle 2012 causes a corresponding rotation of the key cam shell 1410.

During CCW rotation of the tailpiece 711, the tailpiece 711 and the driver 1440 is initially free to rotate through the second lost motion angle 2014. As the tailpiece 711 and driver 1440 reach the end of the lost rotation range, engagement between the CCW-facing edges of the tailpiece 711 and the CW-facing edges of the teeth 1446 drives the lugs 1444 into engagement with the CW-facing edges of the fingers 1414. Thus, continued CCW rotation of the tailpiece 711 and driver 1440 beyond the second lost motion angle 2014 causes a corresponding rotation of the key cam shell 1410.

As will be appreciated, rotation of the tailpiece 711 may be provided by operating the lock cylinder assembly 710 to rotate the plug 764 relative to the outside handle. During such actuation, the plug 764 will be free to rotate through the corresponding one of the lost motion angles 2012, 2014 before causing a corresponding rotation of the shell 1410. Thus, rotation of the plug 764 beyond the corresponding lost motion angle 2012, 2014 will cause a corresponding rotation of the shell 1410, thereby retracting the shuttle 1360 and beginning actuation of the latchbolt mechanism.

With the lock cylinder assembly 710 mounted in the outside handle, rotation of the tailpiece 711 relative to the key cam 1400 may also be provided by rotating the outside handle. When the key is not inserted into the plug 764, the tailpiece 711 is rotationally coupled with the handle via the plug 764, the tumbler assembly 768, and the shell 762. Thus, rotation of the outside handle causes a corresponding rotation of the tailpiece 711. When the key cam 1400 is in its unlocking state, the outside handle is rotationally coupled with the shell 1410 via the outside spindle 1230 and the lug 1430. As a result, the shell 1410 rotates with the outside handle without requiring transmission of torque through the tailpiece 711.

As noted above, the illustrated key cam 1400 is configured to provide for freewheel-type locking of the outside handle. Thus, when the key cam 1400 is in its locking state, rotation of the outside handle causes a corresponding rotation of the tailpiece 711 relative to the key cam shell 1410. Due to the lost motion connection 2010 provided by the driver 1440, the outside handle and the tailpiece 711 are free to rotate through the corresponding one of the lost motion angles 2012, 2014 without causing a corresponding rotation of the shell 1410. As described above, the stop walls 1221 of the outside spring cage housing 1220 cooperate with the stop tabs 1231 of the outside drive spindle 1230 to limit rotation of the outside drive spindle 1230. Accordingly, the outside handle is limited to rotation within a predetermined rotational range. In the illustrated form, the lost motion angles 2012, 2014 are selected such that the outside handle is free to rotate through its normal rotational range without driving the shuttle 1360 for actuation of the latchbolt mechanism. For example, each of the lost motion angles 2012, 2014 may be greater the angle defined between a corresponding one of the terminal rotational positions of the handle and the home position of the handle. In such forms, the handle may be free to rotate to either of its fully rotated positions without rotating the key cam shell 1410.

With reference to FIG. 24*b*, the key cam 1400 interfaces with the classroom-type tailpiece 721 to rotationally decouple the tailpiece 721 from the key cam shell 1410, and to form a lost rotational motion connection between the tailpiece 721 and the key cam plug 1420. The narrowed section 724 is received between the driver teeth 1446, and has a width dimension less than the minor diameter of the opening 1447. As a result, a rotational decoupling 2020 is formed between the tailpiece 721 and the driver 1440, such that the tailpiece 721 is free to rotate about its rotational axis without rotating the driver 1440 and/or the shell 1410. Additionally, the end portion 726 is received in the proximal bowtie opening 1427 of the plug 1420, and has a width dimension greater than the minor diameter of the opening 1427. Thus, the tailpiece 721 is operable to rotate the plug 1420 without causing a corresponding rotation of the driver 1440 and/or the shell 1410.

With reference to FIG. 24*c*, the key cam 1400 interfaces with the override-type tailpiece 790 to form a rotational coupling 2030 between the tailpiece 790 and the key cam shell 1410. When the end portion 796 of the tailpiece 790 is engaged with the proximal end portion of the key cam 1400, the driver teeth 1446 are received in and closely engaged with the notches 797 such that the tailpiece 790 is rotationally coupled with the driver 1440. Additionally, each tailpiece lug 798 is received between one of the driver lugs 1444 and a corresponding one of the fingers 1414, thereby rotationally coupling the tailpiece 790, the key cam shell 1410, and the driver 1440. While other forms are contemplated, each of the illustrated tailpiece lugs 798 is provided in the form of an arc sector having a central angle corresponding to the second lost motion angle 2014, such that each tailpiece lug 798 substantially fills the gap between one of the driver lugs 1444 and one of the fingers 1414.

When engaged with the shell 1410 and the driver 1440, the tailpiece 790 substantially eliminates the lost rotational motion that may otherwise be provided by the driver 1440.

Thus, rotation of the override-type plug 774 in either direction causes a corresponding rotation of the shell 1410. With the lost motion substantially eliminated, such rotation of the plug 774 serves to rotate the key cam shell 1410 to begin actuation of the latchbolt mechanism without significant delay. The degree of lost rotational motion, which may be in part dictated by manufacturing tolerances, may be less than ten degrees (10°), and is preferably five degrees (5°) or less.

As is evident from the foregoing, the driver 1440 is configured to interact with the tailpieces 711, 721, 790 to selectively provide for each of a lost rotational motion connection 2010, a rotational decoupling 2020, and a rotational coupling 2030 with the shell 1410. As such, the standard-type tailpiece 711 is operable to rotate the shell 1410 in a manner analogous to that described with reference to FIG. 12, and the override-type tailpiece 790 is operable to rotate the shell 1410 in a manner analogous to that described with reference to FIG. 14. Thus, the interaction between the key cam 1400 and the first cylinder-type outside actuating mechanism species 1641, the first override-type outside actuating mechanism species 1643, and the second override-type outside actuating mechanism species 1644 of the system 1600 may be substantially similar to the above-described interaction between the key cam 400 and the corresponding outside actuating mechanism species 641, 643, 644 of the system 600. Additionally, the classroom-type tailpiece 721 is operable to rotate the plug 1420 without rotating the shell 1410 in a manner analogous to that described with reference to FIG. 15. Further details regarding the interaction between the classroom-type tailpiece 721 and the key cam 1400 are provided below with reference to FIGS. 27 and 28.

With reference to FIGS. 25*a* and 25*b*, illustrated therein is an example of a product line 2100 according to certain embodiments. The product line 2100 includes a plurality of lockset species 2190, each of which may be assembled from a corresponding species of the lockset kit 500 illustrated in FIG. 7. Thus, each lockset species 2190 includes a common platform 510, a latchbolt mechanism 520, an outside actuating assembly 550, and an inside actuating assembly 590. In the illustrated embodiment, the product line 2100 is associated with the product line system 1600 illustrated in FIG. 20. Accordingly, for each of the lockset species 2190, the common platform 510 is provided as the common platform 1610, the latchbolt mechanism 520 is provided as a species 1629 of the latchbolt mechanism family 1620, the outside actuating assembly 550 is provided as a species 1659 of the outside actuating assembly family 1650, and the inside actuating assembly 590 is provided as a species 1699 of the inside actuating assembly family 1690.

The product line 2100 may also be considered to include various species of the lockset kit 500 and peripheral component kit 500'. For example, each species of the kits 500, 500' may include the set of peripheral components 502 included in a corresponding one of the lockset species 2190, and the lockset kits 500 may further include the common platform 510, 1610. As with the above-described product line 1100, the product line 2100 may also include one or more lockset species 2190 including peripheral components not specifically illustrated in the product line system 1600, such as a sensor assembly.

Given the similarities between the product line systems 600, 1600, those having skill in the art will readily appreciate that several of the modular component species 1602 interact with the common platform 1610 in a manner analogous to that described above with reference to a corresponding modular component species 602 and the common platform 610. For example, in both of the key cams 400, 1400, the lock control lug is biased toward a distal unlocking position by a spring, and is capable of being pushed to a proximal locking position. Thus, the interaction between the common platform 1610 and the first through fifth inside operating mechanism species 1671-1675 is substantially similar to that described above with reference to the common platform 610 and the first through fifth inside operating mechanism species 671-675.

Additionally, the tailpiece 711 of the standard-type lock cylinder assembly 710 rotates the key cam shell 1410 through a lost rotational motion connection 2010, and the tailpiece 790 of the override mechanisms 730', 740' forms a rotational coupling 2030 with the key cam shell 1410, thereby eliminating the lost rotational motion. As such, the interaction between the first cylinder-type outside actuating mechanism species 1641 and the common platform 1610 is substantially similar to the above-described interaction between the first cylinder-type outside actuating mechanism species 641 and the common platform 610. Similarly, the interaction between the override-type outside actuating mechanism species 1643, 1644 and the common platform 1610 is substantially similar to the above-described interaction of the override-type outside actuating mechanism species 643, 644 and the common platform 610.

As should be evident from the foregoing, the common platform 1610 interacts with the majority of the component species 1602 of the product line system 1600 in a manner substantially similar to that in which the common platform 610 interacts with the component species 602 of the above-described product line system 600. The primary difference between such interactions is the manner in which the common platform 1610 interacts with the second cylinder-type outside actuating mechanism species 1642 and the component species 1602 lacking an analogue in the illustrated embodiment of the product line system 600, including the vestibule inside operating mechanism species 1676, the classroom inside operating mechanism species 1677, the cylinder-type inside actuating mechanism species 1683, and the fixed/dummy inside actuating mechanism species 1684. Accordingly, the following descriptions of the product line 2100 focus primarily on the ninth, tenth, and eleventh lockset species 2109, 2110, 2111, each of which includes one or more of the above-noted species 1642, 1676, 1677, 1683, 1684. Those having skill in the art will readily recognize that each of the first through eighth lockset species 2101-2108 function in a manner substantially similar to the respective one of the first through eighth lockset species 1101-1108 of the above-described product line 1100.

Figure 26:
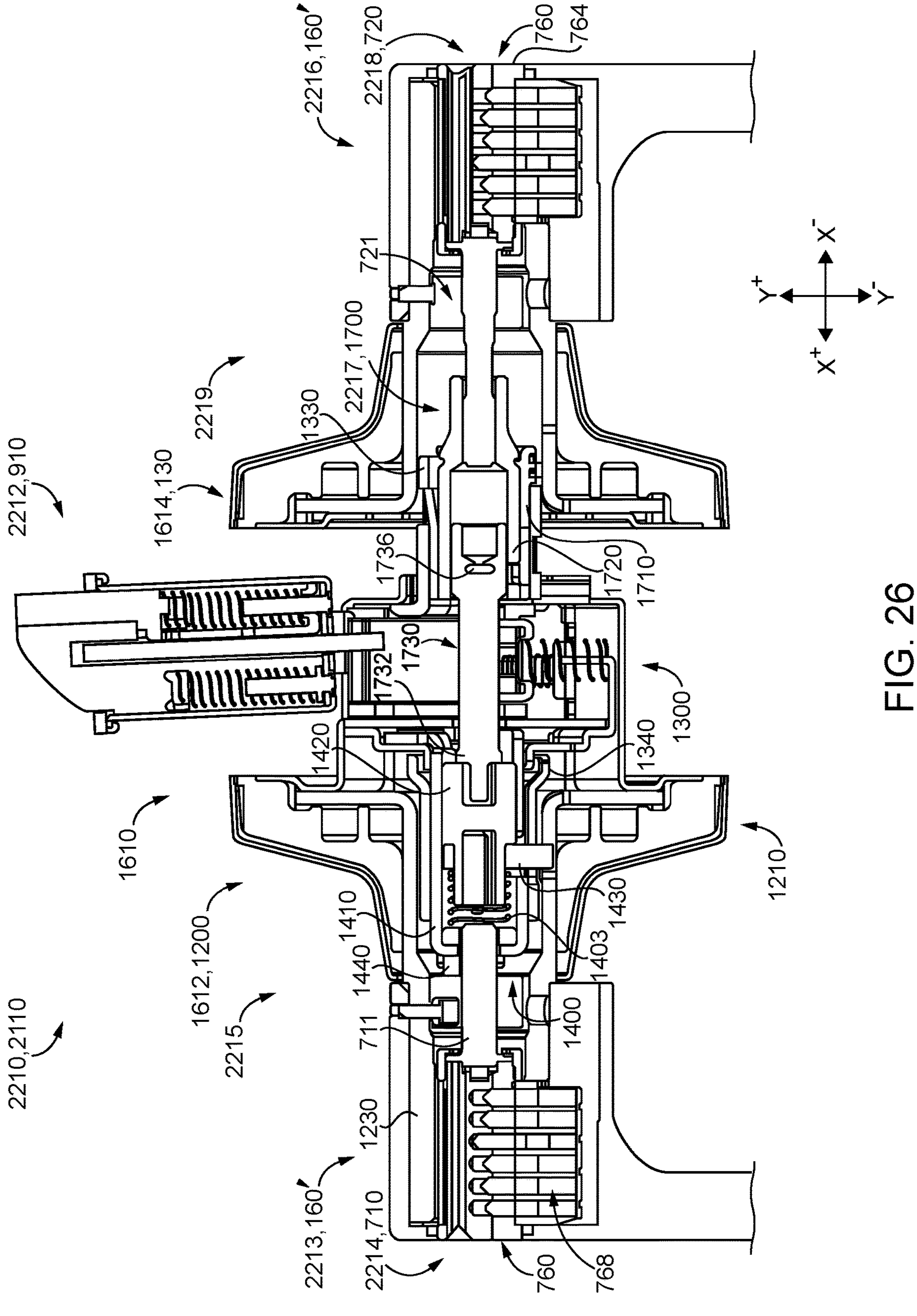
FIGS. 26-28 are cross-sectional views of locksets according to certain embodiments.
Figure 27:
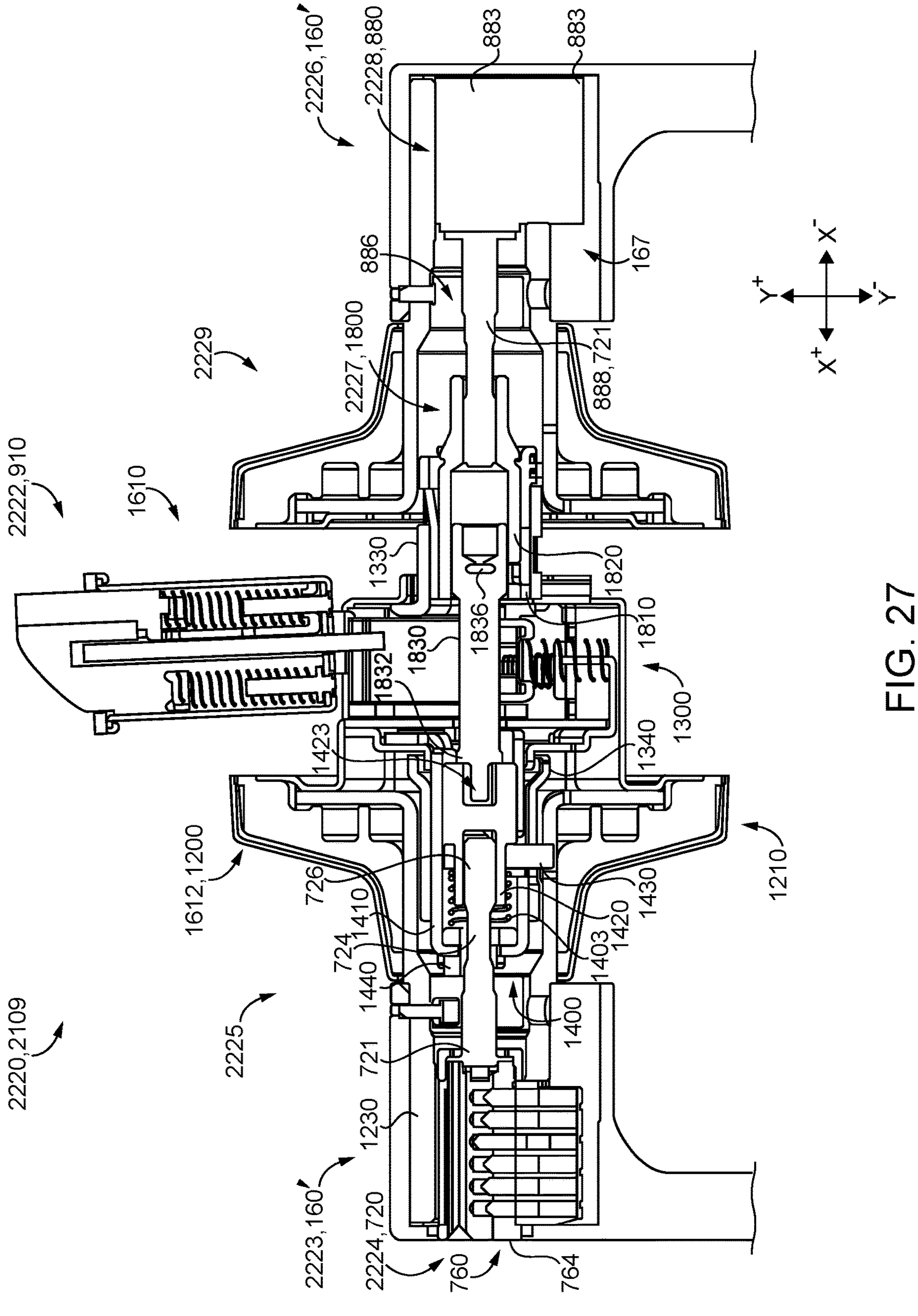
Figure 28:
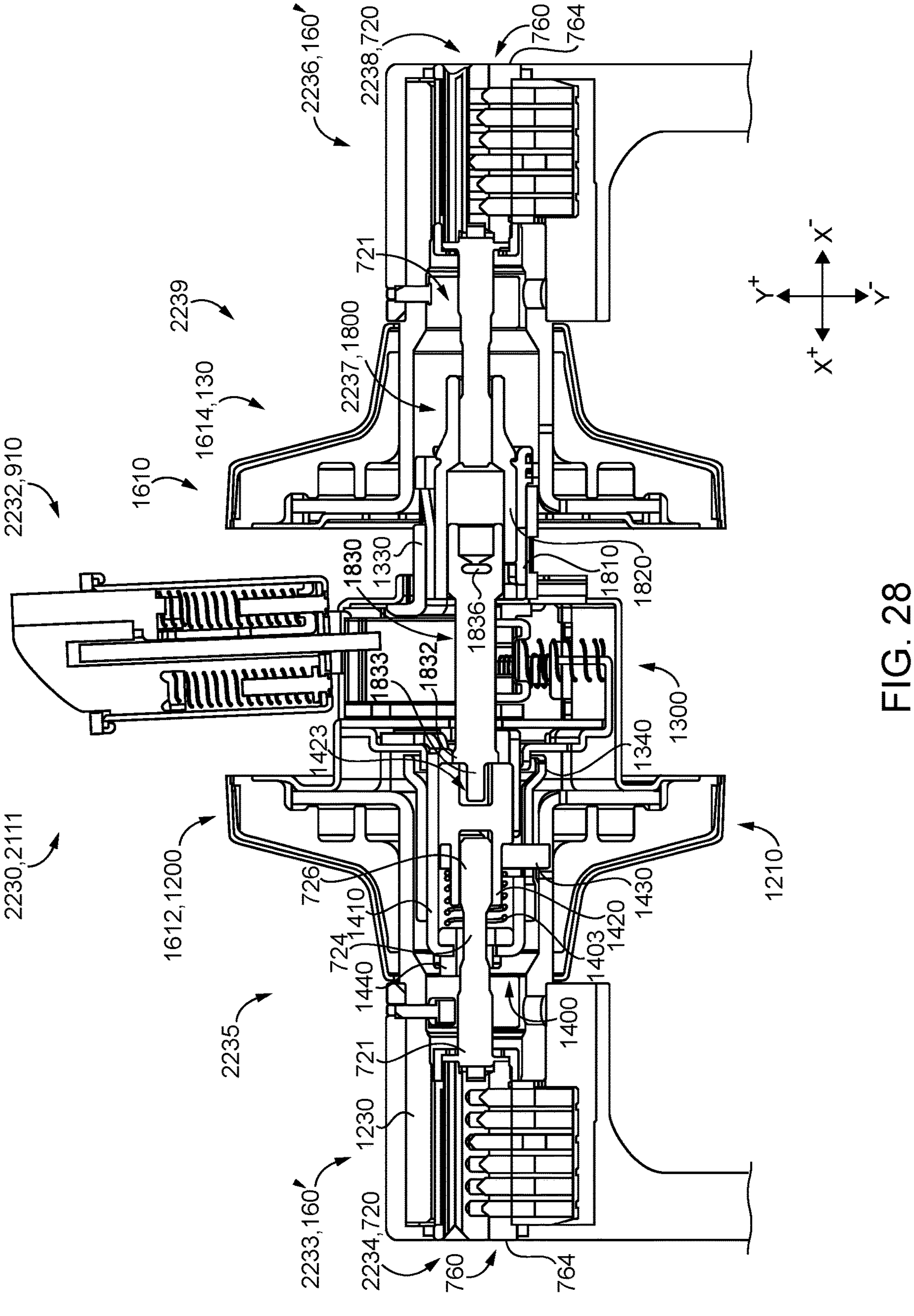

With additional reference to FIGS. 26-28, illustrated therein are locksets according to certain species 2190 of the product line 2100. More specifically, FIG. 26 illustrates a lockset 2210 of the tenth lockset species 2110, FIG. 27 illustrates a lockset 2220 of the ninth lockset species 2109, and FIG. 28 illustrates a lockset 2230 of the eleventh lockset species 2111. Each of the locksets includes the common platform 1610, and may, for example, be assembled from a kit including or configured for use with the common platform 1610. Each lockset also includes various peripheral components that correspond to the peripheral components 502, and which are indicated with similar reference characters. For example, the lockset 2210 illustrated in FIG. 26 includes a latchbolt mechanism 2212, an outside actuating assembly 2215, and an inside actuating assembly 2219, which respectively correspond to the latchbolt mechanism 520, the outside actuating assembly 550, and the inside actuating assembly 590 of the lockset kit 500. In the interest of conciseness, the following descriptions focus primarily on features and characteristics of the locksets that pertain to the function associated with the corresponding one of the lockset species 2109-2111.

The tenth lockset species 2110 provides a vestibule function corresponding to ANSI function F88 ("Apartment, Exit, Public Toilet"), and may alternatively be referred to as the vestibule species 2110. The tenth lockset species 2110 includes the common platform 1610, the deadlatching latchbolt mechanism species 1621, the first outside actuating assembly species 1651, and the sixth inside actuating assembly species 1696. As noted above, the first outside actuating assembly species 1651 includes the open-type outside handle species 1632 and the first cylinder-type outside actuating mechanism species 1641, and the sixth inside actuating assembly species 1696 includes the vestibule inside operating mechanism species 1676, the cylinder-type inside actuating mechanism species 1683, and the open-type inside handle species 1662. A lockset of the vestibule species 2110 may, for example, be assembled from a vestibule-function species of the kit 500, in which the latchbolt mechanism 520, the outside actuating mechanism 540, the inside operating mechanism 570, and the inside actuating mechanism 580 are respectively provided in the form of the deadlatching latchbolt mechanism 910, the standard-type lock cylinder assembly 710, the vestibule plunger assembly 1700, and the classroom-type lock cylinder assembly 720.

With reference to FIG. 26, illustrated therein is a lockset 2210 of the vestibule species 2110. The lockset 2210 includes the common platform 1610, as well as a set of peripheral components corresponding to those described in the preceding paragraph. For example, the lockset 2210 includes a latchbolt mechanism 2212 of the deadlatching latchbolt mechanism species 1621, an outside actuating assembly 2215 of the first outside actuating assembly species 1651, and an inside actuating assembly 2219 of the sixth inside actuating assembly species 1696. The outside actuating assembly 2215 includes an outside handle 2213 and an outside actuating mechanism 2214, which are respectively provided as the open-faced lever 160' of the open-type outside handle species 1632 and the standard-type lock cylinder assembly 710 of the first cylinder-type outside actuating mechanism species 1641. The inside actuating assembly 2219 includes an inside handle 2216, an inside operating mechanism 2217, and an inside actuating mechanism 2218, which are respectively provided as the open-faced lever 160' of the open-type inside handle species 1662, the vestibule plunger assembly 1700 of the vestibule-type inside operating mechanism species 1676, and the classroom-type lock cylinder assembly 720 of the cylinder-type inside actuating mechanism species 1683.

In FIG. 26, the vestibule-function lockset 2210 is illustrated in a locked state, in which the outside handle 2213 is not operable to actuate the latchbolt mechanism 2212. In this state, the key cam 1400 is in its locking state, in which the lug 1430 is aligned with the arc slot 1482 such that the outside spindle 1230 is rotationally decoupled from the key cam shell 1410. The vestibule plunger assembly 1700 is likewise in its locking state, in which the plunger 1730 is in its proximal or locking position, and the pin 1736 is engaged with the proximal or locking landing 1794. Additionally, the shoulder 1732 of the plunger 1730 is engaged with the distal face of the key cam plug 1420, such that the plunger 1730 retains the key cam plug 1420 and the lug 1430 in the locking positions thereof against the distal biasing force of the spring 1403

The vestibule-function lockset 2210 may be transitioned to its unlocked state by operating the lock cylinder assembly 720 of the inside actuating mechanism 2218 using an appropriate key, thereby rotating the plunger assembly plug 1720 in the unlocking direction. As the plug 1720 rotates in the unlocking direction, the minor ramp 1795 drives the pin 1736 into contact with an edge of the window 1716, thereby preventing further rotation of the plunger 1730 with respect to the sleeve 1710. Continued rotation of the plug 1720 causes the pin 1736 to ride along the minor ramp 1795 and into engagement with the helical ramp 1798. As the pin 1736 becomes aligned with the helical ramp 1798, the spring 1403 distally drives the key cam plug 1420, the lug 1430, and the plunger 1730 toward the unlocking positions thereof. As a result, the pin 1736 rides along the helical ramp 1798 and into engagement with the distal or unlocking landing 1796, thereby placing the lockset 2210 in its unlocked state.

From the unlocked state, the lockset 2210 can be transitioned to its locked state by operating the lock cylinder assembly 720 of the inside actuating mechanism 2218 using an appropriate key, thereby rotating the plunger assembly plug 1720 in the locking direction. As the plug 1720 rotates in the locking direction, the helical ramp 1798 drives the pin 1736 into contact with an edge of the window 1716, thereby preventing further rotation of the plunger 1730 with respect to the sleeve 1710. Continued rotation of the plug 1720 causes the pin 1736 to ride along the helical ramp 1798, thereby driving the plunger 1730, the key cam plug 1420, and the lug 1430 in the proximal direction ($X^+$) and toward the locking positions thereof. Engagement between the pin 1736 and the locking landing 1794 retains the plunger 1730, the key cam plug 1420, and the lug 1430 in the locking positions thereof in the manner described above.

As is evident from the foregoing, rotation of the lock cylinder plug 764 of the inside actuating mechanism 2218 from its home position to a rotated position causes the key cam 1400 to transition between the locking and unlocking states thereof. The plug 764 may then be returned to its home position to permit extraction of the key without causing the key cam 1400 to return to the prior state. More specifically, the lost rotational motion connections provided by the vestibule plunger assembly 1700 permit the lock cylinder plug 764 to return to its home position without causing the key cam 1400 to return to the prior state. The vestibule plunger assembly 1700 may, for example, permit such return of the lock cylinder plug 764 in a manner analogous to that described above with reference to FIG. 15.

Locksets of the vestibule function typically include a deadlocking latchbolt mechanism, an exterior-side lock cylinder, and an interior-side lock cylinder. One feature that is characteristic of vestibule-function locksets is that the interior-side lock cylinder provides for key-assisted locking and unlocking of the outside handle. In the illustrated vestibule-function lockset 2210, this feature is provided in part by the vestibule plunger assembly 1700, which enables the lock cylinder 760 of the inside actuating mechanism 2218 to lock and unlock the outside handle 2213 in the manner described above. Another feature that is characteristic of vestibule-function locksets is that the exterior-side lock cylinder is operable to retract the latchbolt, but cannot lock or unlock the outside handle. In the illustrated lockset 2210, the lock cylinder assembly 710 of the outside actuating mechanism 2214 is operable to rotate the key cam shell 1410 in a manner analogous to that described above with reference to FIG. 12, thereby actuating the latchbolt mechanism 2212 without causing the key cam 1400 to transition between the locking and unlocking states thereof.

The ninth lockset species 2109 provides a classroom function corresponding to ANSI function F84 ("Classroom"), and may alternatively be referred to as the classroom species 2109. The ninth lockset species 2109 includes the common platform 1610, the deadlatching latchbolt mechanism species 1621, the second outside actuating assembly species 1652, and the seventh inside actuating assembly species 1697. As noted above, the second outside actuating assembly species 1652 includes the open-type outside handle species 1632 and the second cylinder-type outside actuating mechanism species 1642, and the seventh inside actuating assembly species 1697 includes the classroom inside operating mechanism species 1677, the fixed/dummy inside actuating mechanism species 1684, and the closed-type inside handle species 1661. A lockset of the classroom species 2109 may, for example, be assembled from a classroom-function species of the kit 500, in which the latchbolt mechanism 520, the outside actuating mechanism 540, the inside operating mechanism 570, and the inside actuating mechanism 580 are respectively provided in the form of the deadlatching latchbolt mechanism 910, the classroom-type lock cylinder assembly 720, the classroom plunger assembly 1800, and the dummy cylinder assembly 880.

With reference to FIG. 27, illustrated therein is a lockset 2220 of the classroom species 2109. The lockset 2220 includes the common platform 1610, as well as a set of peripheral components corresponding to those listed in the preceding paragraph. For example, the lockset 2220 includes a latchbolt mechanism 2222 of the deadlatching latchbolt mechanism species 1621, an outside actuating assembly 2225 of the second outside actuating assembly species 1652, and an inside actuating assembly 2229 of the seventh inside actuating assembly species 1697. The outside actuating assembly 2225 includes an outside handle 2223 and an outside actuating mechanism 2224, which are respectively provided as the open-faced lever 160' of the open-type outside handle species 1632 and the classroom-type lock cylinder assembly 720 of the second cylinder-type outside actuating mechanism species 1642. Additionally, the inside actuating assembly 2229 includes an inside handle 2226, an inside operating mechanism 2227, and an inside actuating mechanism 2228, which are respectively provided as the closed-face lever 160 of the closed-type inside handle species 1661, the classroom plunger assembly 1800 of the classroom-type inside operating mechanism species 1677, and the dummy cylinder assembly 880 of the fixed/dummy inside actuating mechanism species 1684.

In FIG. 27, the classroom-function lockset 2220 is illustrated in a locked state, in which the outside handle 2223 is not operable to actuate the latchbolt mechanism 2222. In this state, the key cam 1400 is in its locking state, in which the lug 1430 is aligned with the arc slot 1482 such that the outside spindle 1230 is rotationally decoupled from the key cam shell 1410. The classroom plunger assembly 1800 is likewise in its locking state, in which the plunger 1830 is in its proximal or locking position, and the pin 1836 is engaged with the proximal or locking landing 1894. Additionally, the shoulder 1832 of the plunger 1830 is engaged with the distal end of the key cam plug 1420, and the plunger 1830 retains the key cam plug 1420 and the lug 1430 in the locking positions thereof against the distal biasing force of the spring 1403.

The classroom-function lockset 2220 may be transitioned from its locked state to its unlocked state by operating the lock cylinder assembly 720 of the outside actuating mechanism 2224 using an appropriate key, thereby rotating the key cam plug 1420 in the unlocking direction. As the plug 1420 rotates in the unlocking direction, the distal teeth 1424 engage the blade 1833, thereby rotating the plunger 1830 in the unlocking direction. The pin 1836 engages the minor ramp 1895, thereby driving the teeth of the bowtie opening 1825 into contact with the tailpiece 888 of the dummy cylinder assembly 880, which prevents further rotation of the plug 1820. Continued rotation of the plunger 1830 causes the pin 1836 to ride along the minor ramp 1895 and into engagement with the helical ramp 1898. As the pin 1836 becomes aligned with the helical ramp 1898, the spring 1403 distally drives the key cam plug 1420, the lug 1430, and the plunger 1830 toward the unlocking positions thereof. As a result, the pin 1836 rides along the helical ramp 1898 and into engagement with the distal or unlocking landing 1896, thereby placing the lockset 2220 in its unlocked state.

From the unlocked state, the lockset 2220 can be transitioned to its locked state by operating the lock cylinder assembly 720 of the outside actuating mechanism 2224 using an appropriate key, thereby rotating the key cam plug 1420 in the locking direction. As the plug 1420 rotates in the locking direction, the distal teeth 1424 engage the blade 1833, thereby rotating the plunger 1830 in the locking direction. Additionally, the pin 1836 engages the helical ramp 1898, thereby driving the teeth of the bowtie opening 1825 into contact with the tailpiece 888 of the dummy cylinder assembly 880, which prevents further rotation of the plug 1820. Continued rotation of the plunger 1830 causes the pin 1836 to ride along the helical ramp 1898, thereby driving the plunger 1830, the key cam plug 1420, and the lug 1430 in the proximal direction ($X^+$) toward the locking positions thereof. Engagement between the pin 1836 and the locking landing 1894 retains the plunger 1830, the key cam plug 1420, and the lug 1430 in the locking positions thereof in the manner described above.

As is evident from the foregoing, rotation of the lock cylinder plug 764 of the outside actuating mechanism 2224 from its home position to a rotated position causes the key cam 1400 to transition between the locking and unlocking states thereof. The plug 764 may then be returned to its home position to permit extraction of the key without causing the key cam 1400 to return to the prior state. More specifically, the lost rotational motion connections provided by the key cam 1400 and the classroom plunger assembly 1800 permit the lock cylinder plug 764 to return to its home position without causing the key cam 1400 to return to the prior state.

As noted above, one feature that is characteristic of the classroom function is key-assisted locking and unlocking of the outside handle from the unsecured or outer side of the lockset. In the illustrated classroom-function lockset 2220, this feature is provided in part by the classroom-type lock cylinder assembly 720, the classroom plunger assembly 1800, and the dummy cylinder assembly 880, which cooperate with the key cam 1400 to drive the lug 1430 between its locking and unlocking positions in the manner described above. In certain classroom-function locksets, operation of the exterior-side lock cylinder serves to lock and unlock the outside handle, but does not retract the latchbolt. In the lockset 2220, this feature is provided in part by the rotational decoupling 2020 between the classroom tailpiece 721 and the key cam shell 1410, which prevents the classroom-type lock cylinder assembly 720 from rotating the shell 1410.

The eleventh lockset species 2111 provides a classroom security function corresponding to ANSI function F110 ("Intruder Classroom"), and may alternatively be referred to as the classroom security species 2111. The eleventh lockset species 2111 includes the common platform 1610, the deadlatching latchbolt mechanism species 1621, the second outside actuating assembly species 1652, and the eighth inside actuating assembly species 1698. As noted above, the second outside actuating assembly species 1652 includes the open-type outside handle species 1632 and the second cylinder-type outside actuating mechanism species 1642, and the eighth inside actuating assembly species 1698 includes the classroom inside operating mechanism species 1677, the cylinder-type inside actuating mechanism species 1683, and the open-type inside handle species 1662. A lockset of the classroom security species 2111 may, for example, be assembled from a classroom-security-function species of the kit 500, in which the latchbolt mechanism 520, the outside actuating mechanism 540, the inside operating mechanism 570, and the inside actuating mechanism 580 are respectively provided in the form of the deadlatching latchbolt mechanism 910, the classroom-type lock cylinder assembly 720, the classroom plunger assembly 1800, and the classroom-type lock cylinder assembly 720.

With additional reference to FIG. 28, illustrated therein is a lockset 2230 of the classroom security species 2111. The lockset 2230 includes the common platform 1610, as well as a set of modular peripheral components corresponding to those described in the preceding paragraph. For example, the lockset 2230 includes a latchbolt mechanism 2232 of the deadlatching latchbolt mechanism species 1621, an outside actuating assembly 2235 of the second outside actuating assembly species 1652, and an inside actuating assembly 2239 of the eighth inside actuating assembly species 1698. The outside actuating assembly 2235 includes an outside handle 2233 and an outside actuating mechanism 2234, which are respectively provided as the open-faced lever 160' of the open-type outside handle species 1632 and the classroom-type lock cylinder assembly 720 of the second cylinder-type outside actuating mechanism species 1642. Additionally, the inside actuating assembly 2239 includes an inside handle 2236, an inside operating mechanism 2237, and an inside actuating mechanism 2238, which are respectively provided as the open-faced lever 160' of the open-type inside handle species 1662, the classroom plunger assembly 1800 of the classroom-type inside operating mechanism species 1677, and the classroom-type lock cylinder assembly 720 of the cylinder-type inside actuating mechanism species 1683.

In FIG. 28, the classroom security lockset 2230 is illustrated in a locked state, in which the outside handle 2233 is not operable to actuate the latchbolt mechanism 2232. In this state, the key cam 1400 is in its locking state, in which the lug 1430 is aligned with the arc slot 1482 such that the outside spindle 1230 is rotationally decoupled from the key cam shell 1410. The classroom plunger assembly 1800 is likewise in its locking state, in which the plunger 1830 is in its proximal or locking position, and the pin 1836 is engaged with the proximal or locking landing 1894. Additionally, the shoulder 1832 of the plunger 1830 is engaged with the distal end of the key cam plug 1420, and the plunger 1830 retains the key cam plug 1420 and the lug 1430 in the locking positions thereof against the distal biasing force of the spring 1403.

In the classroom security lockset 2230, each of the outside actuating mechanism 2234 and the inside actuating mechanism 2238 is independently operable to transition the key cam 1400 between the locking and unlocking states thereof. For example, the inside actuating mechanism 2238 can be operated to rotate the plunger assembly plug 1820 in each of the locking and unlocking directions, which transitions the key cam 1400 between its locking and unlocking states in a manner analogous to that described with above with reference to the vestibule-function lockset 2210. The primary difference between such operations is the manner in which rotation of the plunger 1830 is limited. In the classroom security lockset 2230, the tailpiece 721 of the outside actuating mechanism 2234 is received in the proximal bowtie opening 1427, and is operable to engage the teeth 1428 to limit rotation of the key cam plug 1420. Additionally, the blade 1833 of the plunger 1830 is received in the distal bowtie opening 1423, such that the teeth 1424 limit rotation of the plunger 1830 relative to the key cam plug 1420. Thus, while the pin 1836 of the classroom plunger assembly 1800 does not project into the window 1811, relative rotation of the plunger 1830 and the plunger assembly plug 1820 is nonetheless limited.

Additionally, the outside actuating mechanism 2234 can be operated to rotate the key cam plug 1420 in each of the locking and unlocking directions, which transitions the key cam 1400 between its locking and unlocking states in a manner analogous to that described with reference to the classroom-function lockset 2220 illustrated in FIG. 27. In the classroom security lockset 2230, however, rotation of the plug 1820 is limited not by the tailpiece 888 of the dummy cylinder assembly 880, but by the tailpiece 721 of the inside actuating mechanism 2238.

Locksets of the classroom security function typically include a deadlocking latchbolt mechanism, an exterior-side lock cylinder, and an interior-side lock cylinder. One feature that is characteristic of the classroom security function is that the outer handle can be locked and unlocked by each of the exterior-side lock cylinder and the interior-side lock cylinder. In the illustrated classroom security lockset 2230, this feature is provided in part by the classroom-type lock cylinder assemblies 720 and the classroom plunger assembly 1800, which interact with the key cam 1400 to enable each of the outside actuating mechanism 2234 and the inside actuating mechanism 2238 to lock and unlock the outside handle 2233 in the manner described above.

Those skilled in the art will readily appreciate that the product line system 1600 provides advantages corresponding to those described with reference to the system 600. For example, the modularity of the system 1600 facilitates the assembly of locksets having different functions and the conversion between different functions, each of which may be accomplished without requiring disassembly of the preassembled chassis assembly 1200. The illustrated system 1600 also includes various features and components that provide for functions not necessarily available in the above-described system 600, thereby providing additional flexibility and options for manufacturers, distributors, and/or end users.

Figure 29:
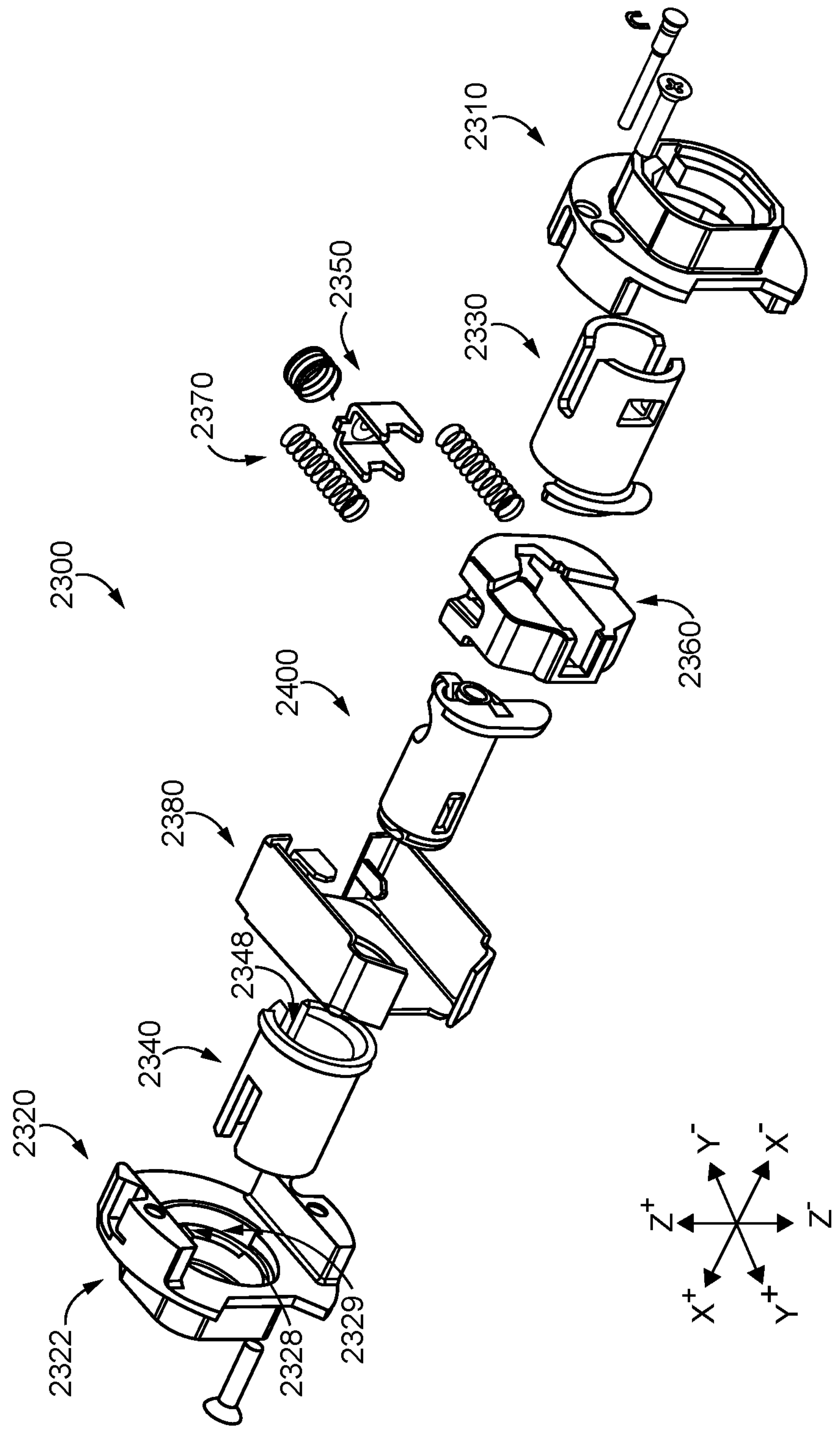
FIG. 29 is an exploded assembly view of a chassis according to certain embodiments.
Figure 30:
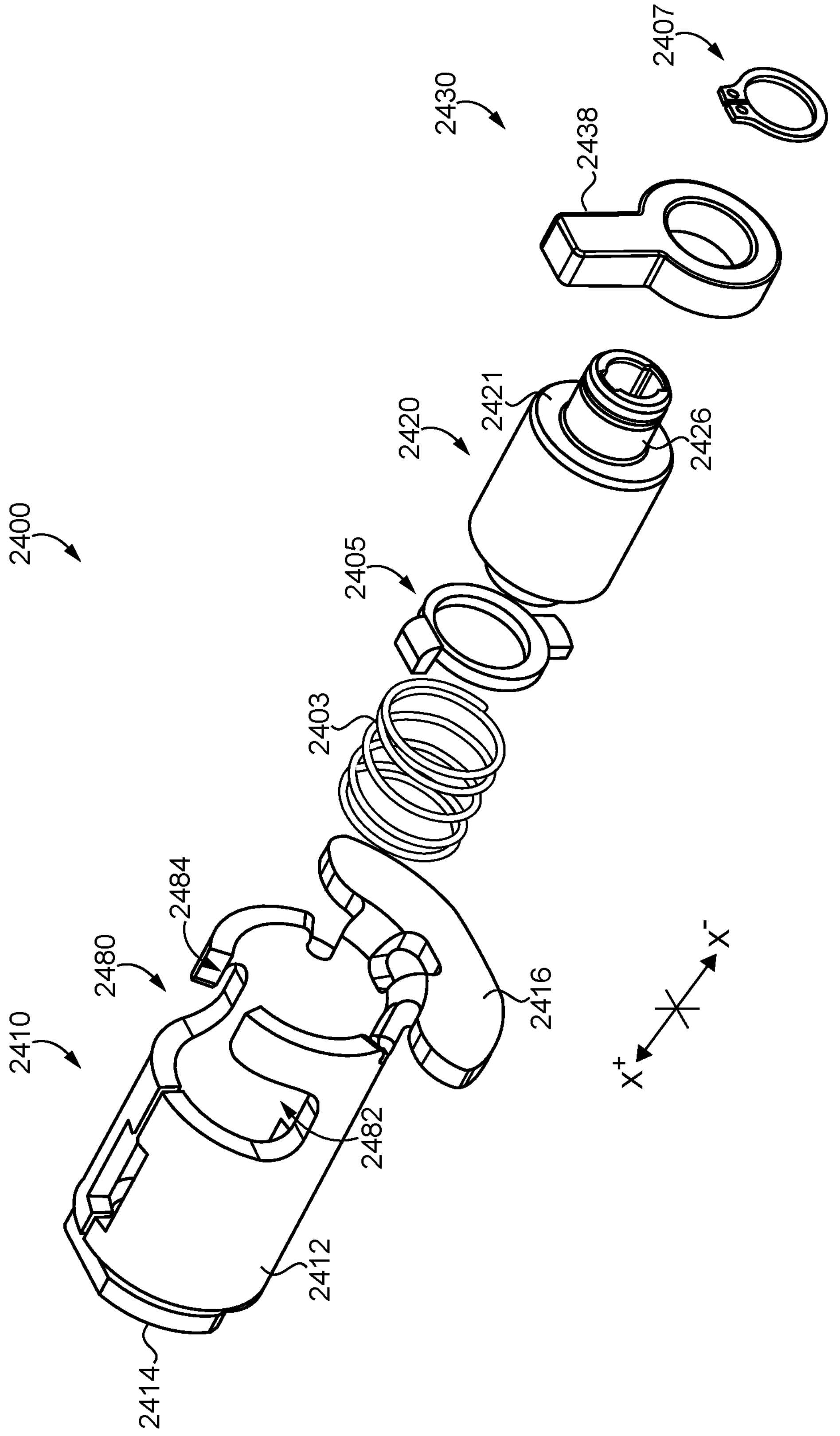
FIG. 30 is an exploded assembly view of a key cam according to certain embodiments.

With reference to FIGS. 29 and 30, illustrated therein is a chassis 2300 according to certain embodiments. The chassis 2300 includes an inner hub 2310, an outer hub 2320 coupled with the inner hub 2310, an inner chassis spindle 2330 rotatably mounted to the inner hub 2310, an outer chassis spindle 2340 rotatably mounted to the outer hub 2320, a shuttle 2360 slidably mounted to the hubs 2310, 2320, a plunger catch 2350 slidably mounted to the shuttle 2360, a biasing assembly 2370 biasing the plunger catch 2350 and the shuttle 2360 in the laterally-outward direction ($Y^+$), a slide clip 2380 in which the shuttle 2360 is slidably mounted, and a key cam 2400 rotatably mounted in the outer chassis spindle 2340. The key cam 2400 generally includes a shell 2410, a plug 2420 movably mounted in the shell 2410, and a lock control lug 2430 supported by the plug 2420.

The chassis 2300 is configured to operate in a manner somewhat similar to that described above with reference to the chassis 300 and the chassis 1300, and similar reference characters are used to denote similar elements and features. For example, each of the inner chassis spindle 2330 and the key cam shell 2410 can be rotated to drive the shuttle 2360 in the retracting direction ($Y^-$) in a manner substantially similar to that described above with reference to the inner chassis spindle 330, key cam shell 410, and shuttle 360. The lock control lug 2430 is configured to selectively couple the outer chassis spindle 2340 with the key cam shell 2410 such that an outside handle rotationally coupled with the spindle 2340 is selectively operable to retract the latchbolt. The lug 2430 has a proximal locking position in which the lock control arm 2438 extends into the receiving slot 2348 of the outside chassis spindle 2340 via the arc slot 2482 such that the spindle 2340 and the shell 2410 are rotationally decoupled from one another. The lug 2430 also has a distal unlocking position in which the lock control arm 2438 extends into the receiving slot 2348 such that the outside chassis spindle 2340 and the key cam shell 2410 are rotationally coupled with one another. In the interest of conciseness, the following descriptions of the chassis 2300 and key cam 2400 focus primarily on elements and features that differ from those described above with reference to the chassis 300 and/or the chassis 1300.

The outside hub 2320 defines a central opening 2322 that rotatably supports the outside chassis spindle 2340. The outside hub 2320 also defines a locking slot 2328 and an arcuate receiving recess 2329 positioned distally of the locking slot 2328. When the spindle 2340 is in its home position, the receiving slot 2348 is aligned with the locking slot 2328. When the lug 2430 is in its proximal locking position, the arm 2438 extends into the locking slot 2328, thereby rotationally locking the spindle 2340 to the hub 2320. When the lug 2430 is in its distal unlocking position, the arm 2438 extends into the arcuate recess 2329 such that the spindle 2340 is rotatable relative to the hub 2320.

In the illustrated form, the length of the arm 2438 is sufficient to extend into the slot 2328 such that the chassis 2300 provides for stationary locking of the outside handle. In other embodiments, the arm 2438 may be formed with a lesser length in order to provide the chassis 2300 with freewheeling lock functionality. In such forms, the locking slot 2328 and/or the arcuate recess 2329 may be omitted from the hub 2320.

As noted above, the control lug 2430 has a proximal locking position and a distal unlocking position. The lug 2430 is rotatably mounted to a post 2426 of the plug 2420, and is captured between a shoulder 2421 and a circlip 2407 such that the plug 2420 and the lug 2430 are rotatably coupled for joint movement in the longitudinal directions. The key cam 2400 further includes a spring 2403 that is engaged with the plug 2420 via a spring seat 2405 such that the spring 2403 distally biases the plug 2420 and the lug 2430 toward the unlocking position.

The proximal wall 2414 of the shell 2410 includes a bowtie opening by which the shell 2410 can be rotationally engaged with an outside actuating mechanism. As one example, the tailpiece 711 of the lock cylinder 710 may be received in the bowtie opening such that a lost rotational motion connection is formed between the tailpiece 711 and the shell 2410. As another example, a classroom tailpiece 721 having a pair of notches formed therein may be inserted into the bowtie opening in the wall 2414 of the shell 2410 such that a rotational coupling is formed between the tailpiece 721 and a bowtie opening in the proximal end of the plug 2420.

Like the plug 1420 of the above-described key cam 1400, the plug 2420 does not directly cause longitudinal movement of the lug 2430 when rotated. Instead, the plug 2420 is configured to transmit such rotation to an inside operating mechanism that converts rotation of the plug 2420 into longitudinal movement of the plug 2420 and lug 2430, for example as described above with reference to the classroom plunger assembly 1800. Additionally, the plug 2420 and lug 2430 can be longitudinally driven by an inside operating mechanism that does not receive rotational input from the plug 2420, for example as described above with reference to the vestibule plunger assembly 1700. Along similar lines, the plug 2420 and lug 2430 can be linearly driven by manually-operable plunger assemblies such as the push-type plunger assembly 830 and/or the push/turn plunger assemblies 840, 850.

As should be evident from the foregoing, the key cam 2400 is operable to interact with various inside operating mechanisms and outside actuating mechanisms in a manner substantially similar to that described above with reference to the key cam 1400. As such, the chassis 2300 may be utilized in a common platform of a product line system substantially similar to the system 1600. Those skilled in the art will appreciate that the principles of operation set forth with regard to the various modular components can readily be adapted for use with the chassis 2300 based upon the differences between the chassis 1300 and the chassis 2300. In the chassis 1300, for example, the key cam 1400 includes the lost motion driver 1440, and the override mechanisms 730', 740' include tailpiece lugs 798 for eliminating the lost motion that would otherwise be provided by the driver 1440. In the chassis 2300, by contrast, the illustrated key cam 2400 does not necessarily include such a lost motion driver. Accordingly, override mechanisms adapted for use with the key cam 2400 may simply include a pair of grooves configured to engage teeth of a bowtie opening formed in the proximal wall 2414 of the key cam shell 2410. Other adaptations that may be necessary to utilize the chassis 2300 in the product line system 1600 will be readily apparent to those skilled in the art, and need not be described in further detail herein.

Figure 31:
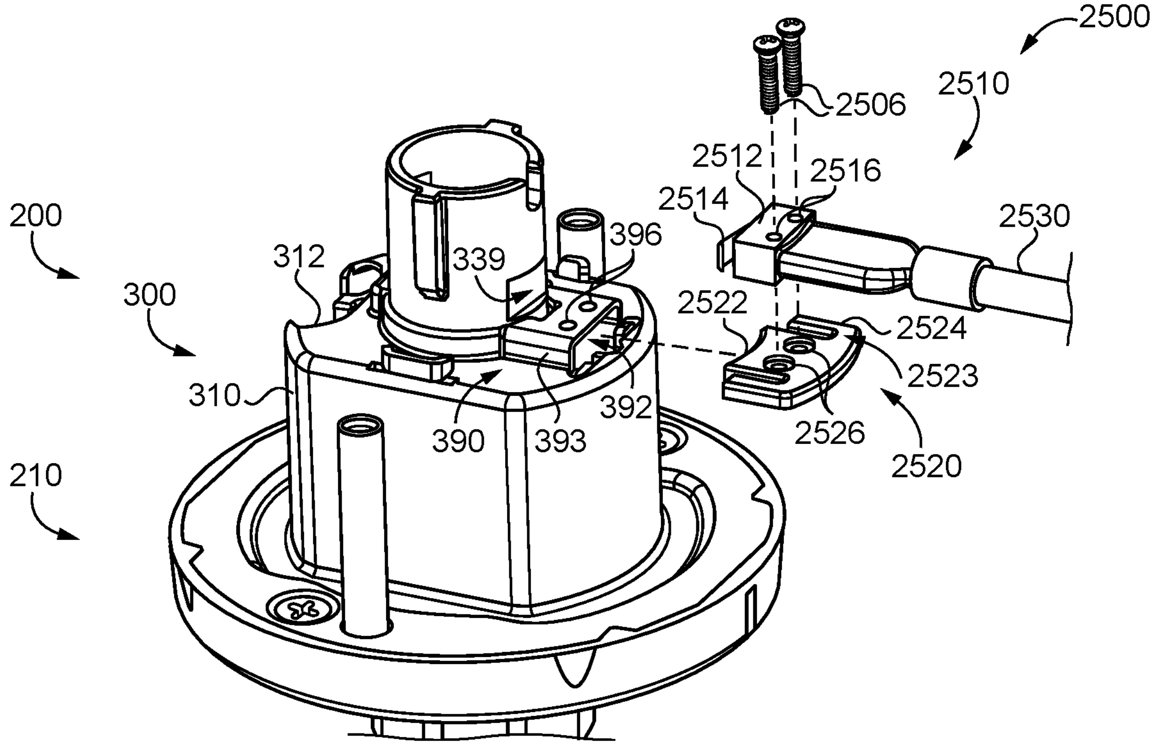
FIG. 31 includes a perspective illustration of the chassis assembly illustrated in FIG. 2 along with an exploded assembly view of a sensor assembly according to certain embodiments.
Figure 32:
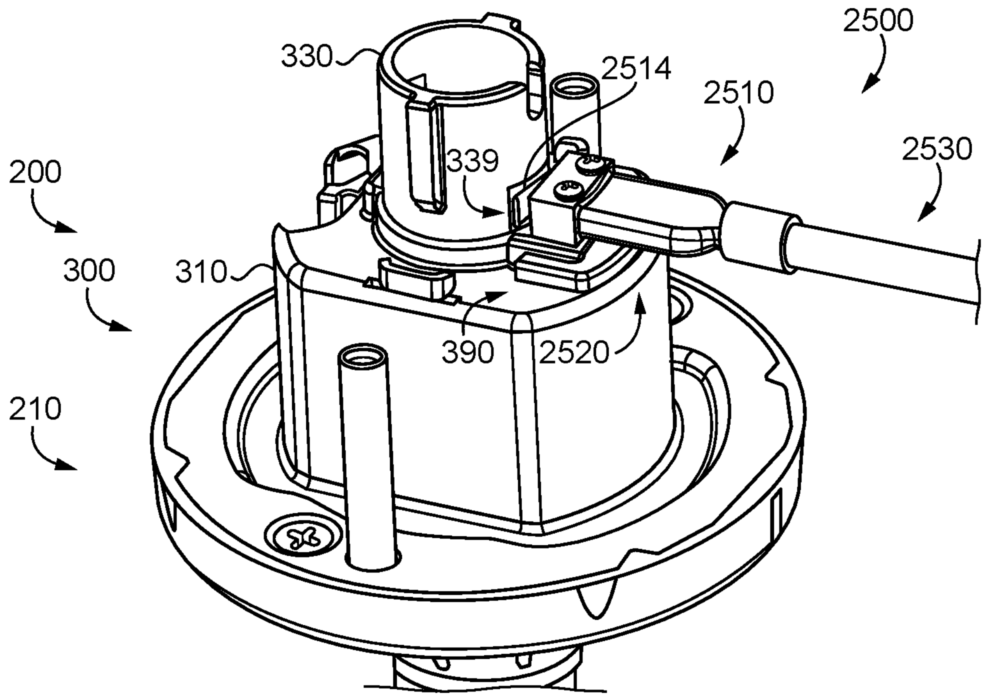
FIG. 32 is a perspective illustration of the chassis assembly with the sensor assembly installed thereto.

As indicated above, the product line systems 600, 1600 described herein may include one or more sensor assembly species, such as a request-to-exit (REX) sensor assembly species. An example of a sensor assembly 2500 that may be utilized as such a REX sensor assembly species is illustrated in FIGS. 31 and 32, along with the above-described chassis assembly 200. More specifically, an exploded assembly view of the sensor assembly 2500 is illustrated in FIG. 31, and FIG. 32 illustrates the sensor assembly 2500 installed to the chassis assembly 200. While the following description of the sensor assembly 2500 is made with specific reference to the chassis assembly 200 illustrated in FIG. 2, it is to be appreciated that the features described hereinafter may also be provided to the chassis assembly 1200 illustrated in FIG. 18.

As noted above, the illustrated mounting bracket 390 is formed on the distal wall 312 of the housing 310, and is positioned adjacent the tubular body portion 332 of the inside chassis spindle 330. The mounting bracket 390 defines a cavity 392, which is partially delimited by a pair of sidewalls 393 that extend distally from the distal wall 312. The mounting bracket 390 also defines a pair of openings 396, each of which is connected to the cavity 392.

The sensor assembly 2500 generally includes a sensor 2510, a mounting plate 2520 that facilitates installation of the sensor 2510 to the chassis 300, and a transmission line 2530 connected to the sensor 2510. In the illustrated form, the sensor 2510 is provided in the form of a snap-action switch 2510 that includes a body portion 2512 and a spring-biased actuation arm 2514. The body portion 2512 includes a pair of openings 2516 that can be aligned with the openings 396 of the mounting bracket 390, and which are operable to receive a pair of fasteners 2506. The arm 2514 is movable between a projected position and a depressed position, and such movement causes the switch 2510 to transition between a default state and a non-default state, resiliency snap-action spring inside the body portion 2512 of the arm 2514 biases the switch 2510 to the default state, and depression of the arm 2514 causes the switch to transition to its non-default state. The switch 2510 is configured to transmit signals via the transmission line 2530 such that the state of the switch 2510 can be detected by external circuitry in electrical communication with the transmission line 2530. Such signal transmission and state detection are known in the art, and need not be described in further detail herein.

The mounting plate 2520 includes a body portion 2522 and a pair of arms 2524 positioned on opposite sides of the body portion 2522. A pair of slots 2523 are defined between the body portion 2522 and the arms 2524, and a pair of threaded openings 2526 are defined in the body portion 2522. The body portion 2522 is sized and configured to be received in the cavity 392, and the slots 2523 are configured to receive the sidewalls 393. With the body portion 2522 received in the cavity 392, the mounting bracket openings 396 are aligned with the mounting plate openings 2526. A pair of threaded fasteners 2506 may be inserted through the switch body openings 2516 and the mounting bracket openings 396 and engaged with the mounting plate openings 2526 to secure the sensor 2510 to the chassis 300.

With the sensor assembly 2500 installed to the chassis 300, the actuation arm 2514 is engaged with the inside chassis spindle 330. Rotation of the spindle 330 causes the arm 2514 to enter and exit the recess 339, thereby causing the arm 2514 to move between its projected and depressed positions. As a result, the default/non-default state of the switch 2510 corresponds to the home/rotated position of the spindle 330, and the request-to-exit (REX) condition can be determined based upon the state of the switch 2510. In the illustrated form, the arm 2514 is engaged with the recess 339 when the spindle 330 is in its home position, such that the default state of the switch 2510 corresponds to the home position of the spindle 330. Thus, the non-default state of the switch 2510 corresponds to the rotated position of the spindle 330, and is indicative of the REX condition. In other embodiments, the arm 2514 may be engaged with the recess 339 when the spindle 330 is in its rotated position. In such forms, the default state of the switch 2510 corresponds to the rotated position of the spindle 330, and is therefore indicative of the REX condition.

Certain embodiments of the present application relate to a chassis for a lockset, the chassis comprising: a housing assembly; a shuttle slidably mounted in the housing assembly, wherein the shuttle is configured for connection with a latchbolt mechanism, is operable to slide in a retracting direction and an opposite extending direction, and is biased in the extending direction; an inside chassis spindle mounted to the housing assembly for rotation about a longitudinal axis defining a proximal direction and an opposite distal direction, wherein the inside chassis spindle is engaged with the shuttle and is configured to drive the shuttle in the retracting direction when the inside chassis spindle is rotated about the longitudinal axis; and a key cam rotatably mounted in the housing assembly, the key cam comprising: a tubular key cam shell rotatably mounted in the housing assembly and engaged with the shuttle, wherein the key cam shell is configured to drive the shuttle in the retracting direction when the key cam shell is rotated about the longitudinal axis, wherein the key cam shell defines a lock control opening comprising a longitudinal slot and an arc slot connected to the longitudinal slot, wherein a proximal end of the key cam shell defines a key cam shell opening; a key cam plug rotatably mounted in the key cam shell, wherein the key cam plug includes a key cam plug opening defined in part by a pair of key cam plug teeth; a lock control lug rotatably mounted to the key cam plug, wherein the lock control lug includes a lock control arm that extends outward via the lock control opening; and a spring exerting a biasing force urging the lock control lug in the distal direction; wherein the lock control lug has a proximal locking position in which the lock control arm extends through the arc slot, thereby defining a locked state of the chassis; and wherein the lock control lug has a distal unlocking position in which the lock control arm extends through the longitudinal slot, thereby defining an unlocked state of the chassis.

In certain embodiments, the chassis further comprises a key cam sleeve, wherein the key cam is rotatably seated in the key cam sleeve, and wherein the lock control arm extends into a key cam sleeve slot via the lock control opening.

In certain embodiments, the inside chassis spindle defines a recess, and wherein the housing assembly defines a mounting feature adjacent the inside chassis spindle.

In certain embodiments, the chassis further comprises a request to exit switch mounted to the mounting feature, the request to exit switch engaging the recess when the inside chassis spindle is in a first position, the request to exit switch engaging an outer surface of the inside chassis spindle when the inside chassis spindle is in a second position.

In certain embodiments, a proximal end of the key cam shell defines a pair of fingers; wherein the key cam further comprises a driver rotatably mounted in the key cam shell, wherein the driver includes a pair of driver lugs operable to engage the pair of fingers such that a lost rotational motion connection is formed between the key cam shell and the driver.

In certain embodiments, the driver further comprises a pair of driver teeth extending radially inward, the pair of driver teeth partially defining a driver bowtie opening.

In certain embodiments, the chassis further comprises a fire plate; wherein the fire plate is positioned between a distal end of the key cam shell and a proximal side surface of the shuttle; wherein the fire plate includes a central opening and a pair of radial recesses; wherein the shuttle includes a pair of cam projections extending proximally through the radial recesses such that the distal end of the key cam shell is operable to engage the cam projections.

Certain embodiments relate to a chassis assembly comprising the chassis, the chassis assembly further comprising an outside drive assembly, the outside drive assembly comprising: an outside spring cage housing, wherein the outside spring cage housing is secured to the housing assembly and defines a central opening; an outside drive spindle rotatably mounted to the outside spring cage housing, wherein the outside drive spindle extends through the central opening; wherein the outside drive spindle further includes an outside drive spindle slot; wherein the lock control lug extends into the outside drive spindle slot via the lock control opening;

wherein with the lock control lug in the proximal locking position, the lock control arm extends into the outside drive spindle slot via the arc slot such that the such that the key cam shell and the outside drive spindle are rotationally decoupled from one another; and wherein with the lock control lug in the distal unlocking position, the lock control arm extends into the outside drive spindle slot via the longitudinal slot such that the key cam shell and the outside drive spindle are rotationally coupled with one another.

In certain embodiments, the outside spring cage housing further defines a locking slot connected with the central opening; wherein the outside drive spindle has a spindle home position in which the outside drive spindle slot is aligned with the locking slot; wherein the outside drive spindle has a spindle rotated position in which the outside drive spindle slot is misaligned with the locking slot; wherein in the locked state of the chassis, the outside drive spindle is in the spindle home position, and the lock control arm extends into the lock control slot via the outside drive spindle slot, thereby preventing rotation of the outside drive spindle relative to the outside spring cage housing.

In certain embodiments, the housing assembly includes a fire cup formed of a single-piece monolithic structure; wherein a distal end portion of the fire cup rotatably supports the inside chassis spindle; wherein a proximal end portion of the fire cup defines an annular flange; and wherein the annular flange abuts the outside spring cage housing.

Certain embodiments relate to a system including the chassis assembly, the system further comprising a plurality of modular component families; wherein each modular component family includes a plurality of modular component species; wherein each modular component species is operable to be installed to the chassis assembly without requiring disassembly of the chassis assembly; and wherein each modular component species is configured to provide a corresponding and respective functionality when installed to the chassis assembly.

In certain embodiments, the plurality of modular component families includes an outside actuating mechanism family including a plurality of outside actuating mechanism species; wherein each of the outside actuating mechanism species is configured to be mounted in the outside drive spindle and to engage the key cam.

In certain embodiments, each of the outside actuating mechanism species includes a shell, a plug rotatably mounted in the shell, and a tailpiece coupled with the plug; wherein the plurality of outside actuating mechanism species includes a first outside actuating mechanism species, a second outside actuating mechanism species, and a third outside actuating mechanism species; wherein with the first outside actuating mechanism species installed to the chassis assembly, the tailpiece thereof engages the key cam shell such that the plug is operably connected with the key cam shell via a lost rotational motion coupling; wherein with the second outside actuating mechanism species installed to the chassis assembly, the tailpiece thereof engages the key cam shell such that the plug is rotationally coupled with the key cam shell; and wherein with the third outside actuating mechanism species installed to the chassis assembly, the tailpiece thereof passes through the proximal opening without engaging the key cam shell such that the plug is rotationally decoupled from the key cam shell, and the tailpiece engages the key cam plug such that the plug is operably connected with the key cam plug.

In certain embodiments, the plurality of outside actuating mechanism species includes a first lock cylinder species and a second lock cylinder species; wherein the first lock cylinder species comprises: a first lock cylinder including a first lock cylinder shell, a first lock cylinder plug rotatably mounted in the first lock cylinder shell, and a first tumbler system configured to selectively prevent rotation of the first lock cylinder plug relative to the first lock cylinder shell; and a first tailpiece rotationally coupled with the first lock cylinder plug; wherein with the first lock cylinder species installed to the chassis assembly, the first lock cylinder is received in the outside drive spindle, and the first tailpiece engages the key cam such that the key cam and the first tailpiece cooperate to define a lost rotational motion coupling between the key cam shell and the first lock cylinder plug; wherein the second lock cylinder species comprises: a second lock cylinder including a second lock cylinder shell, a second lock cylinder plug rotatably mounted in the second lock cylinder shell, and a second tumbler system configured to selectively prevent rotation of the second lock cylinder plug relative to the second lock cylinder shell; and a second tailpiece rotationally coupled with the second lock cylinder plug; wherein with the second lock cylinder species installed to the chassis assembly, the second lock cylinder is received in the outside drive spindle, the second tailpiece extends through the key cam shell opening without engaging the key cam shell such that the second lock cylinder plug is rotationally decoupled from the key cam shell, and the second tailpiece engages the key cam plug such that the second lock cylinder plug is operable to rotate the key cam plug.

In certain embodiments, the plurality of outside actuating mechanism species includes at least one override species, wherein each override species comprises a shell, a plug rotatably mounted in the shell, an engagement feature formed on a proximal end of the plug, and a tailpiece extending from a distal end of the plug; wherein with the at least one override species installed to the chassis assembly, the shell is seated in the outside drive spindle, and the tailpiece is engaged with the key cam such that the plug and the key cam shell are rotationally coupled with one another.

In certain embodiments, the plug includes an annular groove, wherein the shell comprises at least one tab, and wherein the at least one tab is received in the annular groove such that the plug and the shell are longitudinally coupled with one another and are operable to rotate relative to one another.

In certain embodiments, the at least one override species includes a manual override species and a tool-assisted override species; wherein the engagement feature of the manual override species comprises a manually-graspable flange; and wherein the engagement feature of the tool-assisted override species comprises a recess.

In certain embodiments, the key cam further includes a lost-motion driver including a pair of driver lugs, wherein the key cam shell opening is defined in part by a pair of key cam shell teeth, wherein the tailpiece includes a pair of tailpiece lugs configured to be positioned between the driver lugs and the key cam shell teeth such that the tailpiece, the driver, and the key cam shell are rotationally coupled with one another.

In certain embodiments, the driver further includes a pair of driver teeth extending radially inward, and wherein the tailpiece further comprises a pair of recesses sized and shaped to receive the driver teeth.

In certain embodiments, the tailpiece comprises a base portion adjacent the plug, a tip portion opposite the base portion, and an intermediate portion positioned between the base portion and the tip portion, and wherein the intermediate portion comprises a pair of recesses.

In certain embodiments, the plurality of modular component families further comprises an inside actuating mechanism family comprising a plurality of inside actuating mechanism species; wherein each of the inside actuating mechanism species includes a mount configured to be seated in and coupled with the inside chassis spindle; and wherein one or more of the inside actuating mechanism species further includes a longitudinally-extending member operable to extend through the shuttle to engage the key cam plug.

In certain embodiments, each mount includes a distal rim and a flexible tab, wherein with the mount mounted in the inside chassis spindle, the distal rim abuts a distal end of the inside chassis spindle, the flexible tab extends into a receiving opening formed in the inside chassis spindle, and a portion of the inside chassis spindle is captured between the distal rim and the flexible tab such that the mount is longitudinally coupled with the inside chassis spindle.

In certain embodiments, each mount further comprises an alignment ridge configured to be received in an alignment notch of the inside chassis spindle to rotationally couple the mount with the inside chassis spindle.

In certain embodiments, for one or more of the inside actuating mechanism species, the mount is an anti-tamper cup having a solid proximal wall.

In certain embodiments, the plurality of inside actuating mechanism species includes a fixed plunger species; wherein the fixed plunger species further includes a first post extending proximally from a proximal wall of the mount; and wherein with the fixed plunger species installed to the chassis assembly, the mount is securely seated in the inside chassis spindle, and the first post is engaged with the key cam and retains the key cam plug in the proximal locking position against the biasing force of the spring.

In certain embodiments, the system further comprises an outside handle and a catch selectively coupling the outside handle to the outside drive spindle, the catch having a projected position in which the catch engages the outside handle and prevents removal of the outside handle from the outside drive spindle, and the catch having a depressed position in which the catch is disengaged from the outside handle and the handle is removable from the outside drive spindle; wherein the plurality of outside operating mechanism species comprises an exit species including a second spring and a stop member having a body portion, a recess formed in the body portion, and a second post extending distally from the body portion; wherein the system has a less-assembled state in which the exit species is mounted in the outside handle and the outside drive spindle, and the second spring biases the body portion to a distal position in which the recess is aligned with the catch such that the catch is operable to move from the projected position to the depressed position; and wherein the system has a more-assembled state in which the fixed plunger species is installed to the chassis assembly and retains the key cam plug in the proximal locking position, and the key cam plug engages the second post and retains the body portion in a proximal position in which the recess is misaligned with the catch such that the body portion retains the catch in the projected position.

In certain embodiments, the plurality of inside operating mechanism species comprises a plurality of manually-actuated inside operating mechanism species; wherein each of the manually-actuated inside operating mechanism species, when installed to the chassis assembly, is operable to place the chassis assembly in at least one locking state selected from a plurality of locking states; and wherein the plurality of locking states includes: a releasable locking state in which the chassis assembly is configured to transition from the locked state to the unlocked state in response to an actuating input; and a persistent locking state in which the chassis assembly is configured to remain in the locked state in response to the actuating input.

In certain embodiments, a first of the manually-actuated inside operating mechanism species is operable to place the chassis assembly in the releasable locking state and is inoperable to place the chassis assembly in the persistent locking state; wherein a second of the manually-actuated inside operating mechanism species is operable to place the chassis assembly in each of the releasable locking state and the persistent locking state.

In certain embodiments, a third of the manually-actuated inside operating mechanism species is operable to place the chassis in the persistent locking state and is inoperable to place the chassis assembly in the releasable locking state.

In certain embodiments, one or more of the inside actuating mechanism species comprises a plunger assembly, wherein each plunger assembly comprises: a plunger assembly plug rotatably coupled with the mount; a plunger movably mounted in the plunger assembly plug, the plunger having a distal base portion and a proximal tip portion; and a cam interface operable to translate relative rotation of the plunger and the plunger assembly plug to relative longitudinal movement of the plunger and the plunger assembly plug; wherein with the plunger assembly installed to the chassis assembly, the tip of the plunger engages the key cam plug such that the plunger assembly is configured to drive the lock control lug between the proximal locking position and the distal unlocking position in response to relative rotation of the plunger and the plunger assembly plug.

In certain embodiments, the one or more of the inside actuating mechanism species comprises a vestibule species and a classroom species; wherein for the vestibule species, the tip portion of the plunger is configured to rotationally decouple the key cam plug from the plunger such that rotation of the key cam plug does not cause a corresponding rotation of the plunger; and wherein for the classroom species, the tip portion of the plunger is configured to form a rotational engagement with the key cam plug such that the rotation of the key cam plug causes a corresponding rotation of the plunger.

In certain embodiments, the plurality of modular component families further comprises an inside operating mechanism family including a plurality of inside operating mechanism species, the plurality of inside operating mechanism species including: an active species comprising a lock cylinder and an active tailpiece operable to engage the plunger assembly plug such that the lock cylinder is operable to rotate the plunger assembly plug; and an inactive species including an inactive tailpiece configured to engage the plunger assembly plug such that the inactive tailpiece prevents rotation of the plunger assembly plug.

In certain embodiments, the plurality of modular component families includes a latchbolt mechanism family including a plurality of latchbolt mechanism species; wherein each latchbolt mechanism species comprises a housing, a latchbolt movably mounted in the housing, and a bolt bar coupled with the latchbolt, wherein the bolt bar is configured to engage the shuttle such that movement of the shuttle in the retracting direction causes a corresponding movement of the latchbolt in the retracting direction; wherein for a first of the latchbolt mechanism species, the bolt bar is configured to engage the shuttle unidirectionally such that movement of the latchbolt in the retracting direction does not cause a corresponding movement of the shuttle in the retracting direction; and wherein for a second of the latchbolt mechanism species, the bolt bar is configured to engage the shuttle bidirectionally such that movement of the latchbolt in the retracting direction causes a corresponding movement of the shuttle in the retracting direction.

In certain embodiments, the first of the latchbolt mechanism species further comprises an auxiliary bolt having a depressed position and a projected position, wherein the first of the latchbolt mechanism species is configured to deadlock the latchbolt thereof when the auxiliary bolt is in the depressed position.

Certain embodiments of the present application relate to a system for producing a lockset having a plurality of configurations, the system comprising: a chassis assembly common to the plurality of configurations such that each of the configurations includes the chassis assembly, the chassis assembly comprising: a housing assembly including a chassis housing and an outside spring cage housing coupled with the chassis housing; a shuttle slidably mounted in the chassis housing, wherein the shuttle is configured for connection with a latch mechanism, is operable to slide in a retracting direction and an opposite extending direction, and is biased in the extending direction; an inside chassis spindle mounted to the housing assembly for rotation about a longitudinal axis, wherein the inside chassis spindle is configured to drive the shuttle in the retracting direction when rotated about the longitudinal axis, and wherein the longitudinal axis defines a proximal direction and an opposite distal direction; an outside drive spindle rotatably mounted to the outside spring cage housing; and a key cam including a key cam shell rotatably mounted in the outside drive spindle, wherein the key cam shell is configured to drive the shuttle in the retracting direction when rotated about the longitudinal axis, wherein the key cam has an unlocking state in which the key cam shell is rotationally coupled with the outside drive spindle, and wherein the key cam has a locking state in which the key cam shell is rotationally decoupled from the outside drive spindle; an inside spring cage assembly comprising an inside spring cage housing and an inside drive spindle, wherein the inside drive spindle is configured to be rotationally coupled with the inside chassis spindle, and wherein each of the plurality of configurations includes the inside spring cage assembly; an outside actuating mechanism family comprising a plurality of outside actuating mechanism species, wherein each of the outside actuating mechanism species is included in at least one corresponding configuration of the plurality of configurations, wherein each of the outside actuating mechanism species is configured to be mounted in the outside drive spindle without disassembling the chassis assembly, and wherein the plurality of outside actuating mechanism species includes: a first outside actuating mechanism species comprising a first tailpiece, wherein the first tailpiece is configured to form a lost rotational motion coupling with the key cam shell such that the first outside actuating mechanism species is operable to rotate the key cam shell with lost rotational motion; a second outside actuating mechanism species comprising a second tailpiece, wherein the second tailpiece is configured to form a rotational coupling with the key cam shell such that the second outside actuating mechanism species is operable to rotate the key cam shell without lost rotational motion; wherein with the lockset in a first configuration of the plurality of configurations, the lockset comprises the first outside actuating mechanism species, and the first outside actuating mechanism species is operable to rotate the key cam shell with lost rotational motion to drive the shuttle in the retracting direction; wherein with the lockset in a second configuration of the plurality of configurations, the lockset comprises the second outside actuating mechanism species, and the second outside actuating mechanism species is operable to rotate the key cam shell without lost rotational motion to drive the shuttle in the retracting direction; and wherein the lockset is capable of being transitioned between the plurality of configurations without disassembling the chassis assembly and without opening the chassis assembly.

In certain embodiments, the first outside actuating mechanism species includes a lock cylinder including a lock cylinder shell, a lock cylinder plug, and a tumbler system operable to selectively prevent rotation of the lock cylinder plug relative to the lock cylinder shell, and wherein the first tailpiece is rotationally coupled with the lock cylinder plug; and wherein the second outside actuating mechanism species further includes a first shell and a first plug rotatably mounted in the first shell, the first plug including an engagement feature configured to facilitate rotation of the first plug relative to the first shell.

In certain embodiments, the engagement feature of the second outside actuating mechanism comprises a manually-graspable flange.

In certain embodiments, with the lockset in a third configuration of the plurality of configurations, the lockset includes neither the first outside actuating mechanism species nor the second outside actuating mechanism species.

In certain embodiments, the key cam is biased toward the unlocking state.

In certain embodiments, the system further comprises: an outside handle family comprising a plurality of outside handle species, wherein each of the plurality of configurations includes a corresponding and respective one of the plurality of outside handle species, wherein each of the outside handle species is configured to be mounted to the outside drive spindle, and wherein the plurality of outside handle species includes: an open-faced outside handle species; and a closed-face outside handle species; and an inside handle family comprising a plurality of inside handle species, wherein each of the plurality of configurations includes a corresponding and respective one of the plurality of inside handle species, wherein each of the inside handle species is configured to be mounted to the inside drive spindle, and wherein the plurality of inside handle species includes: an open-faced inside handle species; and a closed-face inside handle species; wherein with the lockset in the first configuration, the lockset further comprises the open-faced outside handle species and either the open-faced inside handle species or the closed-face inside handle species; wherein with the lockset in the second configuration, the lockset further comprises the open-faced outside handle species and either the open-faced inside handle species or the closed-face inside handle species; and wherein with the lockset in a third configuration, the lockset comprises the closed-face outside handle species and the closed-face inside handle species, and the lockset is not operable to transition the key cam between the locking state and the unlocking state.

In certain embodiments, the system further comprises an inside operating mechanism family including at least one inside operating mechanism species; wherein each of the inside operating mechanism species is included in at least one corresponding configuration of the plurality of configurations; wherein each of the inside operating mechanism species is configured to be mounted in the inside chassis spindle without disassembling the chassis assembly; wherein the at least one inside operating mechanism species includes a first inside operating mechanism species comprising a cup configured to be mounted in the inside chassis spindle, the cup including a distal wall configured to enclose a proximal end portion of the inside chassis spindle; wherein with the lockset in the third configuration, the lockset further comprises the first inside operating mechanism species.

In certain embodiments, the key cam is biased toward one of the locking state or the unlocking state; and wherein with the lockset in the third configuration, the first inside operating mechanism species does not engage the key cam such that the key cam remains in the one of the locking state or the unlocking state.

In certain embodiments, the key cam is biased toward one of the locking state or the unlocking state; wherein the first inside operating mechanism species further comprises a post extending from the distal wall of the cup; and wherein with the lockset in the third configuration, the post engages the key cam and retains the key cam in the other of the locking state or the unlocking state.

In certain embodiments, the plurality of outside actuating mechanism species further comprises a stop member mounted in the outside drive spindle and engaged with the key cam; the stop member having a first position when the key cam is in the one of the locking state or the unlocking state; the stop member having a second position when the key cam is in the other of the locking state or the unlocking state; wherein the stop member in the first position is configured to permit removal of the closed-face outside handle species from the outside drive spindle; and wherein the stop member in the second position is configured to permit removal of the closed-face outside handle species from the outside drive spindle.

In certain embodiments, the at least one inside operating mechanism species further comprises a plunger assembly including a mount and a plunger movably mounted in the mount; wherein with the lockset in the first configuration, the lockset further comprises the plunger assembly, and the plunger assembly is operable to selectively retain the key cam in the locking state; and wherein with the lockset in the second configuration, the lockset further comprises the plunger assembly, and the plunger assembly is operable to selectively retain the key cam in the locking state.

In certain embodiments, the system further comprises an inside operating mechanism family comprising at least one inside operating mechanism species; wherein each of the inside operating mechanism species is included in at least one corresponding configuration of the plurality of configurations; wherein each of the inside operating mechanism species is configured to be mounted in the inside chassis spindle without disassembling the chassis assembly; wherein the at least one inside operating mechanism species further comprises a plunger assembly including a sleeve and a plunger movably mounted in the sleeve.

In certain embodiments, with the lockset in the first configuration, the lockset further comprises the plunger assembly, and the plunger assembly is operable to selectively retain the key cam in the locking state; and wherein with the lockset in the second configuration, the lockset further comprises the plunger assembly, and the plunger assembly is operable to selectively retain the key cam in the locking state.

In certain embodiments, the key cam further comprises a key cam plug rotatably mounted in the key cam shell and a lock control lug rotatably mounted to the key cam plug; wherein the lock control lug is configured to rotationally couple the key cam shell with the outside drive spindle when the key cam is in the unlocking state; and wherein the plunger is configured to engage the key cam plug when the plunger assembly is installed to the chassis assembly.

In certain embodiments, the plurality of outside actuating mechanism species further includes a third outside actuating mechanism species including a third tailpiece; wherein the third tailpiece is configured to engage the key cam plug such that the third outside actuating mechanism is operable to rotate the key cam plug without rotating the key cam shell; and wherein with the lockset in a third configuration of the plurality of configurations, the lockset includes the plunger assembly and the third outside actuating mechanism species.

In certain embodiments, the plunger assembly further comprises a cam mechanism and a plunger assembly plug movably mounted in the sleeve; wherein the plunger is movably mounted to the plunger assembly plug; wherein the cam mechanism is configured to drive the plunger longitudinally in response to relative rotation of the plunger and the plunger assembly plug; and wherein with the plunger engaged with the key cam plug, the key cam is configured to move between the locking state and the unlocking state in response to longitudinal movement of the plunger.

In certain embodiments, with the lockset in the third configuration: the plunger is engaged with the key cam plug for transmission of longitudinal pushing forces; the plunger is rotationally decoupled from the key cam plug; and the lockset further includes a second lock cylinder mounted in the inside drive spindle, wherein the second lock cylinder is engaged with the plunger assembly and is operable to cause relative rotation of the plunger and the plunger assembly plug.

In certain embodiments, with the lockset in the third configuration, the plunger is engaged with the key cam plug for transmission of longitudinal pushing forces and the key cam plug is operable to rotate the plunger.

In certain embodiments, with the lockset in the third configuration, the lockset further comprises a dummy lock cylinder mounted in the inside drive spindle and engaged with the plunger assembly such that the dummy lock cylinder prevents rotation of the plunger assembly plug relative to the sleeve.

In certain embodiments, with the lockset in the third configuration, the lockset further comprises an additional lock cylinder mounted in the inside drive spindle and engaged with the plunger assembly such that the additional lock cylinder is operable to rotate the plunger assembly plug relative to the sleeve.

Certain embodiments of the present application relate to a chassis for a lockset, the chassis comprising: a housing assembly; a shuttle slidably mounted in the housing assembly, wherein the shuttle is configured for connection with a latchbolt mechanism, is operable to slide in a retracting direction and an opposite extending direction, and is biased in the extending direction; an inside chassis spindle mounted to the housing assembly for rotation about a longitudinal axis, wherein the inside chassis spindle is engaged with the shuttle and is configured to drive the shuttle in the retracting direction when the inside chassis spindle is rotated about the longitudinal axis, and wherein the longitudinal axis defines a proximal direction and an opposite distal direction; a key cam rotatably mounted in the housing assembly, the key cam comprising: a tubular key cam shell rotatably mounted in the housing assembly and engaged with the shuttle, wherein the key cam shell is configured to drive the shuttle in the retracting direction when the key cam shell is rotated about the longitudinal axis, wherein the key cam shell defines a lock control opening comprising a longitudinal slot and an arc slot connected to the longitudinal slot; a key cam plug rotatably mounted in the key cam shell, the key cam plug defining a cam surface including a proximal landing, a distal landing, and a helical ramp extending from the proximal landing toward the distal landing, the key cam plug having a first proximal position and a first distal position; a lock control lug rotatably mounted to the key cam plug, wherein the lock control lug includes a lock control arm that extends through the lock control opening, wherein the lock control lug has a proximal locking position in which the lock control arm extends through the arc slot to define a locked state of the chassis, and wherein the lock control lug has a distal unlocking position in which the lock control arm extends through the longitudinal slot to define an unlocked state of the chassis; a spring exerting a biasing force urging the lock control lug and the key cam plug in the distal direction; and a key cam stem rotatably mounted to the key cam plug, the key cam stem including a cam rider engaged with the cam surface, the key cam stem having a second proximal position and a second distal position; wherein the key cam has an unlocking state in which the key cam plug is in the first distal position, the lock control arm is in the distal unlocking position, the key cam stem is in the second distal position, and the cam rider is engaged with the proximal landing; wherein the key cam has a first locking state in which the key cam plug is in the first proximal position, the lock control arm is in the proximal locking position, the key cam stem is in the second distal position, and the cam rider is engaged with the distal landing; wherein the key cam has a second locking state in which the key cam plug is in the first proximal position, the lock control arm is in the proximal locking position, the key cam stem is in the second proximal position, and the cam rider is engaged with the proximal landing; wherein the key cam is configured to transition between the unlocking state and the first locking state in response to relative rotation of the key cam plug and the key cam stem; and wherein the key cam is configured to transition between the unlocking state and the second locking state in response to longitudinal movement of the key cam stem relative to the key cam shell. In certain embodiments, the cam surface further comprises a minor ramp positioned between the helical ramp and the distal landing.

In certain embodiments, the chassis further comprises a key cam sleeve rotatably mounted to the housing assembly, the key cam sleeve including a longitudinally-extending key cam sleeve slot; wherein with the lock control lug in the proximal locking position, the lock control arm extends into key cam sleeve slot through the arc slot such that the key cam shell and the key cam sleeve are rotationally decoupled from one another; and wherein with the lock control lug in the distal unlocking position, the lock control arm extends into the key cam sleeve slot via the longitudinal slot such that the key cam shell and the key cam sleeve are rotationally coupled with one another.

Certain embodiments relate to a chassis assembly including the chassis, the chassis assembly further comprising an outside drive assembly, the outside drive assembly comprising: an outside spring cage housing, wherein the outside spring cage housing is secured to the housing assembly and defines a central opening; an outside drive spindle rotatably mounted to the outside spring cage housing, wherein the outside drive spindle extends through the central opening and is rotationally coupled with the key cam sleeve.

Certain embodiments relate to a system including the chassis assembly, the system further comprising a plurality of modular component families; wherein each modular component family includes at least one modular component species; wherein each modular component species is operable to be installed to the chassis assembly without requiring disassembly of the chassis assembly; and wherein each modular component species is configured to provide a corresponding and respective functionality when installed to the chassis assembly.

In certain embodiments, a first modular component species is configured to transition the key cam between the unlocking state and the first locking state by causing relative rotation of the key cam plug and the key cam stem; and wherein a second modular component species is configured to transition the key cam between the unlocking state and the second locking state by causing longitudinal movement of the key cam stem.

In certain embodiments, the plurality of modular component families includes: an outside actuating mechanism family including at least one outside actuating mechanism species, wherein each of the outside actuating mechanism species is configured to be installed to the outside drive spindle, and wherein the at least one outside actuating mechanism species includes a first outside actuating mechanism species configured to transition the key cam between the unlocking state and the first locking state by causing relative rotation of the key cam plug and the key cam stem; and an inside operating mechanism family including at least one inside operating mechanism species, wherein each of the inside operating mechanism species is configured to be installed to the inside chassis spindle, and wherein the at least one inside operating mechanism species includes a first inside operating mechanism species configured to transition the key cam between the unlocking state and the second locking state by causing longitudinal movement of the key cam stem.

In certain embodiments, the first outside actuating mechanism species comprises a first lock cylinder assembly including a first lock cylinder and a first tailpiece, wherein the first tailpiece is configured to extend into the key cam shell and to engage the key cam plug without engaging the key cam shell such that the first lock cylinder assembly is operable to rotate the key cam plug without rotating the key cam shell; and wherein the first inside operating mechanism species comprises a plunger assembly including a sleeve and a plunger movably mounted in the sleeve, wherein the plunger is configured to be manually driven along the longitudinal axis.

In certain embodiments, the key cam shell further includes a proximal wall including a bowtie opening defined in part by a pair of teeth; wherein the at least one outside actuating mechanism species further comprises a second outside actuating mechanism species; wherein the second outside actuating mechanism species includes a second tailpiece; and wherein the second tailpiece is configured to be received in the bowtie opening and to engage the pair of teeth such that the second outside actuating mechanism species is operable to rotate the key cam shell.

In certain embodiments, the first tailpiece includes a narrowed section configured to be received between the teeth without engaging the teeth during rotation of the first tailpiece.

In certain embodiments, the second outside actuating mechanism species further comprises a second lock cylinder; and wherein the second tailpiece is configured to engage the teeth of the bowtie opening to form a lost rotational motion connection with the key cam shell.

In certain embodiments, the second outside actuating mechanism species further comprises a shell and a plug rotatably mounted in the shell; wherein a proximal end portion of the plug includes an engagement feature; wherein the second tailpiece extends from a distal end portion of the plug; and wherein the second tailpiece includes a pair of grooves sized and shaped to receive the pair of teeth to form a rotational coupling with the key cam shell.

In certain embodiments, the engagement feature comprises one of a slot or a flange.

In certain embodiments, the system further comprises a catch movably mounted in the outside drive spindle, the catch including a catch plate having a projected position and a depressed position; wherein the second tailpiece includes a recess; wherein the second tailpiece has a first rotational position in which the recess is aligned with the catch plate such that the catch plate is operable to move from the projected position to the depressed position; and wherein the second tailpiece has a second rotational position in which the recess is misaligned with the catch plate and the second tailpiece retains the catch plate in the projected position.

In certain embodiments, the plug of the second outside actuating mechanism species includes an annular groove, and wherein the shell of the second outside actuating mechanism species includes at least one tab received in the annular groove such that the plug and the shell are rotatably coupled with one another.

In certain embodiments, wherein each of the at least one inside operating mechanism species includes a mount comprising a distal rim configured to abut a distal end of the inside chassis spindle and a coupling tab configured to engage an opening formed in the inside chassis spindle.

In certain embodiments, the at least one inside operating mechanism species further comprises a second inside operating mechanism species, and wherein the mount of the second inside operating mechanism species includes a distal wall configured to prevent insertion of foreign objects into the inside chassis spindle.

In certain embodiments, the second inside operating mechanism species further comprises a post extending from the distal wall, wherein the post is configured to retain the key cam stem in the second proximal position to thereby retain the key cam in the second locking state.

In certain embodiments, the plurality of modular component families includes a latchbolt mechanism family including a first latchbolt mechanism species and a second latchbolt mechanism species; wherein each of the first latchbolt mechanism species and the second latchbolt mechanism species comprises: a latchbolt housing; a latchbolt movably mounted in the latchbolt housing such that the latchbolt is movable in the extending direction and the retracting direction; and a bolt bar engaged with the latchbolt and configured for engagement with the shuttle such that the shuttle is operable to drive the latchbolt in the retracting direction; wherein, for the first latchbolt mechanism species, the bolt bar is configured for unidirectional engagement with the shuttle such that the bolt bar is operable to move in the retracting direction without causing a corresponding movement of the shuttle in the retracting direction; and wherein, for the second latchbolt mechanism species, the bolt bar is configured for bidirectional engagement with the shuttle such that the bolt bar and the shuttle are coupled for joint movement in the retracting direction.

In certain embodiments, the system further comprises a fixed plunger mounted in the inside chassis spindle, the fixed plunger including a stem that engages the key cam and retains the key cam stem in the second proximal position, thereby retaining the key cam in the second locking state.

In certain embodiments, the system further comprises: an outside handle mounted to the outside drive spindle; a catch selectively coupling the outside handle with the outside drive spindle, the catch having a projected position in which the catch prevents removal of the outside handle from the outside drive spindle, the catch having a depressed position in which the outside handle is capable of being removed from the outside drive spindle; and a stop member movably seated in the outside drive spindle and engaged with the key cam plug, the stop member having a distal position in which a recess formed on the stop member is aligned with the catch such that the catch is operable to move from the projected position to the depressed position, and the stop member having a proximal position in which the recess is misaligned with the catch such that the stop member retains the catch in the projected position; wherein the fixed plunger retains the stop member in the proximal position, thereby preventing removal of the outside handle from the outside drive spindle while the fixed plunger is mounted in the inside chassis spindle.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset apparatus, comprising:

a chassis housing;

an outside drive spindle mounted for rotation relative to the chassis housing, the outside drive spindle extending along a longitudinal axis defining a proximal direction and an opposite distal direction;

a shuttle movably mounted to the chassis housing;

a key cam positioned at least partially in the outside drive spindle, the key cam comprising:

a shell operable to retract the shuttle when rotated about the longitudinal axis, wherein a proximal wall of the shell comprises a shell bowtie opening defined in part by a pair of shell teeth; and a plug movably mounted in the shell, the plug comprising a plug bowtie opening defined in part by a pair of plug teeth; and an outside actuating mechanism seated in the outside drive spindle, the outside actuating mechanism comprising a tailpiece operable to engage the shell teeth and/or the plug teeth.

2. The lockset apparatus of claim 1, wherein the outside actuating mechanism comprises a lock cylinder including a lock cylinder shell, a lock cylinder plug rotatably mounted in the lock cylinder shell and operable to rotate the tailpiece, and a tumbler assembly operable to selectively prevent rotation of the lock cylinder plug relative to the lock cylinder shell.

3. The lockset apparatus of claim 2, wherein the tailpiece is operable to engage the shell teeth and is inoperable to engage the plug teeth such that the lock cylinder is operable to rotate the shell without rotating the plug.

4. The lockset apparatus of claim 2, wherein the tailpiece is operable to engage the plug teeth and is inoperable to engage the shell teeth such that the lock cylinder is operable to rotate the plug without rotating the shell.

5. The lockset apparatus of claim 1, wherein the outside actuating mechanism comprises an override mechanism including an override plug mounted for rotation relative to the outside drive spindle and operable to rotate the tailpiece; and wherein the tailpiece is operable to engage the shell teeth to thereby rotationally couple the tailpiece with the shell.

6. The lockset apparatus of claim 5, wherein the tailpiece is inoperable to engage the plug teeth.

7. The lockset apparatus of claim 5, wherein the override mechanism comprises a tool-assisted override mechanism; and wherein the override plug comprises a recess operable to receive a tip of a tool to thereby facilitate rotation of the override plug by the tool.

8. The lockset apparatus of claim 5, wherein the override mechanism comprises a manual override mechanism; and wherein the override plug comprises a flange operable to be grasped by a user to thereby facilitate manual rotation of the override plug.

9. The lockset apparatus of claim 1, wherein the outside actuating mechanism comprises a stop member, the stop member comprising a body portion rotationally coupled with the outside drive spindle;

wherein the tailpiece is rotationally coupled with the plug teeth and thereby prevents rotation of the plug relative to the outside drive spindle.

10. The lockset apparatus of claim 9, further comprising:

an outside handle rotationally coupled with the outside drive spindle; and a spring seated in the outside handle and biasing the stop member in the distal direction.

11. The lockset apparatus of claim 1, wherein the key cam further comprises:

a stem mounted in the shell, the stem comprising a cam rider operable to engage a cam surface of the plug;

a lock control lug mounted in the shell, the lock control lug including an arm that extends into a lug opening of the shell; and a spring urging the lock control lug into engagement with the plug.

12. A key cam, comprising:

a shell extending along a longitudinal axis defining a proximal direction and an opposite distal direction, the shell comprising:

a proximal wall defining a first bowtie opening, wherein the first bowtie opening is defined in part by a pair of shell teeth; and a body portion extending distally from the proximal wall, the body portion defining a lug opening; and a plug movably mounted in the shell, the plug comprising a second bowtie opening, a shoulder, and a cam surface, wherein the second bowtie opening is defined in part by a pair of plug teeth;

a stem movably mounted in the shell, the stem comprising a cam rider operable to engage the cam surface;

a lock control lug movably mounted in the shell between the proximal wall and the shoulder, the lock control lug including an arm that extends into the lug opening; and a spring engage between the proximal wall and the lock control lug thereby urging the lock control lug into engagement with the shoulder.

13. The key cam of claim 12, wherein the lug opening comprises a longitudinal slot configured to prevent relative rotation of the shell and the lock control lug, and an arc slot configured to permit limited relative rotation of the shell and the lock control lug.

14. The key cam of claim 12, wherein the cam surface comprises:

a proximal landing operable to engage the cam rider when the key cam is in an unlocking state;

a distal landing operable to engage the cam rider when the key cam is in a locking state; and a first ramp extending between the proximal landing and the distal landing.

15. The key cam of claim 14, wherein the cam surface further comprises a second ramp extending between the first ramp and the distal landing; and wherein the first ramp and the second ramp extend in opposite directions such that an apex is defined between the first ramp and the second ramp.

16. The key cam of claim 14, wherein the plug further comprises a wall extending longitudinally from the proximal landing to a distal rim of the plug; and wherein the stem comprises a base that is positioned adjacent the rim when the cam rider is positioned at the proximal landing.

17. An access control device comprising the key cam of claim 12, the access control device further comprising an override mechanism, the override mechanism comprising a tailpiece sized and shaped to matingly engage the first bowtie opening such that the override mechanism is operable to rotate the shell.

18. An access control device comprising the key cam of claim 12, the access control device further comprising:

a latch configured to extend and retract in response to rotation of the shell;

an outside handle; and an outside actuating mechanism seated in the outside handle, the outside actuating mechanism comprising a tailpiece operable to engage the shell teeth and/or the plug teeth.

19. An access control device comprising the key cam of claim 12, the access control device further comprising:

a chassis housing;

an outside drive spindle mounted for rotation relative to the chassis housing; and a stop member comprising a tailpiece rotationally coupled with the outside drive spindle, wherein the tailpiece engages the plug teeth and thereby prevents rotation of the plug relative to the outside drive spindle.

20. The access control device of claim 19, wherein the outside drive spindle comprises an outside drive spindle slot through which the arm extends such that the lock control lug is rotationally coupled with the outside drive spindle; and wherein the chassis housing comprises a housing slot operable to receive the arm to thereby rotationally lock the outside drive spindle to the chassis housing.

* * * * *